INVENTOR.
THOMAS M. BUTLER
ATTORNEYS

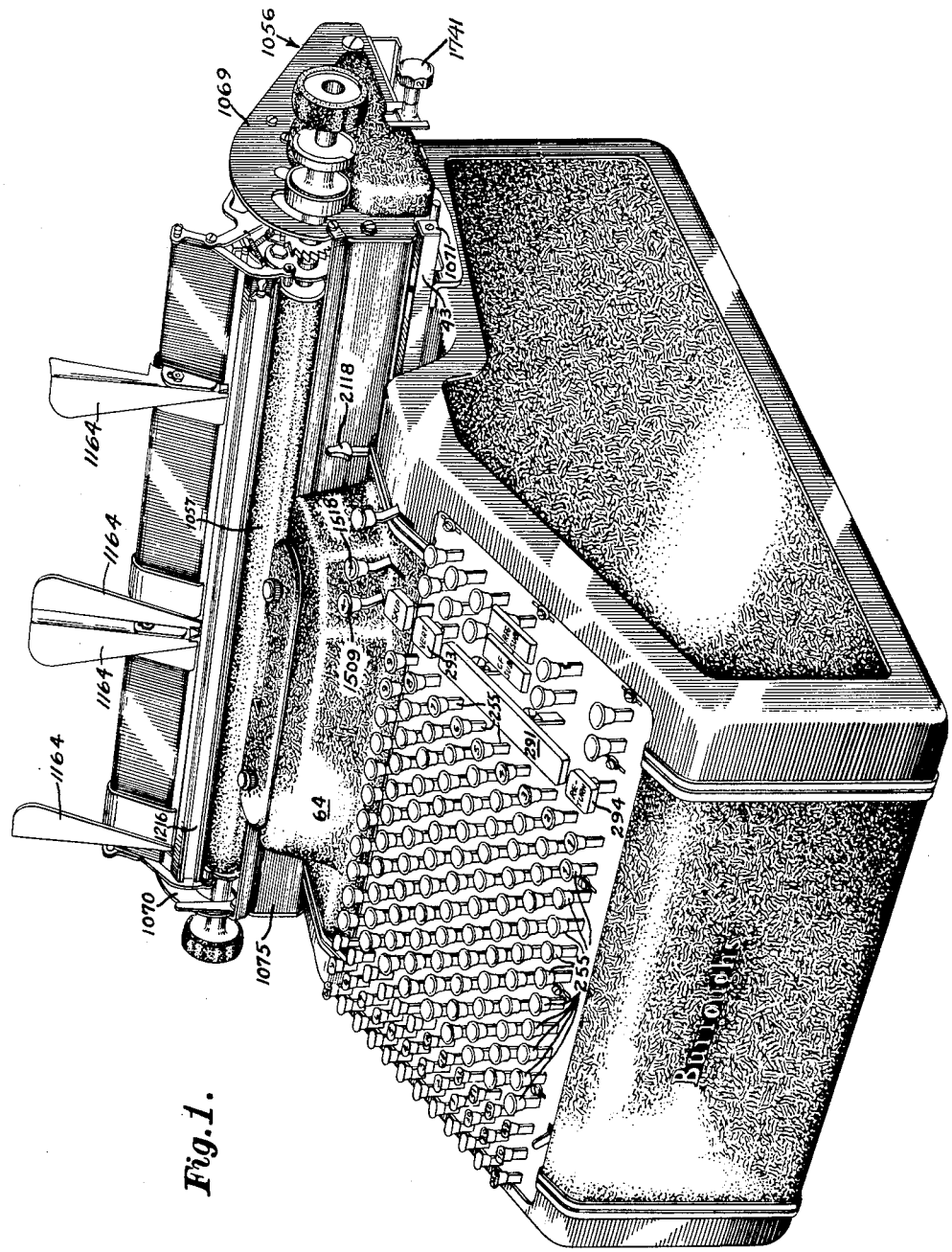

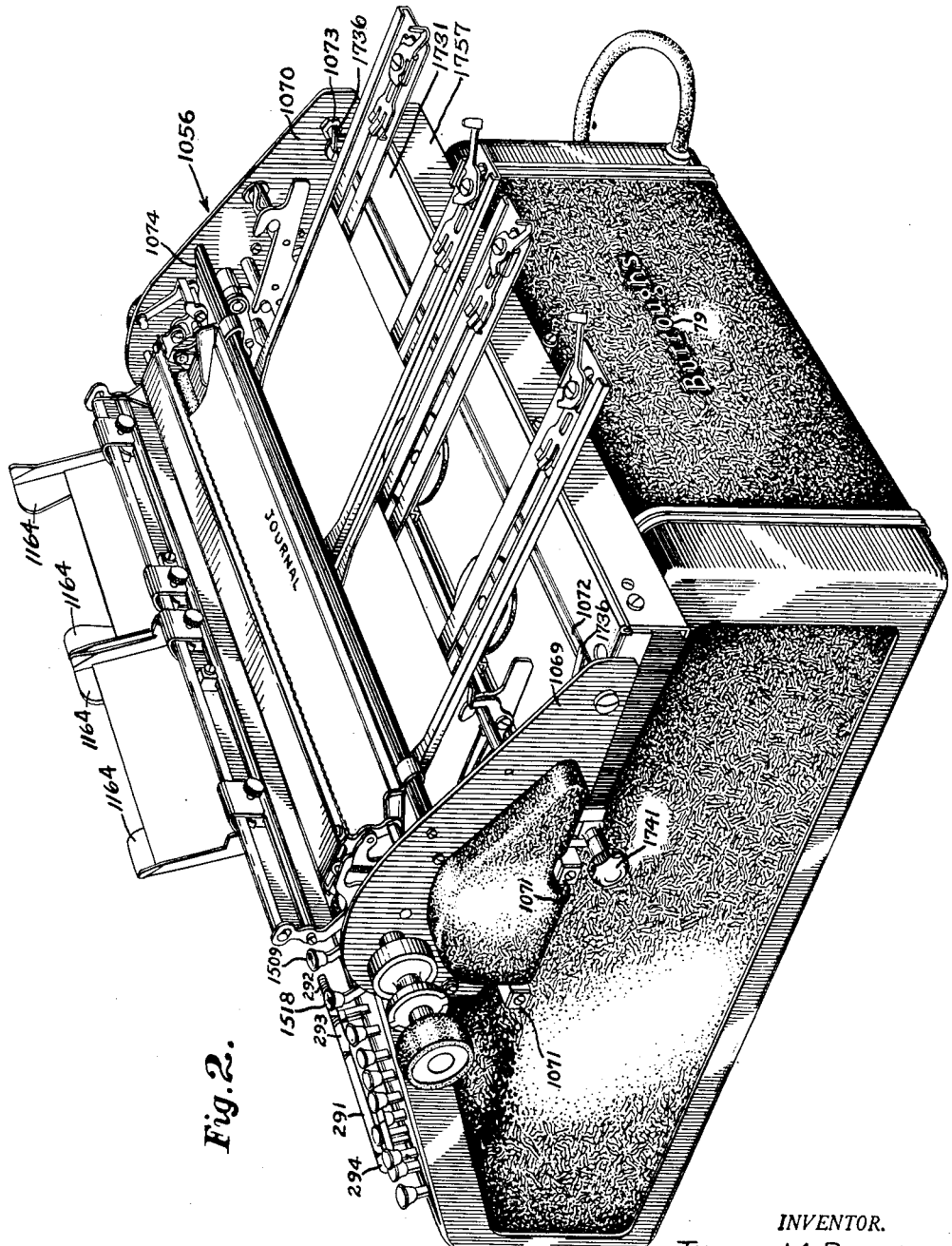

INVENTOR.
THOMAS M. BUTLER
BY Fidler, Crouse
& Beardsley
ATTORNEYS

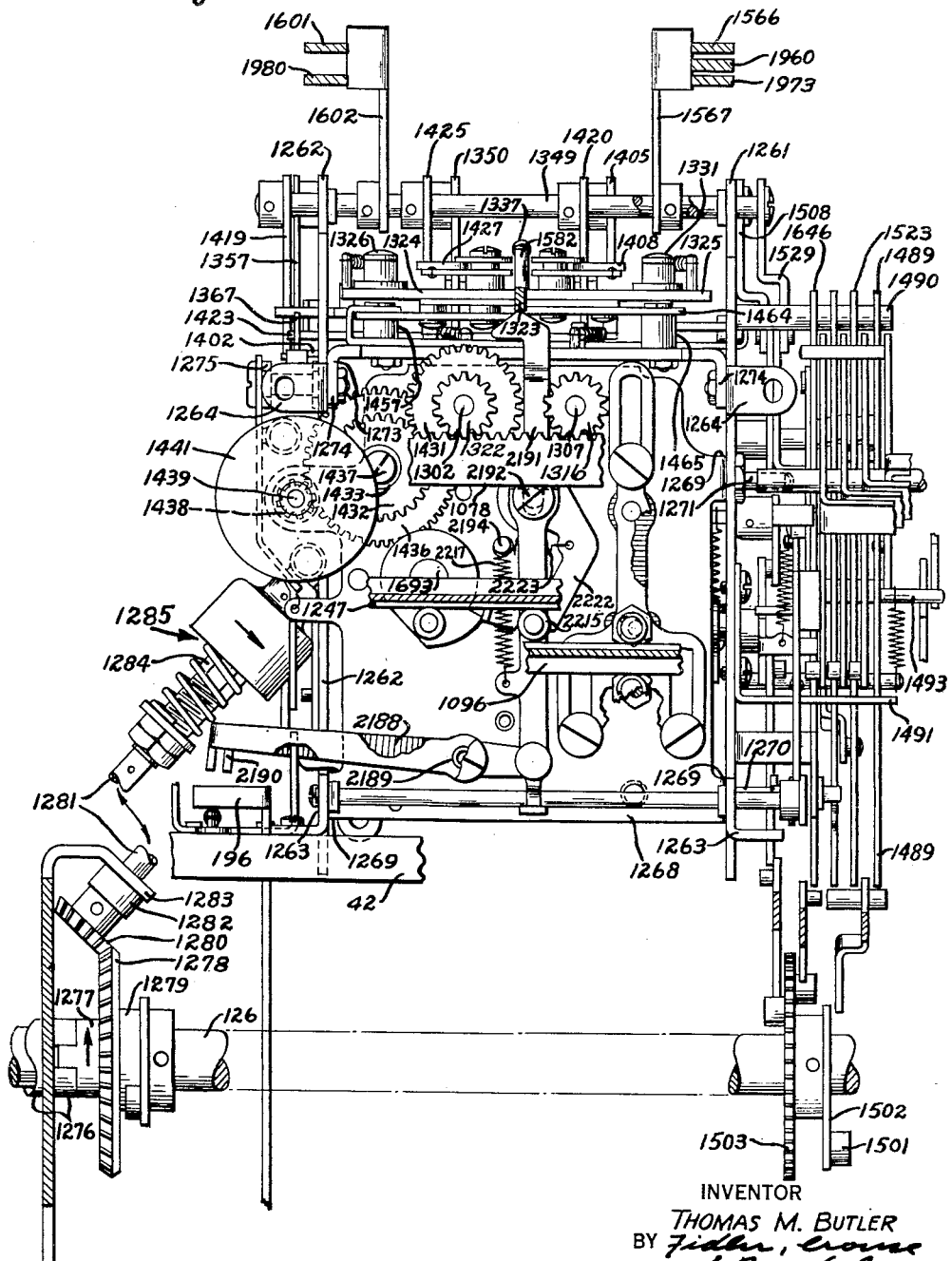

INVENTOR.
THOMAS M. BUTLER
ATTORNEYS

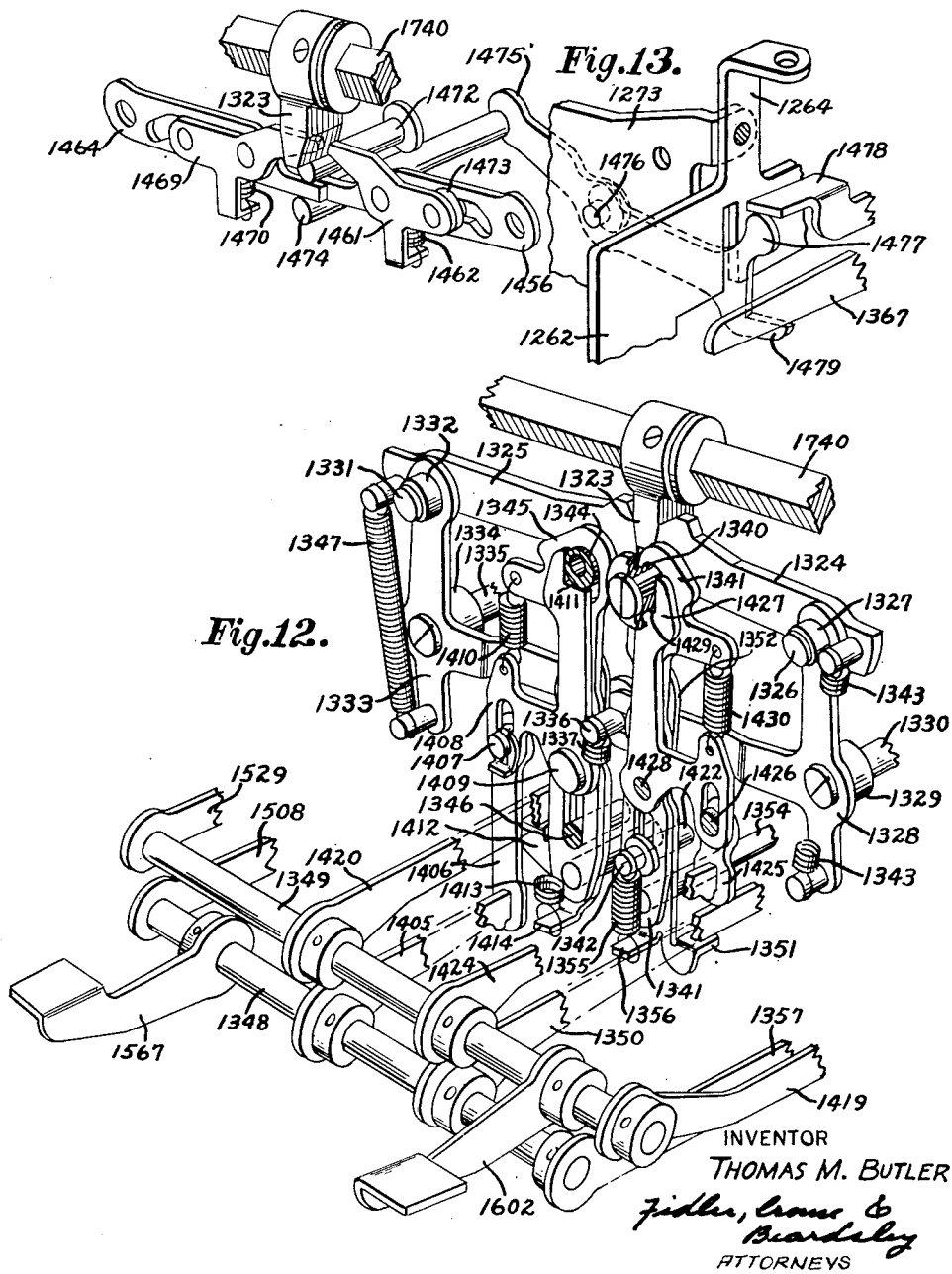

INVENTOR.
THOMAS M. BUTLER
ATTORNEYS

INVENTOR.
THOMAS M. BUTLER

ATTORNEYS

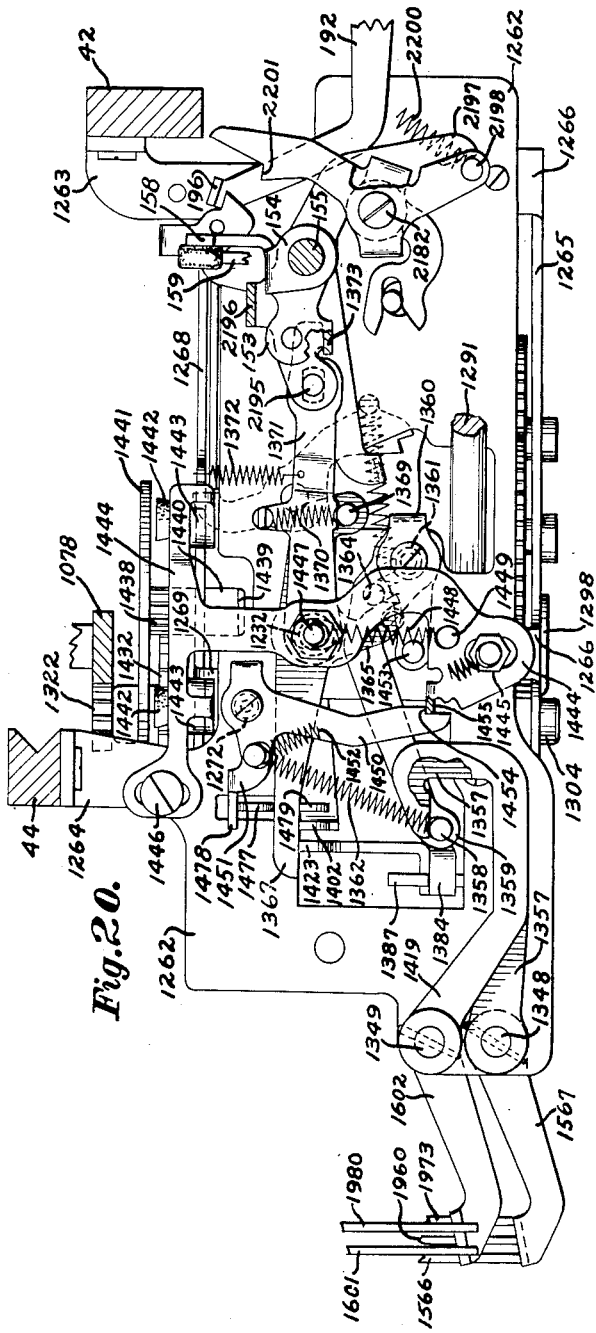

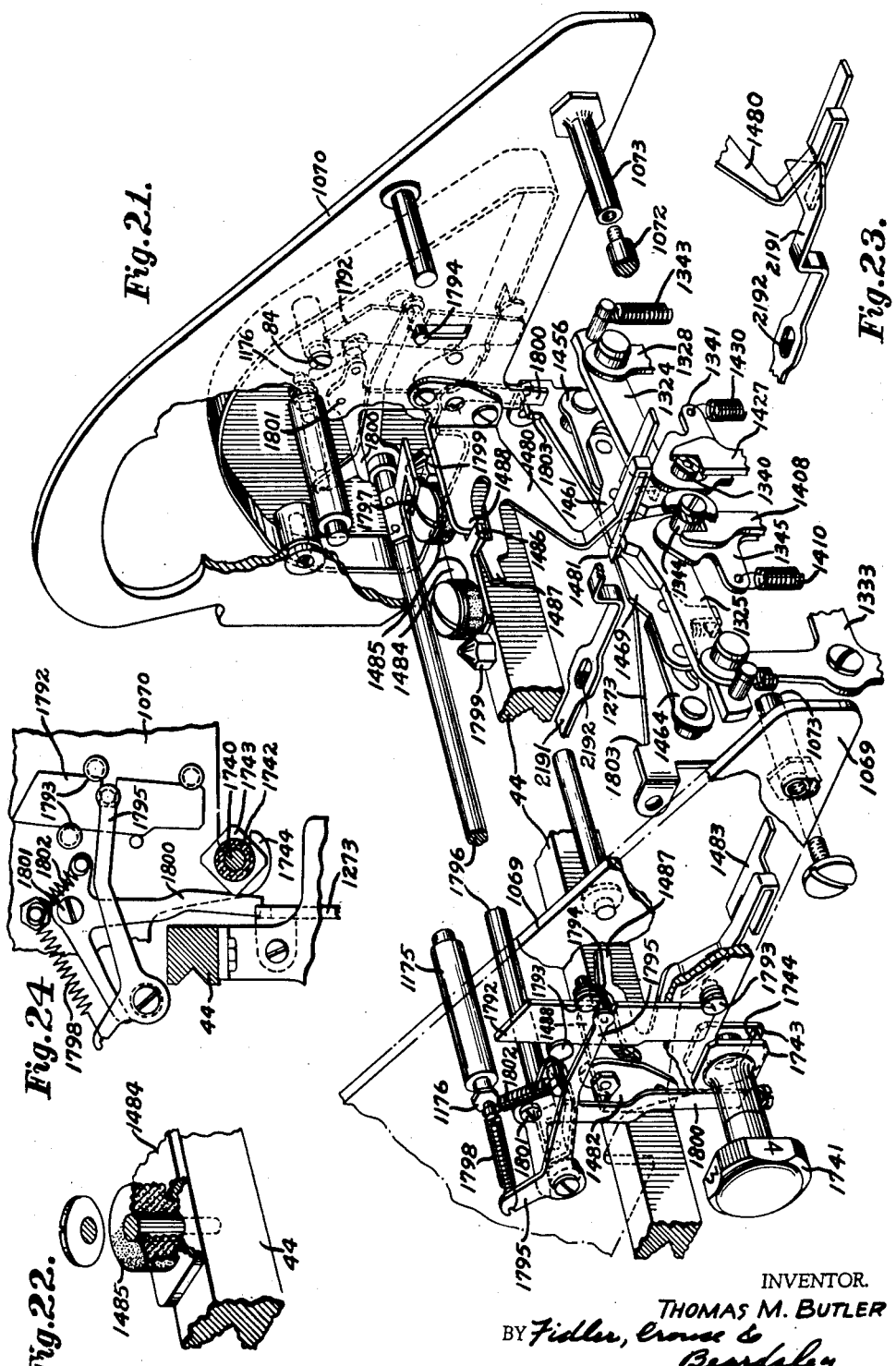

April 21, 1953

T. M. BUTLER 2,635,732

CARRIAGE MOVING AND POSITIONING MEANS FOR ACCOUNTING MACHINES

Filed Aug. 25, 1950

INVENTOR.
THOMAS M. BUTLER
BY Fidler, Crouse & Beardsley
ATTORNEYS

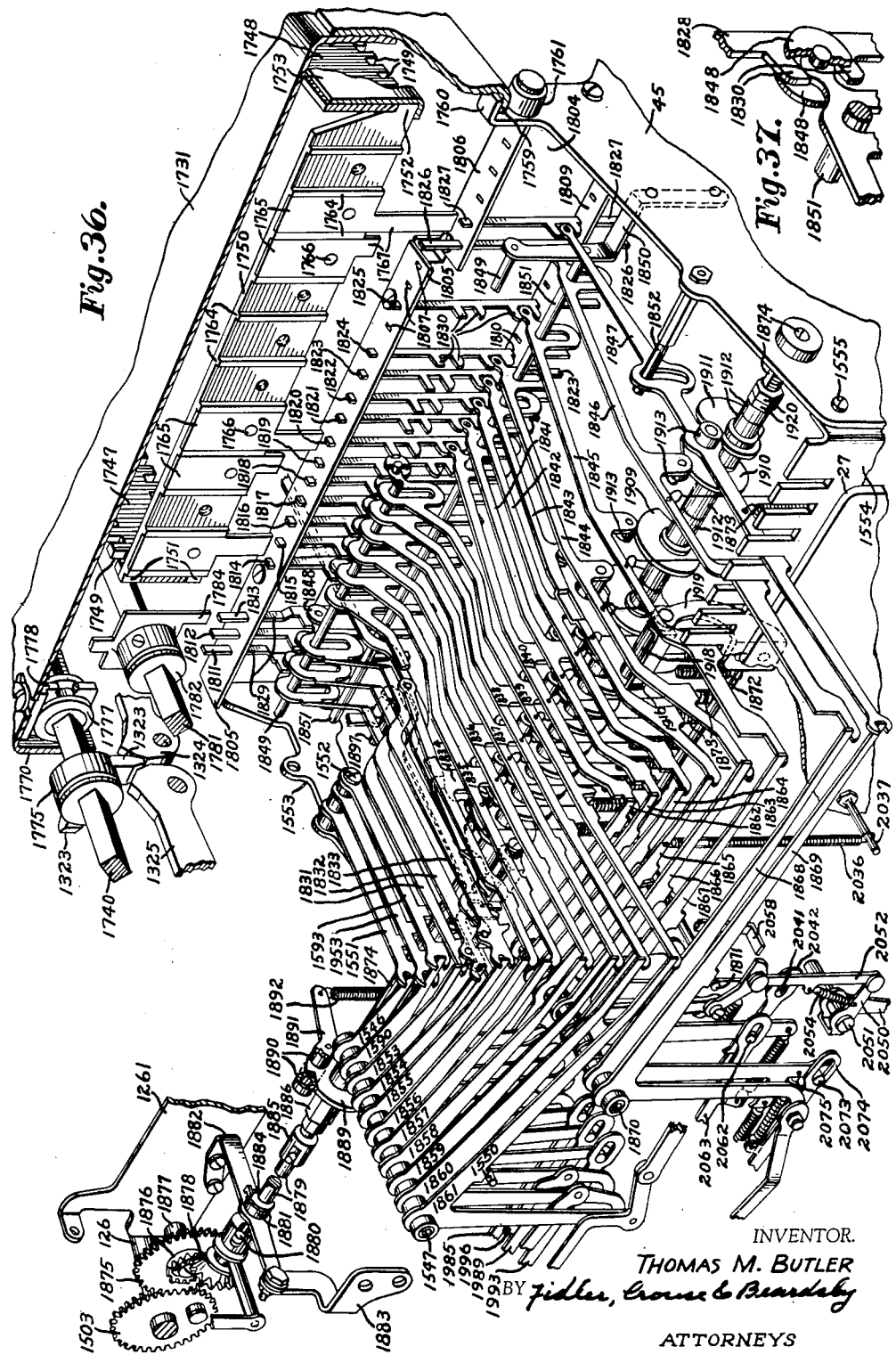

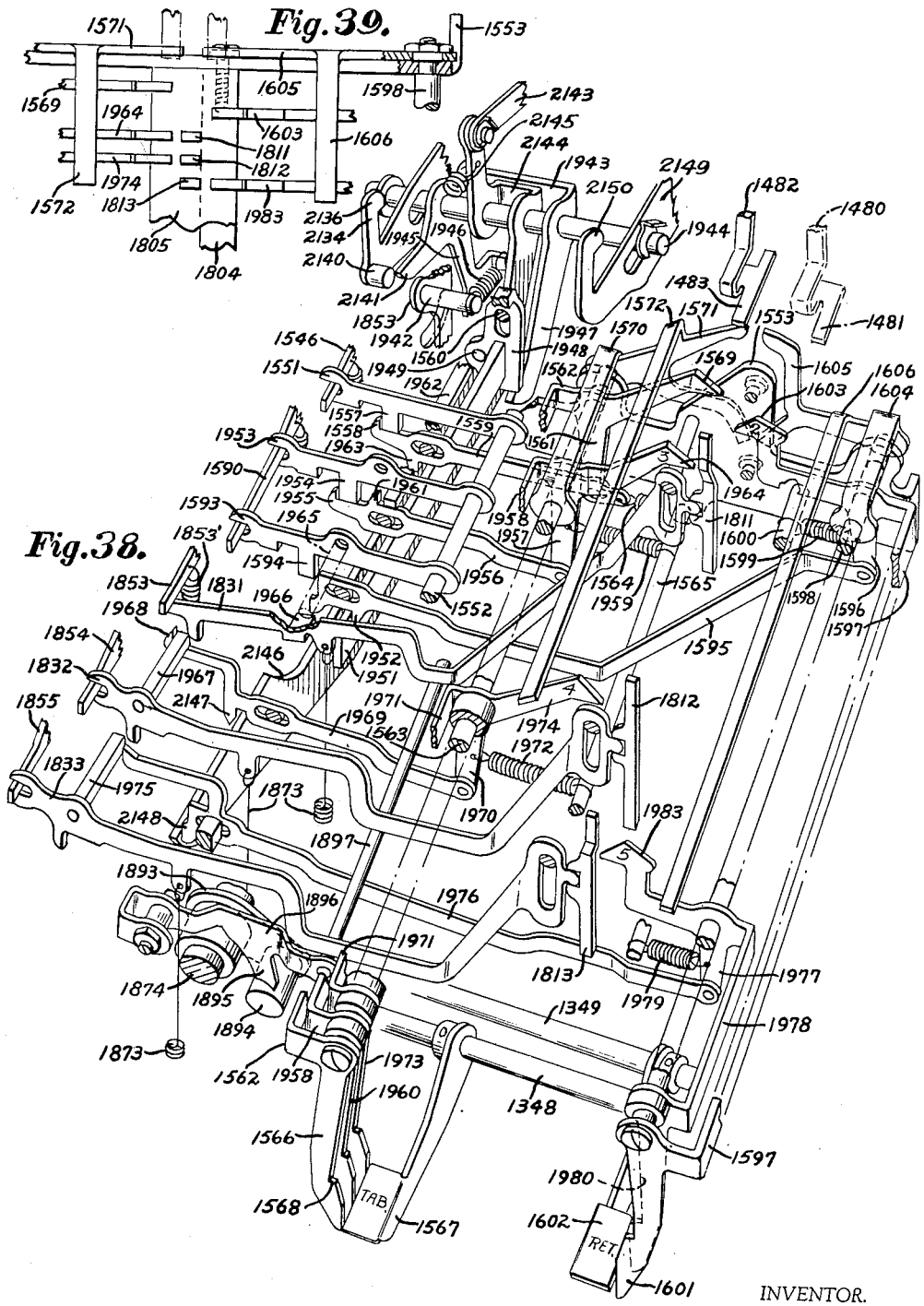

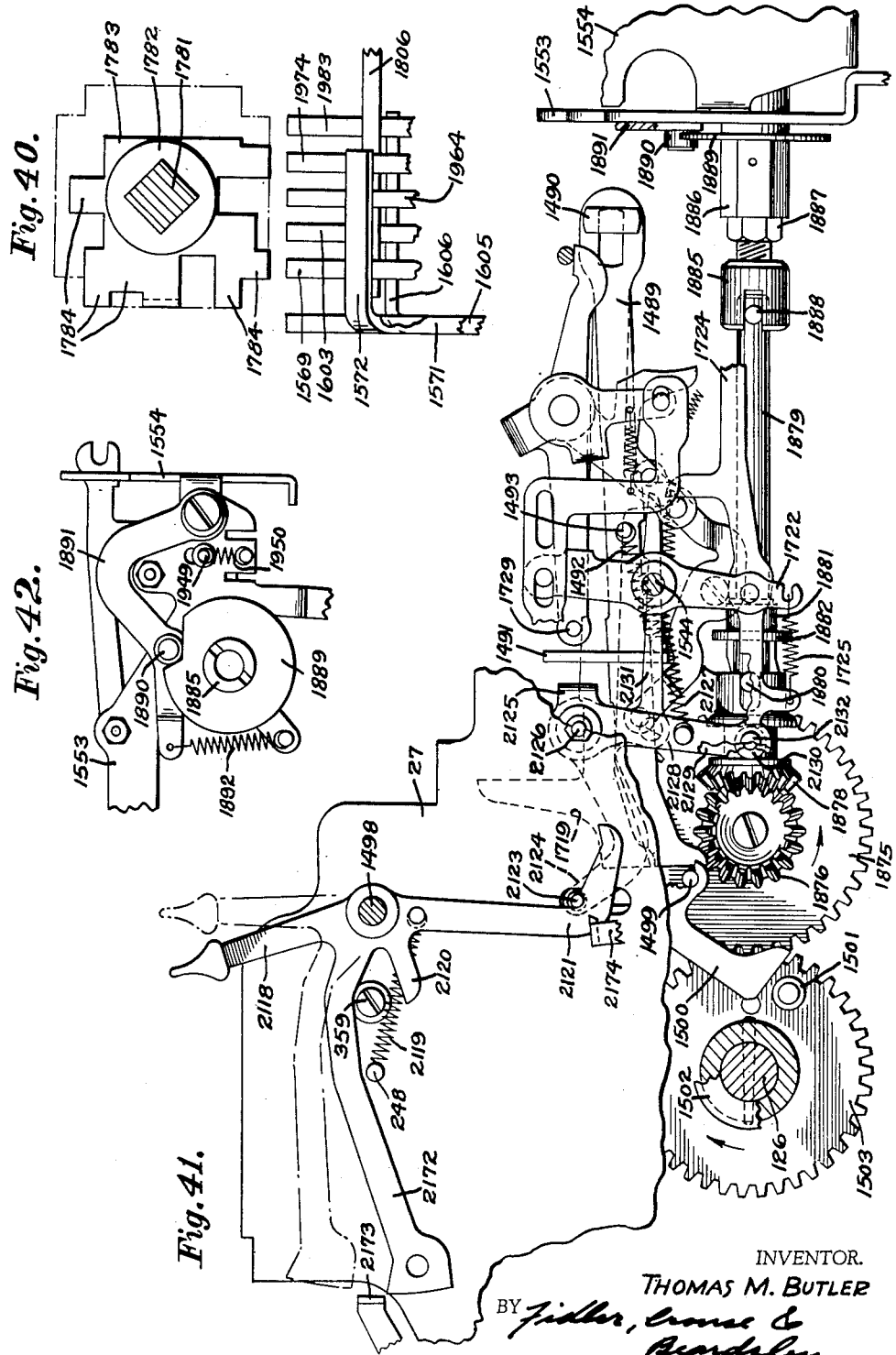

April 21, 1953  T. M. BUTLER  2,635,732
CARRIAGE MOVING AND POSITIONING
MEANS FOR ACCOUNTING MACHINES
Filed Aug. 25, 1950  39 Sheets-Sheet 28
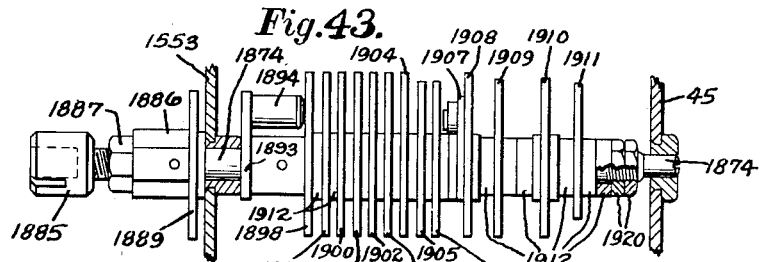
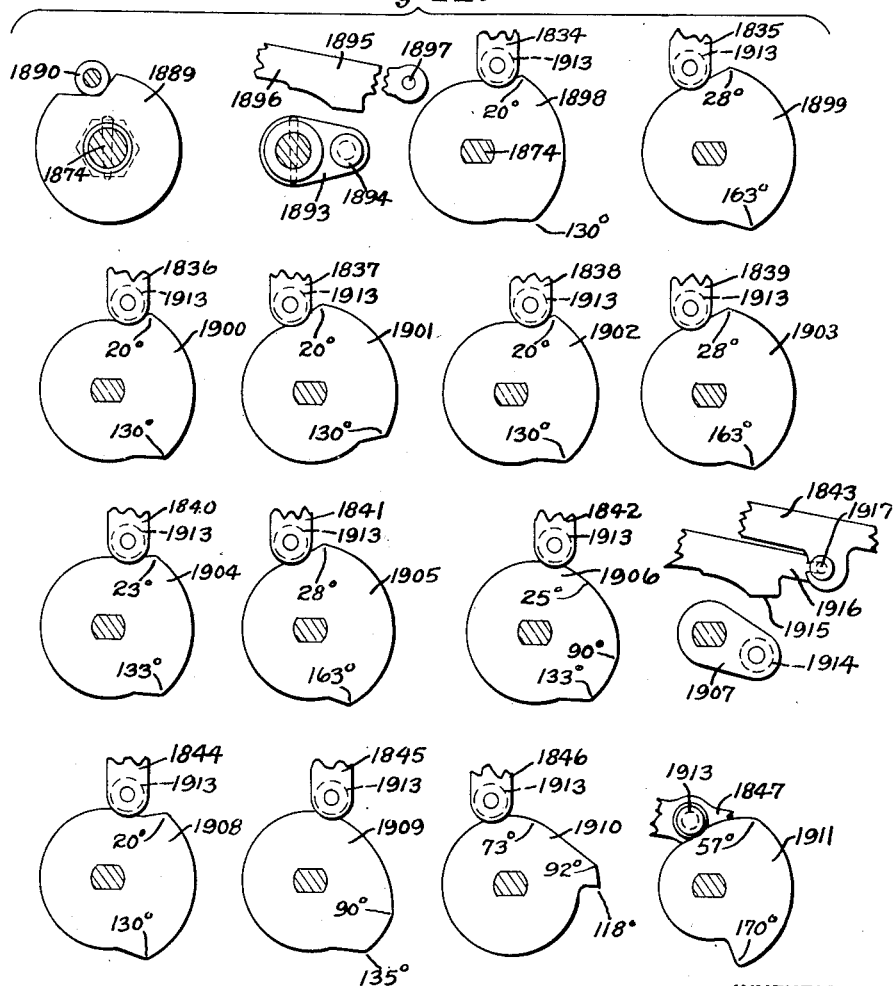
INVENTOR.
THOMAS M. BUTLER
BY Fidler, Crouse
& Beardsley
ATTORNEYS April 21, 1953
T. M. BUTLER
CARRIAGE MOVING AND POSITIONING
MEANS FOR ACCOUNTING MACHINES
2,635,732
Filed Aug. 25, 1950
39 Sheets-Sheet 29
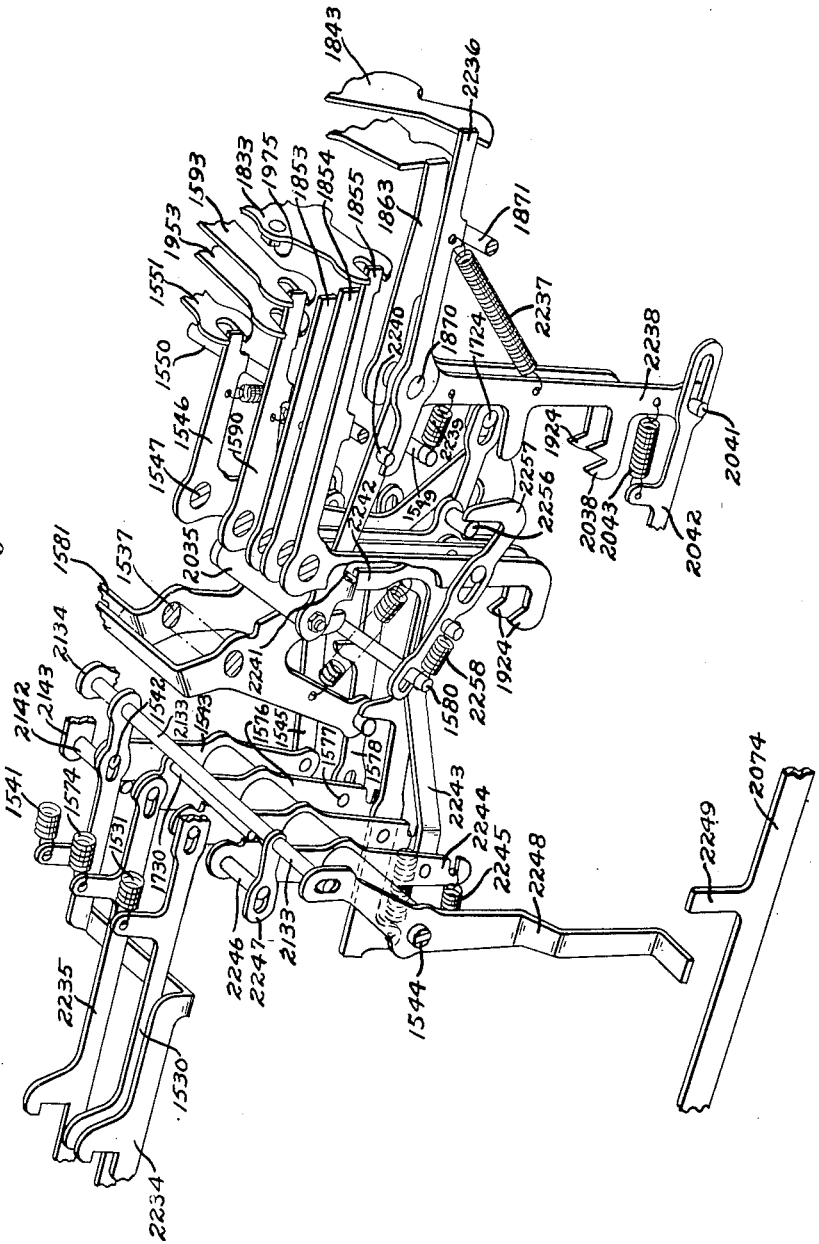
INVENTOR.
THOMAS M. BUTLER
BY Fidler, Crouse
& Beardsley
ATTORNEYS April 21, 1953

T. M. BUTLER 2,635,732

CARRIAGE MOVING AND POSITIONING
MEANS FOR ACCOUNTING MACHINES

Filed Aug. 25, 1950

INVENTOR.
THOMAS M. BUTLER
BY Fidler, Crouse
& Beardsley
ATTORNEYS

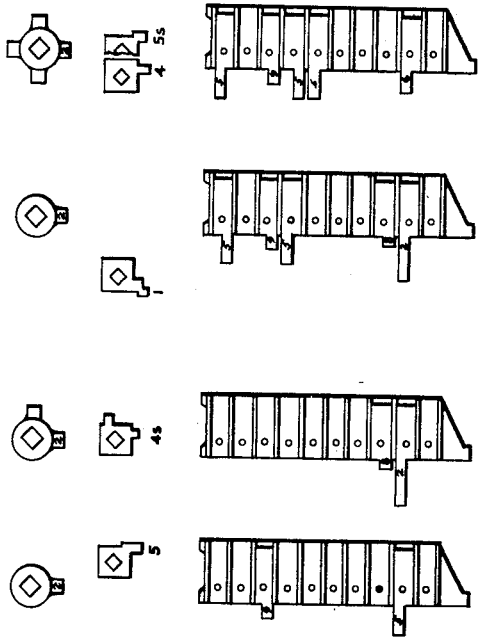
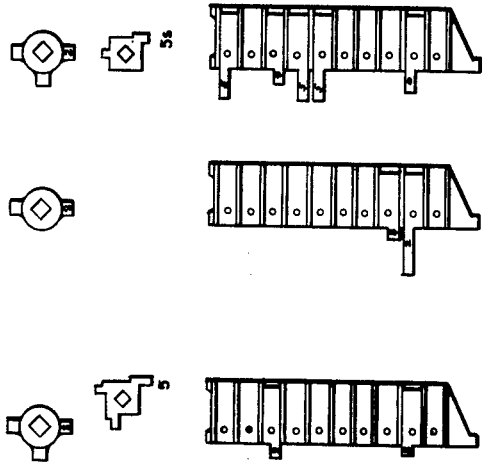
Fig. 52.

April 21, 1953

T. M. BUTLER 2,635,732

CARRIAGE MOVING AND POSITIONING
MEANS FOR ACCOUNTING MACHINES

Filed Aug. 25, 1950

INVENTOR
THOMAS M. BUTLER
BY  *Fidler, Crouse & Beardsley*
ATTORNEYS

Patented Apr. 21, 1953

2,635,732

UNITED STATES PATENT OFFICE 2,635,732

CARRIAGE MOVING AND POSITIONING MEANS FOR ACCOUNTING MACHINES

Thomas M. Butler, Detroit, Mich., assignor to Burroughs Adding Machine Company, Detroit, Mich., a corporation of Michigan Application August 25, 1950, Serial No. 181,401

22 Claims. (Cl. 197—177)

This invention relates to improvements in means for moving the paper carriage of an accounting machine or the like to and positioning it in various columnar positions selectively.

The present application is a continuation-in-part of my original application Serial No. 85,971, filed April 7, 1949, and now abandoned. Other copending divisions and continuations-in-part of the above original application are Serial No. 167,875, filed June 13, 1950, Serial No. 174,696, filed July 19, 1950; Serial No. 196,844, filed November 21, 1950; Serial No. 252,713, filed October 23, 1951; Serial No. 278,260, filed March 24, 1952, and Serial No. 282,843, filed April 17, 1952.

One object of the present invention is to provide an improved means for moving the paper carriage rapidly, smoothly, quietly and reliably in both directions by power.

A further object is to provide means for very accurately and reliably positioning the carriage in very exactly correct columnar positions at the end of all carriage movements and prior to operation of the main operating mechanism of the machine.

A further object is to provide improved carriage movement control means permitting automatic and manual selection of such a great variety of carriage movements to be effected by power in successive machine operations as to substantially eliminate expenditure of time and effort of the operator to secure the various columnar positionings of the carriage in the sequence required by the work being done.

A further object is to provide an electrically driven accounting machine with a traveling paper carriage, power operated carriage moving means, means to control said carriage moving means to effect various carriage movements in operations of the machine, a plurality of motor bars for initiating machine operations and conditioning said control means to cause different carriage movements in such machine operations, and automatic control means to vary the carriage movement controlling effects of one or more of the motor bars in different columnar positions of the paper carriage.

Further objects and advantages of the invention will appear from the following description with reference to the accompanying drawings in which:

Fig. 1 is a perspective view of an accounting machine embodying the present invention;

Fig. 8 is a top plan view of a paper carriage operating power transmission drive unit hereinafter referred to as the "gear box" together with various control parts mounted thereon;

Figs. 12 to 15 are perspectives of various carriage movement control devices at the back of the gear box as viewed from the upper, rear, left corner of the machine;

Fig. 20 is a left side elevation of the gear box with some of the control and interlock elements mounted thereon;

Fig. 21 is a perspective view of portions of the carriage frame and certain of the carriage movement control parts as seen from a point above, rightward and rearward;

Fig. 22 is an enlarged detail of Fig. 20;

Fig. 23 is another detail of Fig. 20;

Fig. 24 is a side elevation of an interlock device associated with the automatic function control means of the machine;

Fig. 27 is a spread perspective of control elements associated with the gear box and involved in controlling carriage movements, opening and closing of the carriage, and line-spacing;

Fig. 36 is a spread perspective of the automatic sensing means mounted in the stationary frame of the machine for cooperation with the control unit of Fig. 34 and showing connections operable by such sensing means to control various portions and mechanisms of the machine;

Fig. 37 is a detail of Fig. 36;

Fig. 38 is a further spread perspective of portions of the controls included in Fig. 36 and with additional elements shown;

Figs. 39 and 40 are details;

Fig. 41 is a right side elevation of a power drive for the automatic sensing means and of the means for disabling and re-enabling the sensing means;

Fig. 42 is a front elevation of elements at the right-hand side of Fig. 41;

Fig. 43 is a top plan view of the actuating cam shaft for the sensing means;

Fig. 44 shows in rear elevation the cams and cranks which are mounted on the cam shaft of Fig. 43;

Fig. 45 is a view somewhat similar to Fig. 33 but illustrating the construction of portions of a modified machine;

Figure 3:
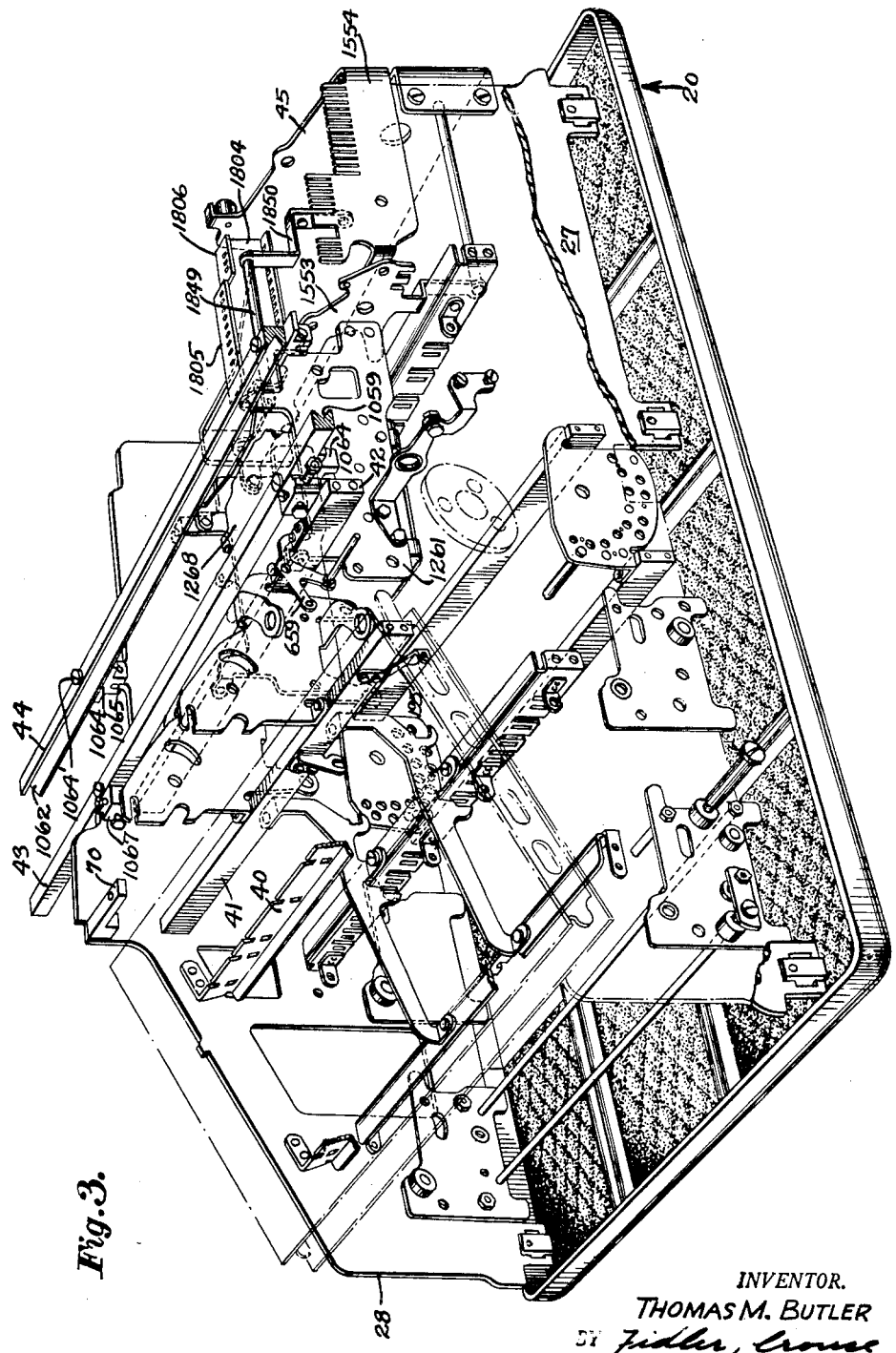
Fig. 3 is a perspective of the machine frame supported on its base pan or base portion of its casing with the right side frame member and keyboard frame portions removed but indicated by dot-dash lines to more clearly reveal interior elements of the frame, the assembly being viewed from a point above, forwardly and to the right.

Figs. 47 to 50 show a modification of the carriage arresting means and a modification of the interlock means associated therewith and with the motor switch and machine cycling clutch; and Figs. 51 to 55 show a few examples of work which may be performed on the machine embodying the present invention and show a plurality of the great number of programs of carriage movements which can be provided for by means of a single array of control projections 1767 and 1784 and column stops 1323 and selected at will by the operator by rotation of the program selecting knobs.

GENERAL

The illustrated calculating and accounting machine is that disclosed in full detail in my above-mentioned applications Serial Nos. 85,971 and 174,696. There will be described in detail hereinafter only those structures and mechanisms of the machine which are necessary to a full understanding of the present invention. For a detailed disclosure of other features and mechanisms of the machine, including those referred to only generally hereinafter, reference may be had to my above-mentioned applications Serial Nos. 85,971 and 174,696. To provide for simple and easy identification of corresponding elements of both disclosures, the parts illustrated and described herein are designated by the same reference numbers as in the above-mentioned applications.

Throughout the following description, consistently with the description in the above-mentioned applications, the words clockwise and counter-clockwise will be used to describe positions and motions of elements of the machine as seen by an observer in front of, at the right, or above the moving parts in the positions in which they are located in the machine. The words right, rightward, left and leftward will be employed to describe positions and motions as seen by an observer in front of the machine. The words above, up, upward, below, down, downward, front, forward, rear, rearward, and behind will be employed to describe positions and motions as they occur in the machine when it is in its normal upright position.

The machine is a key-set, electric motor driven machine adapted to perform a great variety of accounting, bookkeeping and other work involving calculation and recording. It has a traveling front-feed paper carriage into which record papers may be inserted. Cycles of operation of the machine may be initiated manually by depression of various motor bars and "live" function control keys on the keyboard and automatically by automatic function control means operating in accordance with the columnar positioning of the carriage. The carriage is movable by power in both the tabulating and return directions under control of certain of said motor bars in the course of cycles of machine operation initiated by those bars, under control of an automatic control means operating in dependence upon the columnar positioning of the carriage, under the combined control of both of those means, or directly under control of manipulative means on the keyboard without causing the machine to perform a cycle of operation. The automatic control means is capable of altering and/or postponing certain of the control effects of the motor bars upon the automatic movements of the carriage.

The automatic control means of the illustrated machine is so constructed that it is presettable or preadjustable to provide for a plurality of different programs of automatic carriage movements and a corresponding plurality of sets of columnar positions of the carriage appropriate for a plurality of kinds of work to be performed on the machine, and for a corresponding plurality of programs of automatic control of other functions and operations of the machine. Such automatic control means is also adapted for simple and ready adjustment by the operator of the machine for selection of the desired set of columnar positions and corresponding automatic control program. In that way, not only is the machine rendered highly versatile and adaptable to a great variety of work but also the various kinds of work are performed by the machine in a most highly automatic manner with a minimum of effort and attention of the machine operator to secure the proper columnar positioning of the paper carriage to effect recording of the various entries and operations in the proper positions on the record material.

Figure 2X:
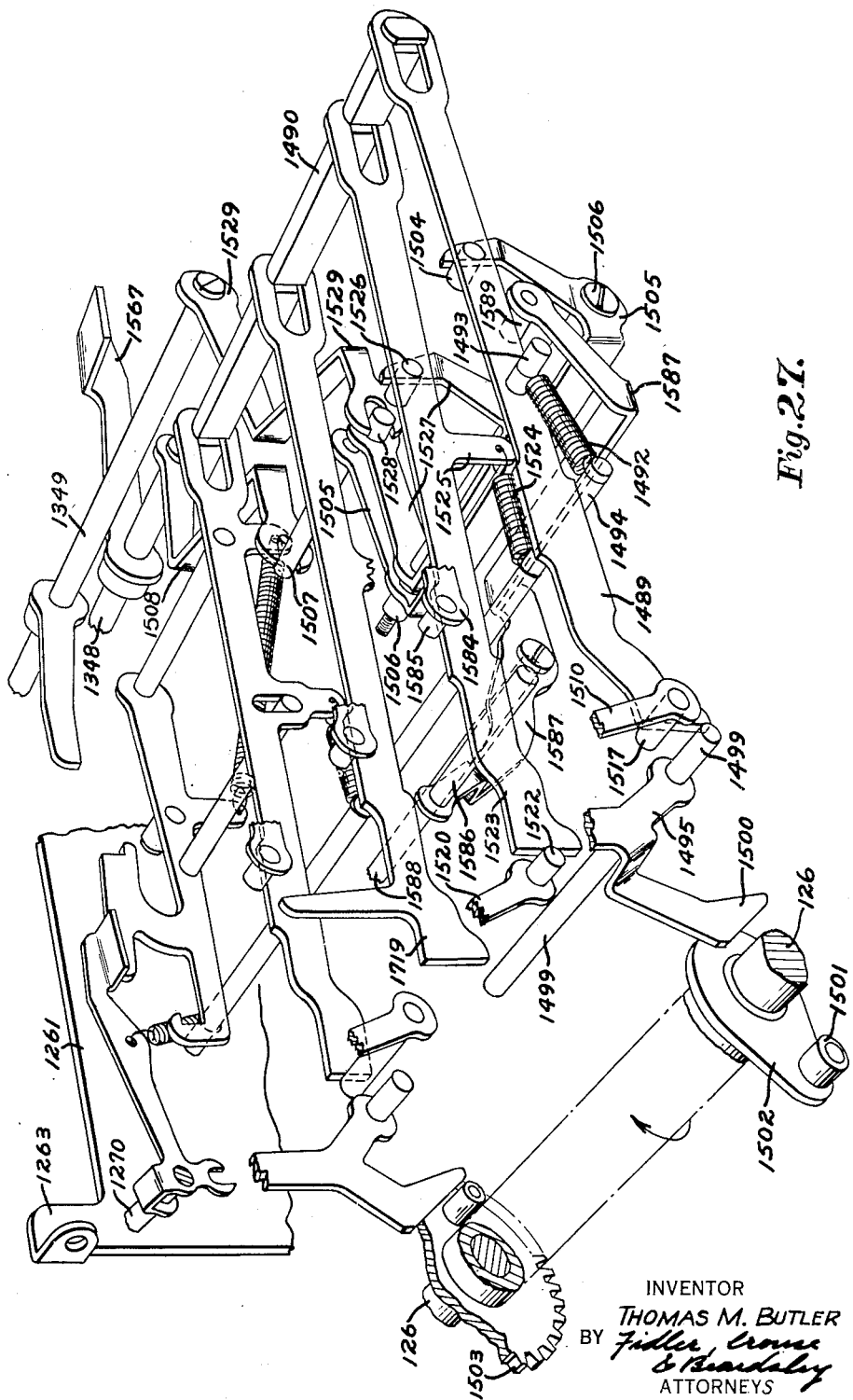
Fig. 2 is a further perspective view of the machine of Fig. 1.

The mechanisms of the machine are supported on or in a frame comprising a pair of frame side plates 27 and 28 interconnected and braced by a plurality of cross members as shown in Fig. 3. As also shown in the same figure, the frame is supported on and secured to a base 20. A casing, as shown in Figs. 1 and 2, substantially completely encloses the machine except for the upper side of the keyboard, the paper carriage and the races for the latter.

The machine is driven by an electric motor (not shown herein) which, as disclosed in detail in the above-mentioned applications Serial Nos. 85,971 and 174,696, drives a bevel gear 1278 (Fig. 8) at all times while the motor is running. The motor is a normally inactive motor controlled by a switch (not shown) which is closed to energize the motor by movement of a switch operating arm 159 (Figs. 20 and 29) rearwardly (leftwardly in Fig. 20) and re-opened when the arm 159, upon being released, is returned forwardly by a spring (not shown) which biases the switch to open position. As disclosed fully in said original application, a main drive shaft 126 journalled in anti-friction bearings mounted on the frame side plates 27 and 28 is adapted to be driven clockwise on the gear 1278 through a one revolution machine cycling clutch (not shown). The clutch is controlled, as disclosed in detail in my original application, by an arm spring-urged downwardly to couple the clutch and returned upwardly as the clutch is uncoupled at the end of each machine cycle. The rear end of the clutch control arm is shown at 142 in Fig. 29 and has a rightwardly turned lug 143 which normally rests on a latch shoulder 144 on the rear edge of a downwardly extending arm 145 on the left side of a yoke member 146 which is pivotally supported on a stud 147 secured in a bracket 148 which is secured to the rear face of the frame cross member 42. The yoke 146 is urged counterclockwise to maintain its latching shoulder 144 normally under the lug 143 and, thus, to hold the clutch uncoupled, by a tension spring 149 connected at its upper end to a stud secured in the bracket 148 and at its lower end to a rearwardly extending right side arm 150 of the yoke 146. On the rear end of the arm 150 is a rightwardly turned lug 151 overlying a stud 152 secured in a rearwardly extending right side arm 153 of a yoke 154 pivotally mounted on a stud 155 secured in the bracket 148. The yoke 154 also has an upwardly bent projection 158 with an upper end portion extending leftwardly in front of the switch closing arm 159.

As disclosed in my applications Serial Nos. 85,971 and 174,696, a cycle of operation of the machine is initiated by downward movement of a leftwardly bent lug 196 on the up-turned rear end of a lever 192. When the lug 196 is moved downwardly a substantial distance from its normal upward position, it engages an upward projection on the rearward right side arm 150 of the yoke 146 and rocks the yoke 146 clockwise whereby the lug 151 acts on the stud 152 to rock the yoke 154 clockwise to close the motor switch and the shoulder 144 is withdrawn from beneath the lug 143 to permit the lever 142 to move downward to couple the machine drive clutch.

As disclosed in detail in my applications Serial Nos. 85,971 and 174,696, the lug 196 moves downward to close the motor switch and couple the machine cycling clutch to initiate a cycle of machine operation whenever a shaft 139 (Fig. 6), journalled in the frame side plates 27 and 28 and extending beyond the plate 27 at its rightward end, is rocked clockwise, except under certain conditions which need not be discussed herein. The shaft 139 may be rocked clockwise to initiate a cycle of machine operation by depression of any one of a plurality of "live" keys and bars including four motor bars 291, 292, 293 and 294, on the keyboard.

The construction and operation of the keyboard, including the means for latching down, releasing and restoring the motor bars, and the means for preventing depression of more than one of the motor bars 292, 293 and 294 at the same time, is disclosed fully in applications Serial Nos. 85,971 and 174,696.

A slide 310 (Fig. 6) guided for upward and downward movement on three studs 311 on the leftward side of the right-hand frame side plate 27, has two arms 312 which extend upwardly through the keyboard and support the "Main" motor bar 291 on their upward ends. The slide 310 and "Main" motor bar 291 are freely depressible at all times and, when manual pressure is withdrawn from them, are immediately returned to normal position by a spring 313. A stud 374 secured in the slide 310 projects rightwardly through a slot in the plate 27 and over the forward end of a forward arm of a lever 376 pivoted on a stud 377 secured in the frame plate 27. A downwardly and rearwardly inclined arm of the lever 376 extends under a stud 378 secured in a forward arm 253 of a three-armed lever 231 secured on the rightward end portion of the shaft 139 so that the counterclockwise rocking of lever 376 by depression of the "Main" motor bar 291 rocks the lever 231 and shaft 139 clockwise to energize the motor and initiate a machine cycle.

The stem 297 of each of the three small motor bars 292, 293 and 294 has, at its lower end, a lateral projection 379 extending rightwardly through an individual slot in the side frame member 27. The projection 379 of the stem of the uppermost motor bar 292 is positioned above the forward end of the forward arm of a three-armed lever 381 pivotally supported on the shaft 218. The lower arm of the lever 381 extends downwardly in front of a stud 382 having a screw-threaded eccentric reduced shank passing through the upper end of the middle arm 383 of the three-armed member 231, and adjustably secured therein by a nut threaded onto the shank. When the uppermost motor bar 292 is depressed, the projection 379 on its stem rocks the lever 381 counterclockwise and, through the stud 382, rocks the member 231 and shaft 139 clockwise.

The projection 379 on the stem of the upper motor bar 293 is positioned over the forward arm of a three-armed lever 384 which is pivotally supported on the shaft 218 rightwardly of the lever 381. The lower arm of the lever 384 is positioned in front of the stud 382 so that upon depression of the upper motor bar 293, the shaft 139 is rocked clockwise.

The projection 379 of the lower motor bar 294 is positioned above the forward arm of a bell crank 385 having a small yoke portion pivotally supported immediately rightward of the side frame member 27 on a stud 386 secured in the member 27. The upper arm of the bell crank 385 is pivotally connected with the forward end of a link 387 which is pivotally connected at its rearward end to the upper arm of a two-armed lever 388 which is pivotally supported on the shaft 218 at the right of the lever 384. The lower arm of the lever 388 is positioned in front of the stud 382 so that upon depression of the lower motor bar 294, the projection 379 on its stem rocks the bell crank 385 counterclockwise pulling the link 387 forwardly and also rocking the two-armed lever 388 counterclockwise to swing the stud 382 rearwardly and rock the shaft 139 clockwise.

The shaft 139 is also rocked to initiate machine cycles by depressions of other "live" keys as disclosed in my applications Serial Nos. 85,971 and 174,696. In each cycle of operation of the machine, the main shaft 126 is rotated through one full revolution and operates various mechanisms of the machine as disclosed in my applications Serial Nos. 85,971 and 174,696, and at the completion of such rotation of the shaft 126, the cycling clutch is automatically uncoupled and the clutch control lever 142 is raised to lift its lug 143 above the latch shoulder 144 on the arm 145 which, if the shaft 139 has meanwhile returned to its normal position, will be rocked by the spring 149 to position the shoulder 144 under the lug 143 and hold the clutch uncoupled. Prior to the end of the machine cycle the lug 196 is also raised a little above its normal position but, if the shaft 139 is held in machine cycling position, will again move downwardly to initiate a further machine cycle unless prevented by various means, some of which will be described in detail hereinafter.

As disclosed in detail in my applications Serial Nos. 85,971 and 174,696, each of the small motor bars 292, 293 and 294, when depressed to initiate a machine cycle, is latched in depressed position by a latch slide 302 which is spring-urged rearwardly to engage a respective one of three latch hooks 303 projecting upwardly therefrom over a cross bar 272 in the slotted stem 297 of the depressed bar. The slide 302 has no latch hook for the "Main" motor bar 291 which is not latched in depressed position but always restores immediately when manual pressure is withdrawn therefrom.

A rod 215 is carried by the right and left upward side arms of a yoke member 217 pivotally supported on a shaft 218 journalled in the frame side plates 27 and 28. A tension spring 220 having its rear end anchored on a stud 221 secured in the plate 27 is connected at its forward end to the rod 215 to urge the yoke 217 clockwise and normally maintains a lateral lug on a downward arm 229 on the left side of the yoke 217 pressed against the rear end of a rearward arm 230 of the member 231. When the member 231 and shaft 139 are rocked clockwise to initiate a machine cycle, the lateral lug on the arm 229 of the yoke 217 is moved by the spring 220 over and above the rear end of the arm 230 to hold the member 231 and shaft 139 in the machine cycling position until near the end of the machine cycle.

The edge of a cam disk 240 secured on the shaft 126 is engaged by a follower roller 242 carried by a downwardly and rearwardly extending arm of a two-armed lever 243 pivoted on a stud 244 secured in the plate 27. The upwardly extending second arm of the lever 243 is pivotally connected to the rearward end of a link 246 which is connected intermediate its ends to the forward lower end of a tension spring 247 which is anchored at its rearward upper end to a stud 248 secured in the plate 27 and thus yieldingly maintains a raised upper edge portion of the link 246 engaged against the underside of the stud 221 and the forward end of the link 246 immediately behind a stud 250 secured in the left hand upper side arm of the yoke 217. The spring 220, furthermore, urges the lever 243 clockwise to keep the roller 242 engaged against the edge of the cam disk 240. From about the 300° point in each machine cycle, a high portion 251 of the cam 240 acts on the roller 242 to rock the lever 243 counterclockwise and thrust the link 246 forwardly. The forwardly moving link 246 engages the stud 250 and rocks the yoke 217 counterclockwise somewhat beyond its normal position and moves the lateral lug on the lower end of the arm 229 rearwardly of the rear end of the arm 230, whereupon the member 231 and shaft 139, if not otherwise impeded as, for example, by a continuing or further depression of a motor bar, will be returned counterclockwise to normal position by a tension spring 252 connected at its rear end to the forward arm 253 of the member 231 and at its forward end to a stud 254 secured in the plate 27.

Figure 7:
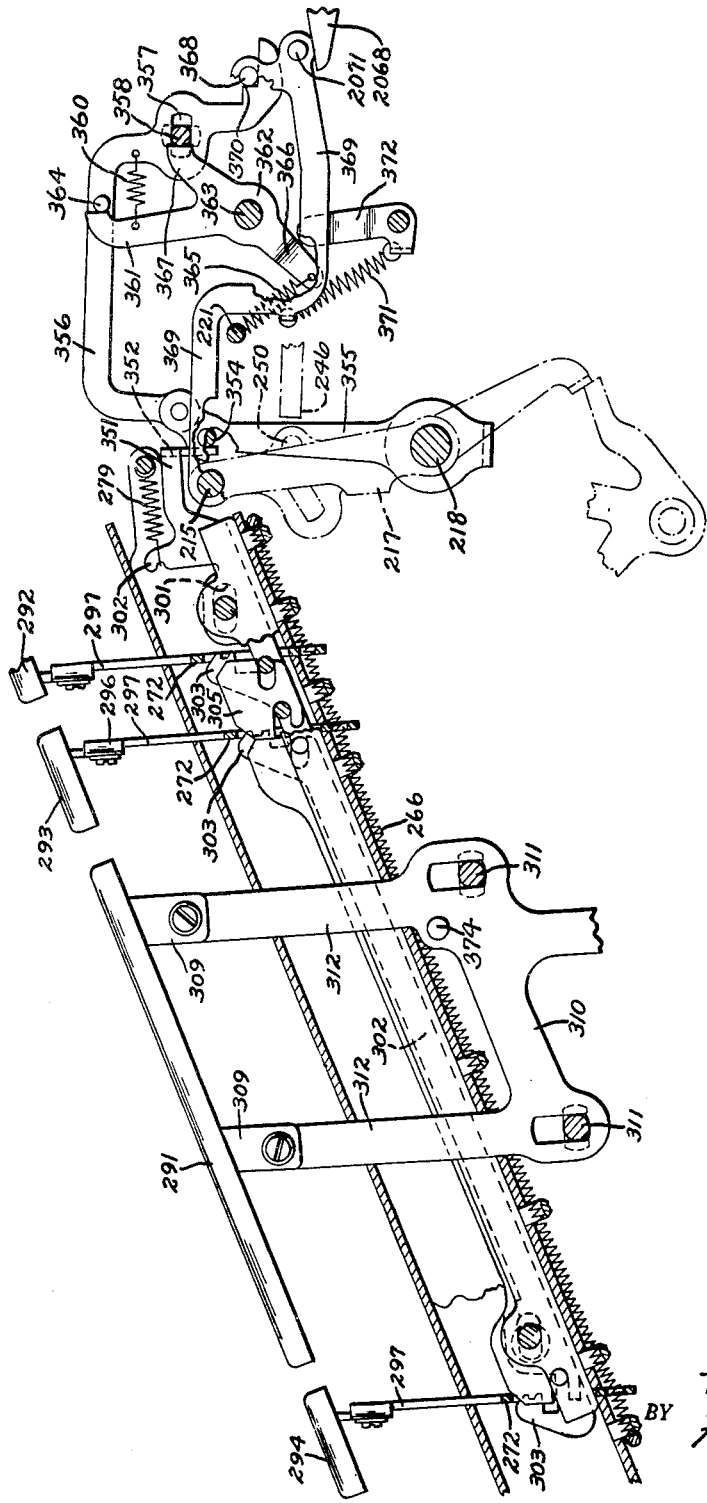
Fig. 7 is a right side elevation of the motor bars and portions of the motor bar latching and releasing means.
Figure 10:
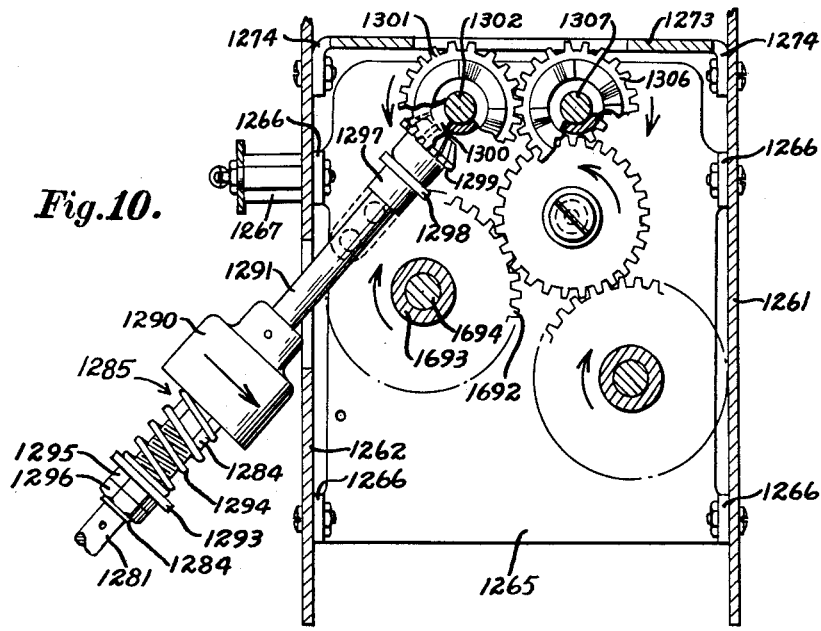
Fig. 10 is a horizontal section through the lower part of the gear box.

The small motor bar latch slide 302 has a rearward extension 351 with a laterally turned downwardly extending lug 352. It is urged rearwardly by a tension spring 279 to a normal position determined by engagement of the lug 352 against the forward side of a stud 354 (Fig. 7) carried by a lever 355 pivotally supported on the shaft 218. The upper end of the lever 355 is pivotally connected with a link 356, the rearward downwardly extending portion of which has a slot 357 through which a stud 358 secured in the plate 27 extends to support and guide the rearward portion of the link.

A tension spring 360, sufficiently strong to overcome spring 279, is connected at its rear end to the link 356 and at its forward end to an arm 361 of a three-armed lever 362 pivoted on a stud 363 secured to the side frame 27. The spring 360 normally maintains a stud 364 carried by the link 356 in contact with the arm 361. A tension spring 365 connected at its upper forward end to a stud 221 secured in the plate 27 and at its lower rear end to a downward second arm 366 of the lever 362 aids the spring 279 normally to maintain a rear upper third arm 367 of the lever 362 in contact with the fixed stud 358, whereby the latch slide 302 is normally yieldingly held in the latching position of Fig. 7. The lower rear end of the link 356 extends under a stud 368 carried by an upward extension of the rear end of a link 369 and is formed with a step or shoulder 370 in front of the stud 368. The forward end of the link 369 is pivotally mounted on the rod 215. The link 369 is urged rearwardly and its rear end is urged downwardly by a tension spring 371 connected at its forward end to a lateral lug formed on the link 369 and at its rearward end to a lateral lug on a guide arm 372 which is secured to the inner side of the plate 27 in spaced relation thereto and extends upwardly at the left of the link 369. When the yoke 217 is returned counterclockwise beyond its normal position, the link 369 is pulled forwardly and its stud 368 normally engages the shoulder 370 and pushes the link 356 forwardly so that the latter rocks the arm 355 and its stud 354 forwardly and the stud 354 acts on the lug 352 to push the slide 302 forwardly to release any latched down small motor bar 292, 293 or 294 for restoration by its restoring spring 266 at about the 315° point in machine cycle. If the member 231 and shaft 139 are held against returning to normal position by a further or a continuing depression of a motor bar or in other ways explained hereinafter, as the machine completes its cycle of operation, the machine will be operated through a further cycle.

PAPER CARRIAGE

Figure 4:
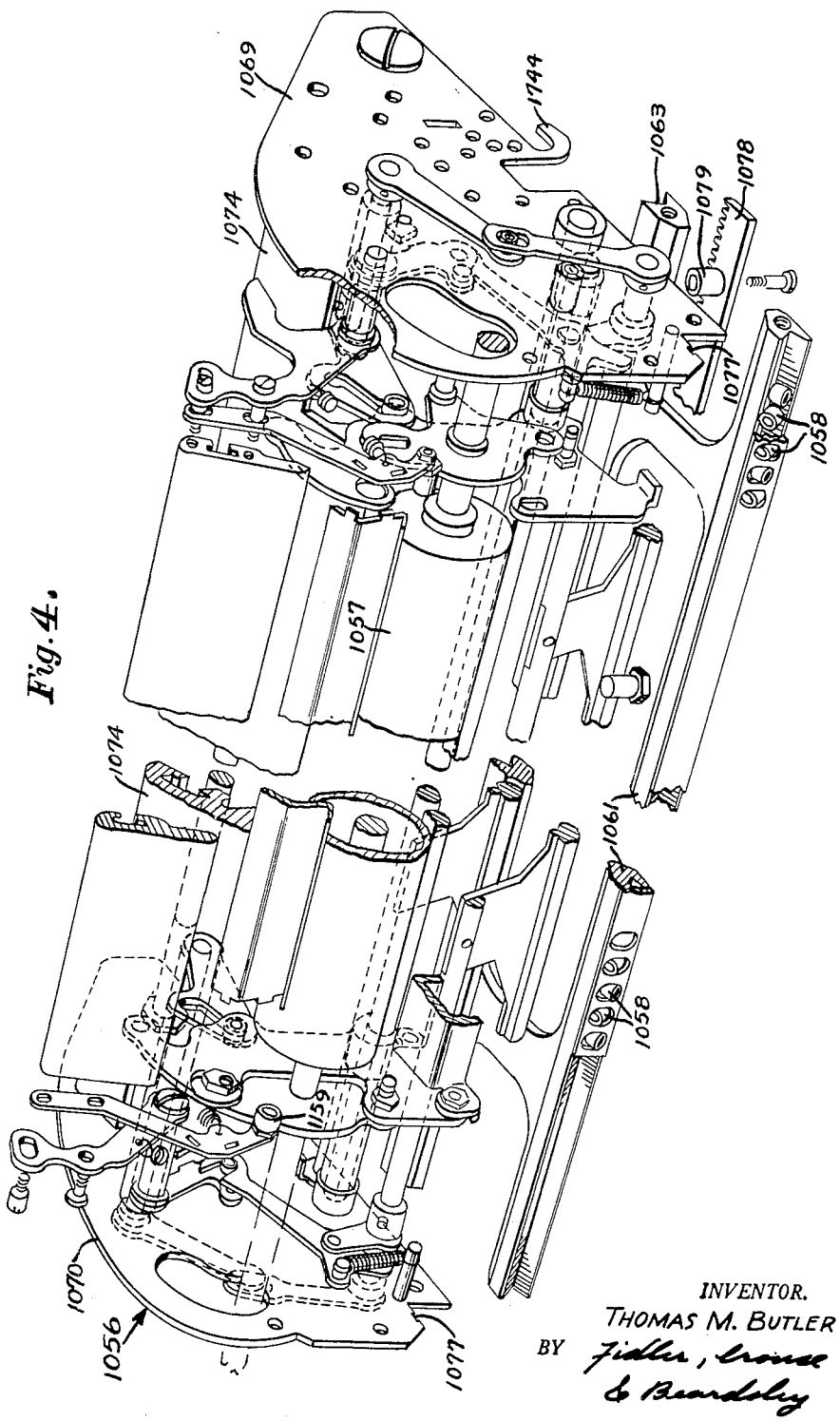
Fig. 4 is a spread perspective of portions of the paper carriage as viewed from a point forwardly, rightwardly and above.
Figure 5:
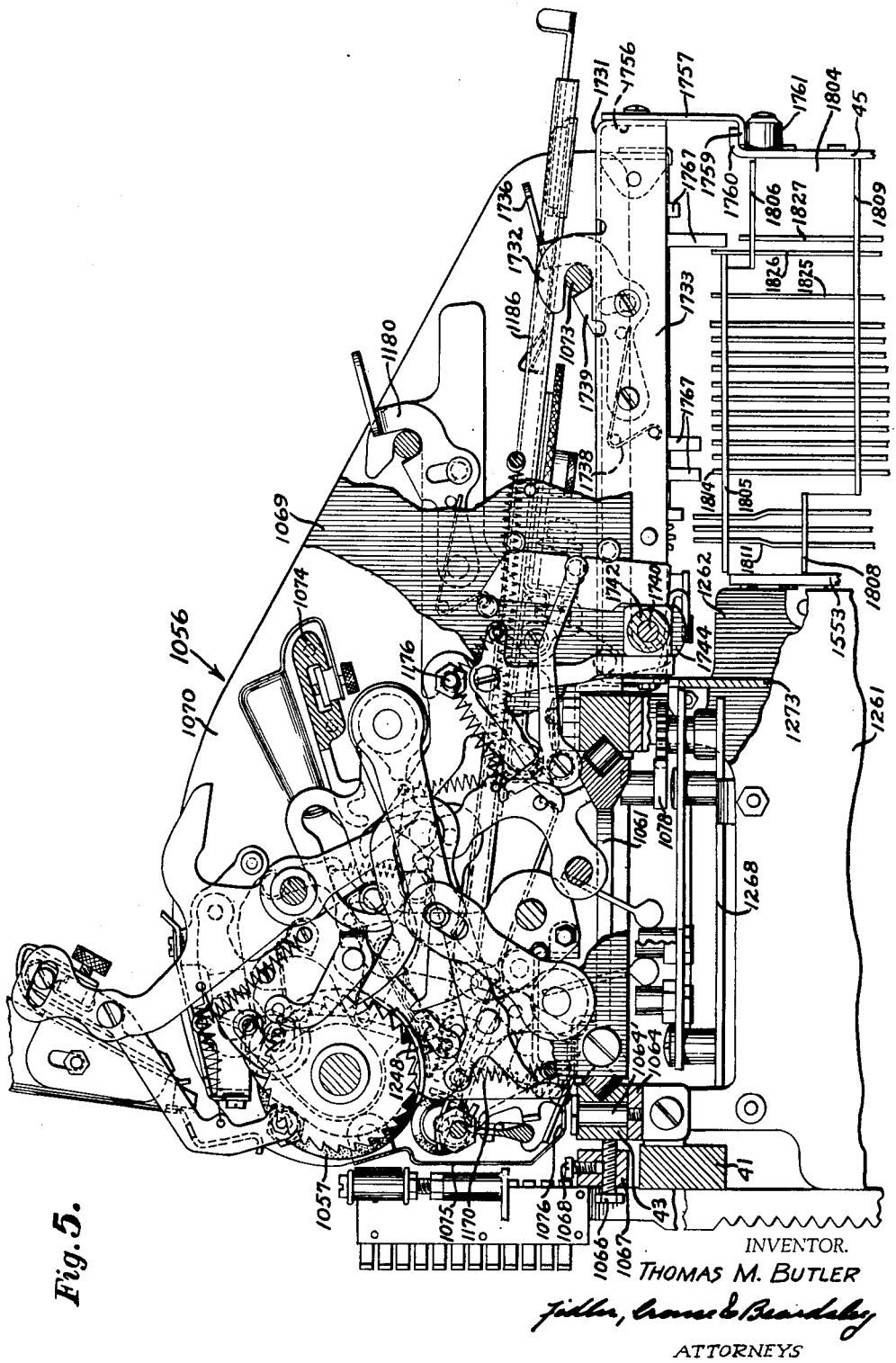
Fig. 5 is a partial section of the paper carriage and shows certain elements of the machine for operating the paper carriage and elements controlled by the paper carriage as viewed from the right.

The carriage is supported for movement transversely of the machine by two lines of bearing rollers 1058 (Figs. 4 and 5) comprising a forward line of bearing rollers 1058 located in a pair of facing 90° V-shaped grooves 1059 and 1060 (Figs. 3 and 4) formed respectively in the front stationary race rail 43 and in the front race rail of a movable race member 1061, and a rear line of bearing rollers 1058 in a similar pair of facing 90° V-shaped grooves 1062 and 1063 formed respectively in the rear stationary race rail 44 and in the rear race rail of the movable race member 1061. The front and rear race rails of the member 1061 are connected in parallel forwardly and rearwardly spaced relation by a plurality of laterally spaced connecting portions (Fig. 4). The two rails 43 and 44 are secured to the machine frame side plates 27 and 28, in forwardly and rearwardly spaced parallel relation, through the intermediary of mounting members 1064 (Fig. 3) of which there are two for each rail. Each mounting member 1064 has a laterally extended flat upper face secured against the underside of one of the rails 43 and 44 above one of the plates 27 and 28 by a headed screw passing downwardly through the rail and threaded into the mounting member. Each mounting member also has two downwardly extending ears closely fitting against opposite sides of a lug 1065 projecting upwardly from the upper edge of one of the plates 27 and 28. Each mounting member 1064 is rigidly clamped to its respective lug 1065 by a headed screw passing through the lug 1065 and both ears of the member 1064 and having a nut threaded on its projecting end.

For accurate adjustment of the spacing between the stationary race rails 43 and 44 relative to the spacing of the front and rear race rails of the member 1061 and the diameters of the rollers 1058 to obtain smooth, easy movement of the carriage, adjusting screws 1066 are threaded rearwardly through two blocks 1067 and engage at their rear ends against the rail 43 which is movable to a limited extent fore and aft on the bodies of the screws which secure it to the mounting members 1064 before the latter screws are tightened. The adjusting screws 1066 can be locked after adjustment by means of set screws 1068 threaded downwardly into the blocks 1067. Each of the blocks 1067 is secured against the inward face of a respective one of the plates 27 and 28 by means of a nut on a threaded post extending from the outward side of the block through the plate 27 or 28. The inward face of each of the plates 27 and 28 has a channel milled therein to receive a tightly fitting spline or rib formed on the outer face of the associated block 1067 to prevent rotation of the block.

Alternate rollers 1058 in each line are arranged with their axes of rotation in a plane inclined at 45° to the horizontal and at 90° to the plane of the axes of the remaining bearing rollers 1058 of the same line. To retain the rollers 1058, the ends of the grooves 1060 and 1063 are closed by portions of the carriage frame end plates 1069 and 1070 and the grooves 1059 and 1062 are closed at their ends by small plates 1071 (Figs. 2 and 3) secured to the ends of the rails 43 and 44 by screws.

The right and left carriage frame end plates 1069 and 1070 respectively (Fig. 3) have the forward parts of their lower edge portions secured to the respective ends of the movable race member 1061 by headed screws passing through the plates 1069 and 1070 and threaded into the ends of the front and rear race rails of the member 1061. The plates 1069 and 1070 are also braced and tied together by a rear cross rod 1072 (Figs. 2 and 3) having at each end a reduced portion (not shown) threaded into the inward end of a post 1073, the outer end of which is secured to the respective side plate 1069 or 1070 by means of a headed screw threaded into the post through the side plate. The plates 1069 and 1070 are further braced and tied together by a guide supporting member 1074 (Figs. 2, 3, 4 and 10) against the ends of which the plates 1069 and 1070 are secured by pairs of headed screws passing through the respective plates and threaded into the ends of the member 1074.

The carriage may be driven in either the tabulating or the return direction, that is, either leftwardly or rightwardly by a means, described in detail in the above-mentioned applications Serial Nos. 85,971 and 174,696, geared to a rack bar 1078 (Figs. 3 and 4) which extends longitudinally the full length of the carriage and is secured to the underside of the movable race member 1061 by a plurality of headed screws passing upwardly through the rack bar 1078, then through spacing collars 1079 seated against the underfaces of bosses on the underside of the member 1061 and then into threaded bores in the latter member.

Further details of the construction of the paper carriage are disclosed in my applications Serial Nos. 85,971 and 174,696.

PAPER CARRIAGE OPERATING MECHANISM

*Sub-frame (gear box)*

The motor driven mechanism for operating the paper carriage and various portions thereof, that is, for moving the carriage in both the tabulating and return directions, for opening and closing the carriage and for rotating the platen to line-space the papers thereon, is supported mainly by and largely within a box-like sub-frame referred to hereinafter, for convenience, as the "gear box."

The gear box, portions of which are shown in Figs. 3, 5, 8, 10, 20, 21, 28 and 29, comprises two spaced side plates 1261 and 1262 (Figs. 8 and 10) each of which has a front upward projection 1263 having a lug bent laterally outwardly from its upper front edge for attachment to the rear face of the frame cross member 42 as by means of a headed screw passing through the lug and threaded into the member 42. Each of the side plates 1261 and 1262 also has a rear upward projection 1264, the upper end of which is bent laterally outwardly for securement to the underside of the rear carriage race rail 44 as by means of headed screws passing through the laterally bent portions of such projections and threaded into the rail 44.

A bottom plate 1265 (Figs. 10 and 20) has on each of its lateral edges, two upturned lugs 1266 secured against the inner face of the adjacent side plate 1261 or 1262 near the bottom edge of the latter, as by means of headed screws passing through the side plate and the lugs and having nuts threaded on their ends. The head of the screw securing the left rear lug of the bottom plate to the left side plate 1262 is constituted by a post 1267.

A top plate 1268 (Figs. 8 and 20) has, on each of its side edges, front and rear bent-down lugs 1269 for securement to the inner face of the adjacent side plate 1261 or 1262 as by means of screws passing through the lugs and side plate and having nuts threaded on their ends, the heads of the three screws other than the left front one being posts 1270, 1271 and 1272 serving to support parts described hereinafter. A rear plate 1273 has on each of its side edges upper and lower forwardly bent lugs 1274 secured to the inner face of the adjacent side plate 1261 or 1262 as by headed screws passing inwardly through the side plate and lugs and having nuts threaded on their inner ends, the head of the screw in the upper left lug 1274 being a post 1275. The gear box, having no front plate, is open at its forward end.

As disclosed in my above-mentioned applications Serial Nos. 85,971 and 174,696, whenever the driving motor is running, it drives a worm gear (not shown herein) having a rightwardly extending hub 1276 (Fig. 8) having two square notches formed in its end to receive square teeth on the left end of the hub 1277 of a bevel gear 1278 rotatably mounted on the shaft 126 and held against movement longitudinally thereof between the hub 1276 and a collar 1279 on the shaft 126. The gear 1278 meshes with a bevel pinion 1280, the hub of which is secured on the leftward and forward end of a shaft 1281 extending diagonally rightwardly and rearwardly. The hub of the pinion 1280 bears against a bearing bushing 1282 in which the forward end of the shaft 1281 is journalled, the bushing 1282 being spun into a projection 1283 of the bracket 119.

Figure 11:
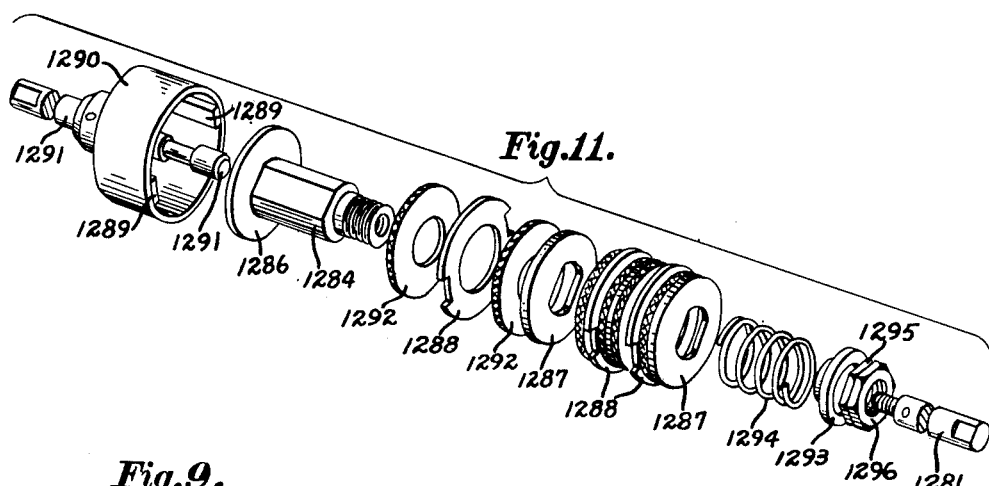
Fig. 11 is a perspective of the elements of a friction drive coupling in the driving connection leading to the gear box, showing the parts in axially spread relation.

The reduced rear end portion of the shaft 1281 (Figs. 10 and 11) is threaded into a bore in the front end of a driving member 1284 of a friction overload slip clutch 1285. The member 1284 has a disk 1286 fixed on the rear end thereof. The portion of the member 1284 immediately forward of the disk 1286 has two opposite flattened sides and has a plurality of externally circular disks 1287 with similarly shaped central openings therein slidably fitted thereon for rotation therewith. Between the disk 1286 and the rearmost disk 1287 and between each two adjacent disks 1287 is a disk 1288 which has a circular central opening and is slidable and rotatable relative to the member 1284. The otherwise circular periphery of each disk 1288 has a pair of notches to receive key strips 1289 secured, as by welding, to the inner cylindrical surface of a forwardly open hollow cylindrical housing 1290 whereby the disks 1288 may slide axially of the housing 1290 but are not rotatable relative thereto.

The rear end of the housing 1290 has a hub pinned on a shaft 1291 passing therethrough in axial alignment with the shaft 1281. Between the rearmost disk 1288 and the rear wall of the housing 1290 and between each disk 1288 and each adjacent disk 1286 or 1287 is a washer 1292 of friction material to provide a frictional coupling between such disks. The forward end of the shaft 1291 is relatively rotatably received in a bore in the member 1284, the forward end portion of which is of reduced diameter and carries a washer 1293 shouldered to provide a centering abutment for a spring 1294 compressed between the washer 1293 and the foremost disk 1287. The compression of the spring 1294 is adjusted to the desired value by a nut 1295 threaded on the reduced forward end of the member 1284 forwardly of the washer 1293 and locked in place by a second nut 1296.

The rearward portion of the shaft 1291 is journalled in a bushing 1297 spun into an opening in the upright portion of an angle bracket 1298 which extends downwardly through the bottom plate 1265 of the gear box and has its lower leg secured flat against the underside of the bottom plate 1265 as by rivets.

A bevel pinion 1299 has a hub secured on the rear end of the shaft just rearwardly of the bushing 1297 and meshes on its upper side with a bevel gear 1300 fixedly secured to a gear 1301 which is freely rotatable about a shaft 1302 journalled in bushings 1303 and 1304 (Fig. 16) spun into the top and bottom plates 1268 and 1265. The hub of the gears 1300 and 1301 bears upon a spacing sleeve 1305 which surrounds the shaft 1302 below the gear 1300 and bears on the bottom plate 1265. The gear 1301 meshes with a gear 1306 freely rotatable about a shaft 1307 journalled in bushings 1308 and 1309 spun into the top and bottom plates 1268 and 1265. The hub of the gear 1306 extends downwardly to and bears on a washer resting upon the bottom plate 1265. The portions of the shafts 1302 and 1307 immediately above the gears 1301 and 1306 are of larger diameter than the lower portions to form shoulders preventing movement of the gears upward on the shafts. Immediately below the top plate 1268, the shafts 1302 and 1307 are grooved to receive spring clips 1310 which prevent the shafts and thus also the gears 1301 and 1306 from moving upwardly.

It will be apparent from the foregoing that the gears 1300 and 1301 are driven counterclockwise and the gear 1306 is driven clockwise at all times when the motor is running.

*Carriage tabulation and return drive*

On the upper side of the gear 1306 (Fig. 16) and formed integrally therewith are four equally spaced, clockwise-facing clutch teeth 1311 adapted to cooperate with four oppositely facing clutch teeth 1312 on the lower face of a clutch member 1313 which is upwardly and downwardly slidable on the shaft 1307. The upper end portion of the clutch member 1313 is formed with two upwardly open vertically elongated slots containing rollers 1314 rotatably secured, as by a spring clip, on the two end portions of a stud 1315 extending through and secured in the shaft 1307. It will be apparent that, when the clutch teeth 1311 are engaged with the clutch teeth 1312 while the motor is running, the shaft 1307 will be driven clockwise and, through a pinion 1316 which is secured, as by spinning, on the upper end of the shaft 1307 and meshes with the rack teeth on the rear edge of the rack 1078, will drive the carriage leftwardly, that is, in the tabulating direction.

Four clutch teeth 1317 similar to the teeth 1311 but facing counterclockwise are formed on the upper side of the gear 1301 and integrally therewith. A clutch member 1318, similar to the clutch member 1313 but with four clockwise-facing clutch teeth 1319 to cooperate with the clutch teeth 1317, is axially slidably mounted on the shaft 1302 above the gear 1301 and formed with upwardly open longitudinal slots containing rollers 1320 carried by the end portions of a stud 1321 secured in the shaft 1302. A pinion 1322 secured on the upper end of the shaft 1302 also meshes with the teeth of the rack 1078 so that, whenever the clutch teeth 1317 and 1319 are engaged and the motor is running, the shaft 1302 will be driven counterclockwise and the carriage will be moved rightwardly, that is, in the return direction.

*Lateral movement of paper carriage*

The paper carriage normally is held against moving in the tabulating direction as well as in the return direction. A plurality of column stops 1323 (Figs. 8, 12, 13 and 16 to 20) are adjustably secured in predetermined positions on a squared shaft 1740 on the paper carriage in a manner described hereinafter. Normally, one or another of these stops 1323 is engaged tightly between the opposed adjacent ends of two counterstop members 1324 and 1325. The counterstop members 1324 and 1325 are formed as shown in Figs. 12, 16 and 17 and are pivotally supported near their outer ends.

Figure 15:
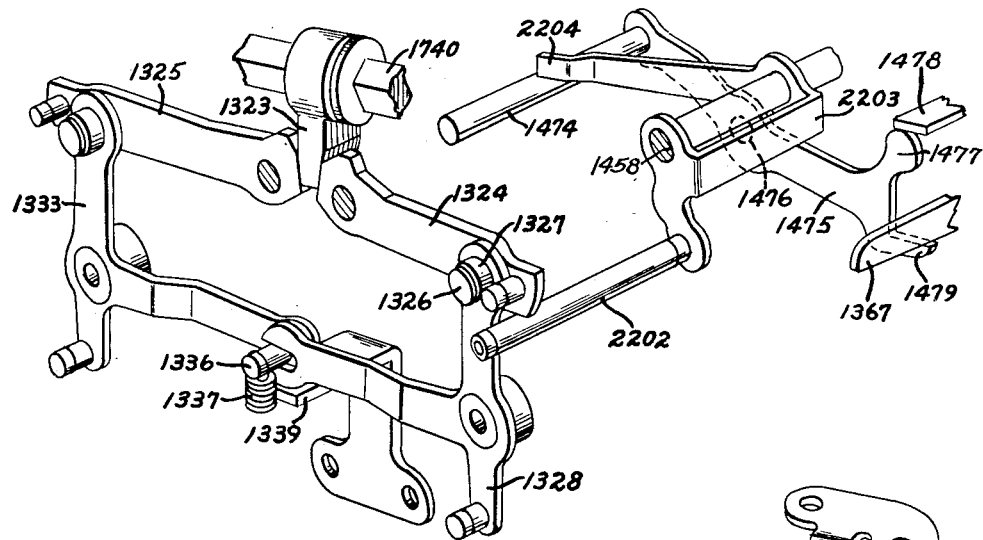
Figure 14:
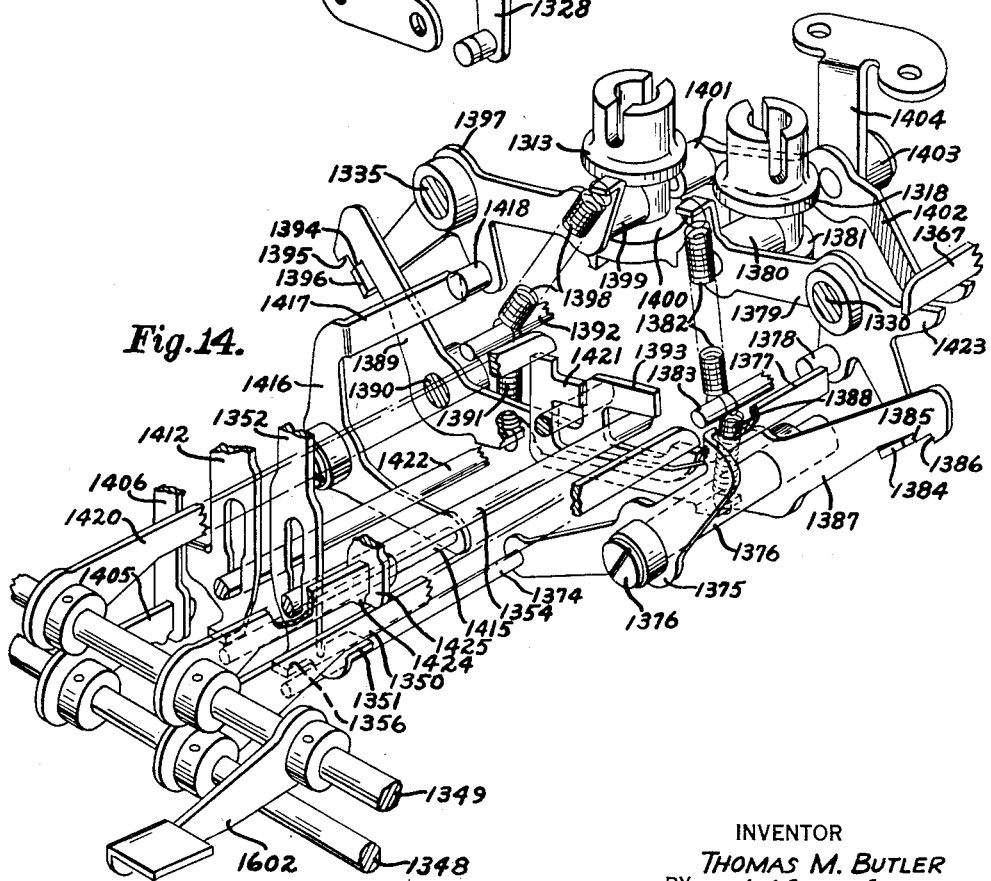

The pivotal support for the counterstop member 1324 comprises a headed stud 1326 (Fig. 12) extending through a bushing 1327 and secured in the member 1324. The bushing 1327 is secured in the upward arm of a three-armed lever 1328 in which is secured a bushing 1329 by which the lever is pivotally supported on a stud 1330, the forward end of which is secured in the gear box back plate 1273. The counterstop member 1325 is similarly supported on the plate 1273 by parts 1331 to 1335, inclusive, the assembly 1325, 1331–1335 being formed as a mirror image of the assembly 1324, 1326–1330. A stud 1336 secured in the inner end of the inwardly extending arm of the lever 1333 extends through a substantially horizontal slot in the inward end of an inwardly extending arm of the lever 1328 and is connected to the upper end of a relatively strong tension spring 1337 (Figs. 8, 15 and 19) the lower end of which is anchored on a stud 1338 secured in the plate 1273, whereby the counterstop members are strongly urged toward each other to separated positions determined by engagement of the inwardly extending arms of the levers 1328 and 1333 against a rearward lug 1339 of a bracket secured (Fig. 15) on the rear side of the plate 1273 as by headed screws.

Figure 16:
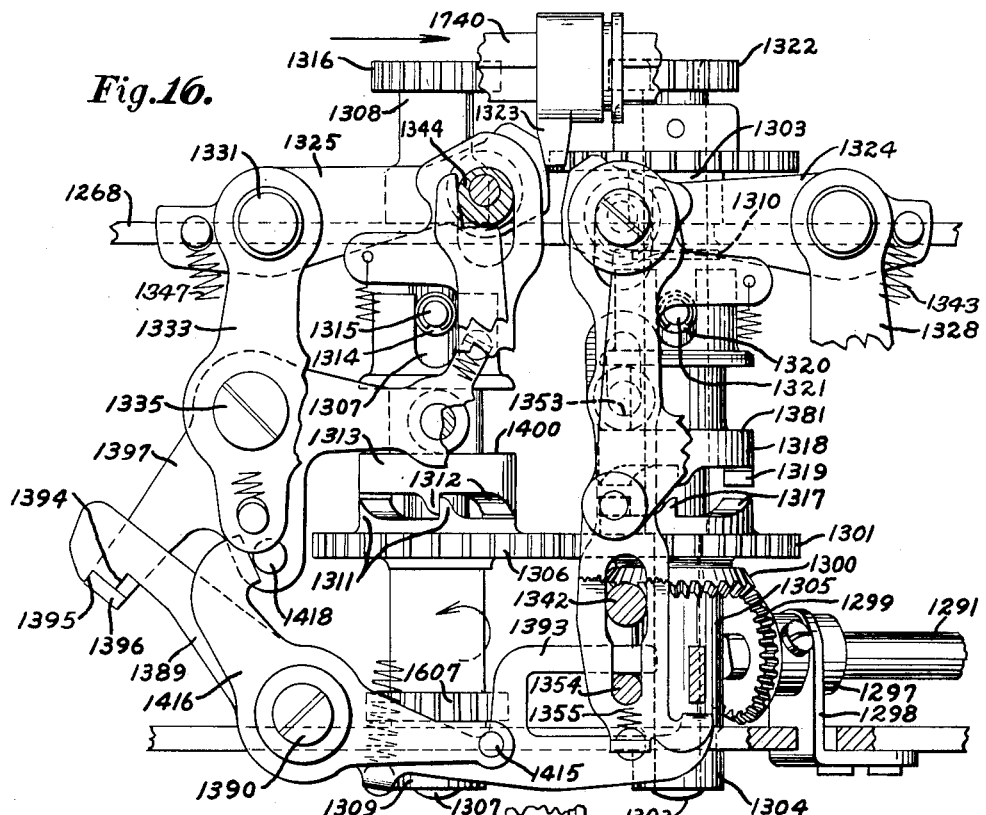
Fig. 16 is a rear elevation of the paper carriage tabulating and return clutches and control parts associated therewith, driving connections thereto and driving connections leading toward the carriage, the rear frame plate of the gear box being omitted.
Figure 17:
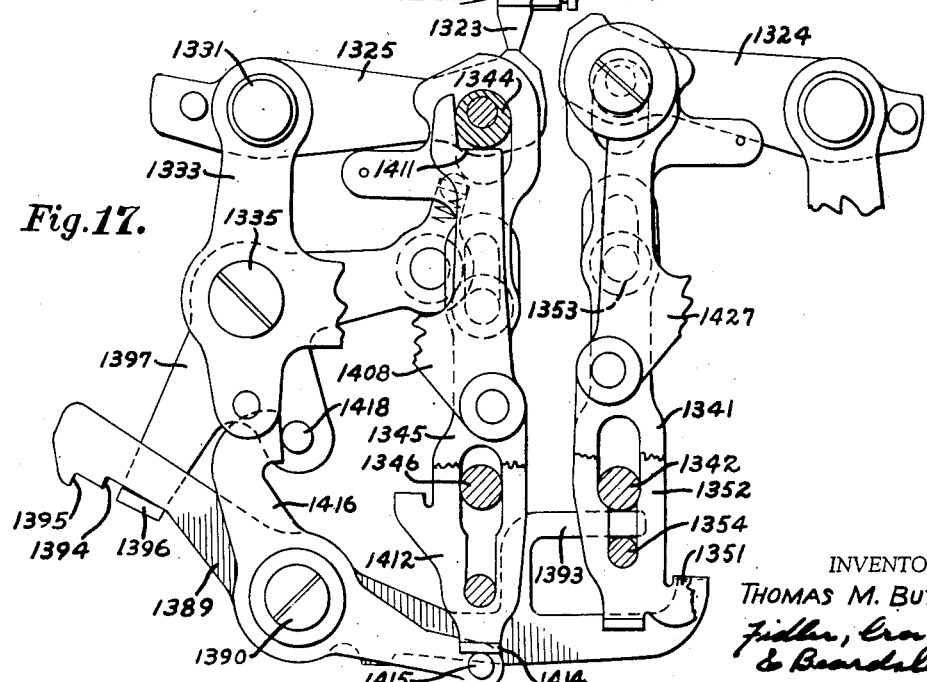
Fig. 17 is a detail showing some of the carriage movement control parts near the end of a tabulation of the carriage.

An eccentrically bored spacing sleeve 1340 (Fig. 12), similar to the sleeve 1344 shown in Figs. 12, 16 and 17 and formed with a wide flange at its rearward end, is clamped between the rear side of a bushing secured in the counterstop member 1324 near the inner end of the latter and the head of a screw threaded into the bushing. The sleeve 1340 extends through an upper vertically elongated slot in a link 1341 having also a lower vertically elongated slot through which extends a stud 1342 secured at its forward end in the plate 1273. A tension spring 1343 connected at its upper end to a stud in the outer end of the counterstop member 1324 and at its lower end to a stud in a downward arm of the lever 1328 normally holds the inner end of the member 1324 upwardly at a limit determined by engagement of the sleeve 1340 and stud 1342 with the far ends of the slots in the link 1341. The inner end of the counterstop member 1325 is also normally held at an upward limit position (Fig. 12) by similar parts 1344 to 1347, inclusive.

The column stops 1323 have a tapered cross section transversely of the machine, narrowing somewhat toward their lower ends, and the upper portions of the inner end faces of the counterstops 1324 and 1325 have complementary inclinations.

To cause the motor to move the carriage in either the tabulating or the return direction, it is necessary to lower the counterstop 1324 or the counterstop 1325 and to couple the clutch 1311, 1312 or the clutch 1317, 1319, depending upon the desired direction of movement of the carriage, and to close the motor switch. These functions are performed by means including two shafts 1348 and 1349 (Figs. 8, 12, 14 and 20) rotatably supported, one above the other, in openings in the lower rear end portions of the side plates 1261 and 1262 of the gear box. Counterclockwise rocking of the shaft 1348 brings about a tabulation of the paper carriage and a counterclockwise rocking of the shaft 1349 brings about a return of the carriage.

*Tabulation*

An arm 1350 (Fig. 12) rigidly secured on a hub pinned on the shaft 1348 extends forwardly over a lug 1351 on the left side of the lower end of a link 1352 positioned against the forward side of the link 1341 and having an upper vertically elongated slot receiving a headed stud 1353 (Figs. 16, 17 and 19) secured in the link 1341 and a lower vertically elongated slot (Figs. 12, 14, 16, 17 and 19) through which passes the stud 1342 as well as a stud 1354 secured at its rear end in the lower end of the link 1341. A tension spring 1355 (Fig. 12) which is anchored at its upper end on the rear end of the stud 1342 and connected at its lower end to a rearwardly turned lug 1356 on the lower end of the link 1352, normally urges the link 1352 to the upper limit of its movement relative to the stud 1342 and thus also normally urges the arm 1350 and the shaft 1348 to their normal positions.

An arm 1357 (Fig. 20) secured on a hub pinned on the left end of the shaft 1348 has a hook-shaped forward end portion overlying a stud 1358 secured in and extending leftwardly from the rear end of the right side arm 1359 of a yoke 1360 pivotally supported on a stud 1361 secured in the plate 1262. The lower end of a tension spring 1362, referred to again hereinafter, is connected to the stud 1358 and so normally urges the arms 1357 and 1359, and the shaft 1348, to their normal positions. The arm 1359 also carries a stud 1364 extending leftwardly immediately in front of a downward cam arm 1365 of a three-armed lever 1365, 1366, 1367, secured on a hub rotatably supported on a stud 1368 secured in the left side plate 1262 of the gear box. The forward arm of the lever 1367 carries a stud 1369 connected to the lower end of a tension spring 1370 which is connected at its upper end to a lug on a lever 1371 also pivoted on the stud 1368, whereby the lower edge of the lever 1371 is normally yieldingly held against the stud 1369. A tension spring 1372 lighter than the spring 1370 is hooked at its opposite ends in an eye in the lever 1371 and in an eye in the plate 1268 and urges the levers 1371 and 1367 clockwise without separating the lever 1371 from the stud 1369. The forward end of the lever 1371 overlies an inwardly turned lug 1373 on the lower edge of the arm 153 of the switch-closing yoke 154 previously described.

It will be apparent that when the shaft 1348 and arm 1357 are rocked counterclockwise, the yoke 1360 will be rocked clockwise and the three-armed lever 1365, 1366, 1367 and the lever 1371 will be rocked counterclockwise so that the switch-closing yoke 154 will be rocked to switch-closing position if it is not already in that position. Also during the counterclockwise rocking of the shaft 1348, the arm 1350 first depresses the link 1352 relative to the link 1341 so that the lug 1356 pushes downwardly a stud 1374 (Fig. 14) secured in the rightward arm of a bell crank 1375 secured on a hub rotatable on the rear end of a shouldered headed screw 1376 threaded into a stud secured in the plate 1273. The other arm of the bell crank has a forwardly extending lug 1377 which moves rightwardly against a stud 1378 secured in a short downward arm of a four-armed lever 1379 secured on a hub rotatable on the stud 1330 forwardly of the lever 1328. A rightwardly extending arm of the lever 1379 carries a headed stud supporting a roller 1380 which lies in a circumferential groove 1381 in the clutch member 1318 of the carriage return clutch, whereby the early portion of the counterclockwise movement of the shaft 1348 will raise the clutch member 1318 to uncouple the carriage return clutch 1317, 1319 if that clutch is not already in uncoupled condition.

A tension spring 1382, connected at its upper end to a rearward lug on the rightward end of the rightward arm of the lever 1379 and at its lower end to a stud 1383 secured in and projecting rearwardly from the plate 1273, urges the lever 1379 to lower the clutch member 1318 to coupled position. However, when the lever 1379 is in its normal position in which the clutch 1317, 1319 is uncoupled, a rearward lug 1384 on a downwardly and leftwardly inclined arm of the lever 1379 is held against movement by the spring 1382 by the rightward one, 1385, of two shoulders 1385 and 1386 on the leftward end of the underside of the left arm of a lever 1387 secured on a bushing rotatably supported on the stud 1376 forwardly of the bell crank 1375. A tension spring 1388, connected at its upper end to the stud 1333 and at its lower end to a lug turned forwardly from the lower edge of the rightward arm of the lever 1387, normally holds the leftward arm of the lever 1387 pressed against the lug 1384 so that when the lever 1379 is rocked to uncouple the carriage return clutch 1317, 1319, the lever 1379 is latched in the uncoupling position.

While arm 1350 is rocking the bell crank 1375 and the lever 1379 to insure that the carriage return clutch is latched in uncoupled position, the forward end of the arm 1350 engages and partially depresses the upturned leftward end of a carriage tabulating clutch latching lever 1389 (Fig. 14) which is secured on a hub rotatably supported on a stud 1390 secured in the plate 1273. The latch lever 1389 is urged clockwise by a tension spring 1391 which is connected at its lower end to a lug turned forwardly from the lower edge of the leftward arm of the latch lever 1389 and at its upper end to a stud 1392 secured in and projecting rearwardly from the plate 1273. The initial portion of the counterclockwise rocking of the latch lever 1389 causes a lug 1393 thereon, extending upwardly and leftwardly immediately above the forward portion of the stud 1354, to pull the stud 1354 and thus also the link 1341 and the rightward end of the counterstop 1324 downwardly until the latter is below the path of the column stops 1223.

Thereafter, further counterclockwise rocking of the latch lever 1389 by the arm 1350 causes the leftward one, 1394, of two shoulders 1394 and 1395 on the lower edge of the rightward arm of the latch lever 1389 to be disengaged from a rearward lug 1396 on the end of a rightwardly downwardly inclined arm of a three-armed carriage tabulating clutch-operating lever 1397 which is secured on a hub rotatably supported on the stud 1335 forwardly of the lever 1333. Thereupon, a tension spring 1398, connected at its lower end to the stud 1392 and at its upper end to a rearward lug on the leftwardly extending arm of the lever 1397, rocks the lever 1397 counterclockwise so that a roller 1399 supported on a headed stud secured in the leftward arm of the lever 1397 and engaging in a circumferential groove 1400 in the clutch member 1313 lowers the latter member to couple the clutch 1311, 1312.

It should be noted that as long as the carriage tabulating clutch 1311, 1312 remains coupled, the counterstop 1324 remains held below the path of the column stops 1323 because the lug 1396 on the lever 1397 holds the lever 1389 in its counterclockwise position so that the lug 1393 holds the stud 1354 depressed.

Within the groove 1400 of the clutch member 1313 and diametrically opposite the roller 1399 is another roller 1401 (Fig. 14) rotatably mounted on a headed stud secured in the rightward arm of a lever 1402 which is secured on the shank of a headed stud 1403 rotatably held in a bushing secured in a downward arm of a bracket 1404. The bracket 1404 is secured to the underside of the top plate 1268 of the gear box by two rivets, one of which is constituted by the lower end portion of a stud shaft 1434 hereinafter described. A leftwardly and rearwardly directed arm of the lever 1402 underlies the rearward arm 1367 of the three-armed lever 1365, 1366, 1367. Whenever the carriage tabulating clutch 1311, 1312 is coupled, the lever 1402 is rocked clockwise to insure that the three-armed lever 1365, 1366, 1367 will keep the motor switch closed as long as the clutch 1311, 1312 remains coupled.

It will be apparent that restoration of the carriage tabulation control shaft 1348 clockwise to its normal position will neither uncouple the tabulating clutch 1311, 1312 nor release the motor switch for return to open position. However, means are provided to stop the carriage in the first columnar position which it reaches after the tabulation control shaft is returned to its normal position.

A second forwardly extending arm 1405 (Figs. 12 and 14) is secured upon a hub pinned to the shaft 1348. The forward end of the arm 1405 is engaged in an aperture in the lower end of a link 1406 in the upper end of which is secured a stud 1407 which passes through a vertically elongated slot in the rightward arm of a pawl 1408, the stud being retained in the slot as by a spring clip engaged in a circumferential groove in the free end portion of the stud. The pawl 1408 is pivotally supported on a headed stud 1409 secured in the link 1345 and is urged counterclockwise by a light tension spring 1410 which is connected between the rightward arm of the pawl 1408 and a rightwardly projecting ear on the upper portion of the link 1345, whereby the spring 1410 normally holds the vertical edge of a right-angled notch in the upper end of an upward arm of the pawl 1408 against the sleeve 1344 and positions a shoulder 1411, formed by the lower edge of the notch, under the sleeve 1344.

When the shaft 1348 and arms 1350 are rocked counterclockwise to cause a tabulating movement of the paper carriage, the arm 1405 pulls the link 1406 downward and rocks the pawl 1408 clockwise to remove the shoulder 1411 from under the sleeve 1344. Thus, as long as the shaft 1348 remains in tabulating position and holds the counterstop 1324 below the path of the column stops 1323, successive stops 1323 can ride over the inclined upper edge of the counterstop 1325, and each such column stop 1323 will depress the inner end of the counterstop 1325 and reciprocate the sleeve 1344 in the upper vertical slot in the link 1345 without moving the link 1345.

When the tabulation control shaft 1348 and arms 1350 and 1405 are returned to normal, the spring 1410 returns the shoulder 1411 to its normal position under the sleeve 1344 though the counterstop 1324 remains latched out of the path of the column stops 1323 while the tabulating clutch 1311, 1312 remains coupled. Thereafter, the next column stop 1323 which depresses the inward end of the counterstop 1325 as the carriage tabulation continues, also depresses the pawl 1408 and thus also the link 1345 as well as a link 1412 which has a formation similar to a mirror image of the link 1352 and is connected with the link 1345 in the same manner as the link 1352 is connected with the link 1341. A spring 1413, connected at its upper end to the stud 1346 and at its lower end to a lug 1414 on the lower end of the link 1412, urges the latter to an upper position against the fixed stud 1346.

As the link 1412 is lowered, the lug 1414 on the lower end thereof depresses a stud 1415 (Fig. 14) secured in the inward arm of a bell crank 1416 secured on a hub pivotally supported on the stud 1390 rearward of the lever 1389. The bell crank 1416 is thereby rocked counterclockwise so that a lug 1417 extending forwardly from its upward arm acts upon a stud 1418 secured in the downward arm of the tabulating clutch-operating lever 1397 to rock the latter clockwise to raise the clutch member 1313 to uncouple the tabulating clutch 1311, 1312. As the clutch member 1313 is raised, the lever 1402 is returned to normal and the spring 1372 (Fig. 20) returns the levers 1367 and 1371 to normal to permit the motor switch to be opened by its spring.

As the tabulating clutch-operating lever 1397 is returned to normal position, the lug 1396 thereon clears the shoulder 1394 on the lever 1389 which is then rocked by its spring 1391 to relatch the lever 1397 in uncoupling position as well as to permit the stud 1354, the link 1341 and the inward end of the counterstop 1324 to return upward to normal position where the counterstop 1324 engages the same column stop 1323 which has uncoupled the tabulating clutch 1311, 1312, and arrests the carriage in the new columnar position. Immediately such column stop 1323 clears the counterstop 1325, the latter is swung upward by its spring 1347 into position on the right side of the column stop.

It will be apparent that when the shaft 1348 is rocked counterclockwise and immediately returned to normal, the carriage tabulation thus initiated will continue only until the next column stop 1323 arrives between the inward ends of the counterstops 1324 and 1325 so that the carriage will be tabulated by only one column width, although the paper carriage can be skip-tabulated across any number of adjacent columns by merely holding the tabulating control shaft 1348 in tabulating position until the column stop 1323 for each columnar position which is to be skipped has moved past the inner end of the counterstop 1324.

Return

Return of the paper carriage toward the right is effected in a similar way under control of the carriage return control shaft 1349. An arm 1419 (Fig. 20) secured on a hub pinned on the left end of the shaft 1349 has a hook-shaped forward end overlying the stud 1358 so that the spring 1362 normally serves also to urge the shaft 1349 to its normal position and, when the shaft 1349 is rocked counterclockwise, the motor switch is closed, if not already closed, in the same manner as when the shaft 1348 is rocked counterclockwise. Another arm 1420 (Figs. 12 and 14), secured on a hub pinned on the shaft 1349, extends forwardly over a forwardly bent lug on the right side of the link 1412 whereby the arm 1420 and shaft 1349 are also normally urged to their normal positions by the spring 1413. When the shaft 1349 and arm 1420 are rocked counterclockwise from their normal positions of Fig. 12, the link 1412 is depressed and the lug 1414 thereon depresses the stud 1415 (Fig. 14) and rocks the bell crank 1416 counterclockwise to insure that the tabulating clutch member 1313 is latched in uncoupled position by the shoulder 1394 on the latch lever 1397.

Simultaneously, the forward end of the arm 1420 engages and depresses the upturned end of the right-hand arm of the latch lever 1387. A lug 1421 on the right-hand end of the lever 1387 overlies a stud 1422 secured in the link 1345 so that the clockwise rocking of the lever 1387 pulls the link 1345 downwardly to lower the inward end of the counterstop 1325 below the path of the column stops 1323. Further clockwise rocking of the lever 1387 by the arm 1420 disengages the shoulder 1385 of that lever from the lug 1384 of the return clutch-operating lever 1379 which is thereupon rocked by the spring 1382 to lower the clutch member 1318 to couple the return clutch 1317, 1319 and to hold the latch lever 1387 in its rocked position so that the latter will hold the stud 1422, the link 1345 and the leftward end of the counterstop 1325 in their lowered positions as long as the carriage return clutch remains coupled. As the lever 1379 rocks to couple the return clutch 1317, 1319, an arm 1423 thereof extending leftwardly under the rear portion of the motor switch control lever 1367 moves upwardly to insure that the lever 1367 will remain in switch-closing position as long as the return clutch 1317, 1319 remains coupled.

An arm 1424 (Fig. 14) secured to a hub pinned on the shaft 1349 engages in an aperture in the lower end of a link 1425 secured at its upper end to a stud 1426 (Fig. 12) passing through a vertically elongated slot in the leftward arm of a pawl 1427 pivoted on a headed stud 1428 secured in the link 1341. As the shaft 1349 and arm 1424 are rocked counterclockwise, the pawl 1427 is rocked counterclockwise to remove a shoulder 1429 on the upward arm thereof from beneath the sleeve 1340 against the tension of a spring 1430 which is connected between the leftward arm of the pawl 1427 and a leftwardly projecting ear of the link 1341. The spring 1430 normally yieldingly holds a vertical edge of the pawl 1427 at the left of the shoulder 1429 against the side of the sleeve 1340 to normally position the shoulder 1429 under the sleeve.

While the return control shaft 1349 remains in its carriage-returning position, successive column stops 1323, as they ride over the counterstop 1324, can depress the inward end of the latter without depressing either of the links 1341 and 1352. However, when the shaft 1349 is permitted to return to normal, the spring 1430 rocks the pawl 1427 clockwise to replace the shoulder 1429 under the sleeve 1340 so that when the rightward end of the counterstop 1324 is next depressed by a column stop 1323, the links 1341 and 1352 are thereby also depressed so that the lug 1356 depresses the stud 1374 (Fig. 14) and rocks the bell crank 1375 clockwise to restore the return clutch-operating lever 1379 to its normal latched position and open the clutch 1317, 1319.

The return of the lever 1379 and its arm 1423 also permits the switch control levers 1367 and 1371 to be restored by the spring 1372 and the switch to be opened by its spring. The return of the lever 1379 further permits the lever 1387 to return counterclockwise to permit the stud 1422 and link 1345 to rise so that the inward end of the counterstop 1325 can move up on the right-hand side of the column stop 1323 which depresses the link 1341. As soon as the column stop 1323 clears the inward end of the counterstop 1324, the latter is rocked by its spring 1343 to move up on the left side of the column stop 1323 so that the carriage is again held accurately in the desired columnar position.

Carriage decelerating means

It will be appreciated that the spring 1337 can cushion the arrest and rebound of the carriage at the ends of both tabulating and return movements of the carriage as it yieldingly permits outward movements of the counterstops 1324 and 1325 and rocking of the levers 1328 and 1333. However, additional means are provided to smoothly and quietly decelerate the carriage in the final portion of each tabulating and return movement and reduce rebound to a minimum.

Figure 9:
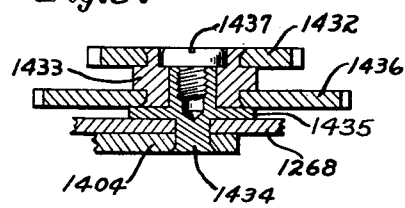
Fig. 9 is a detail section illustrating the mounting of two gears of Fig. 8.

A gear 1431 (Fig. 8) having a hub pinned to the shaft 1302 below the pinion 1316, meshes with a gear 1432 spun onto the upper end of a hub 1433 rotatable on a stub shaft 1434 (Fig. 9) secured in the top plate 1268. The stub shaft 1434 has a thin annular flange 1435 abutting the upper face of the plate 1268 and serving as a spacer between the plate 1268 and a gear 1436 which is spun onto the lower end of the hub 1433 and is, therefore, rigid with the gear 1432. The lower end of the stub shaft 1434 passes through both the top plate 1268 and the left-hand aperture in the head of the bracket 1404 and is headed over to serve as a rivet for securing the bracket to the underside of the plate 1268. A headed screw 1437 threaded into the upper end of the stub shaft 1434 secures the hub 1433 of the gears 1432 and 1436 rotatably on the stub shaft. The lower gear 1436 meshes with a pinion 1438 which is pinned to the upper end of a short shaft 1439, which is journalled in a bushing 1440 (Fig. 20) secured in a leftwardly extending portion of the top plate 1268, the lower end of the shaft 1439 having a flange or head which, together with the pinion 1438, rotatably secures the shaft 1439 in the bushing 1440. A brake disk 1441 is secured on a very short hub on the upper end of the pinion 1438.

It will be seen that the brake disk 1441 is driven by the paper carriage rack 1078 through a speed multiplying gearing so as to be rotated at a relatively high speed whenever the paper carriage is moving in either direction. The disk 1441 is formed on its underside with an accurately flat annular smooth face engageable by friction elements 1442 (Fig. 20) secured in metal cups 1443 secured, as by riveting, upon inwardly turned lugs on forward and rearward arms of a slide 1444. The slide 1444 is formed with three vertically elongated slots by which it is vertically slidably mounted upon shouldered portions of the posts 1267 and 1275 and upon the stud 1368. The slide 1444 is retained upon the posts 1267 and 1275 and upon the stud 1368 by headed screws, 1445, 1446 and 1447, respectively. The screw 1447 threaded into the stud 1368 has a grooved stud on its head serving as an anchor for the upper end of a tension spring 1448, the lower end of which is connected to a stud 1449 secured in a lower portion of the slide 1444 which is thereby normally urged upwardly. The slide can be latched in a lowered position by a latch yoke 1450 pivotally secured, as by a headed screw, upon the post 1272. The latch yoke 1450 is normally urged clockwise both by the previously-mentioned tension spring 1362 which is connected at its upper end to a stud 1451 in a rearward arm of the yoke 1450 and by another tension spring 1452 which is connected at its upper end to the stud 1451 and at its lower end to a stud integral with the head of the screw 1445.

The slide 1444 is normally in its upper position where the friction elements 1442 are pressed against the brake disk 1441 to frictionally resist movement of the paper carriage in either direction. However, a stud 1453 overlying a horizontal upper edge of a lower portion of the slide 1444 is secured in the left rearward arm of the yoke 1360 so that whenever either of the shafts 1348 and 1349 is rocked counterclockwise to bring about either a tabulating or a return movement of the paper carriage, the stud 1453 is lowered and depresses the slide 1444 to a brake-releasing position where a shoulder 1454 on the downward arm of the latch yoke 1450 can move forwardly above a rightwardly turned lug 1455 on the slide 1444 to latch the slide in its lower brake-releasing position.

Figure 18:
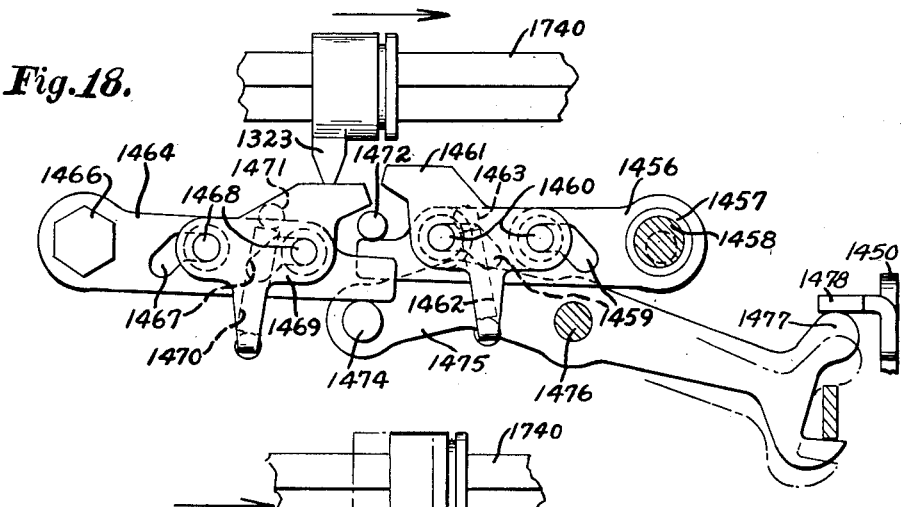
Fig. 18 is a detail of certain parts controlling the carriage decelerating means, showing the parts in the positions they have near the end of a carriage tabulating movement.
Figure 19:
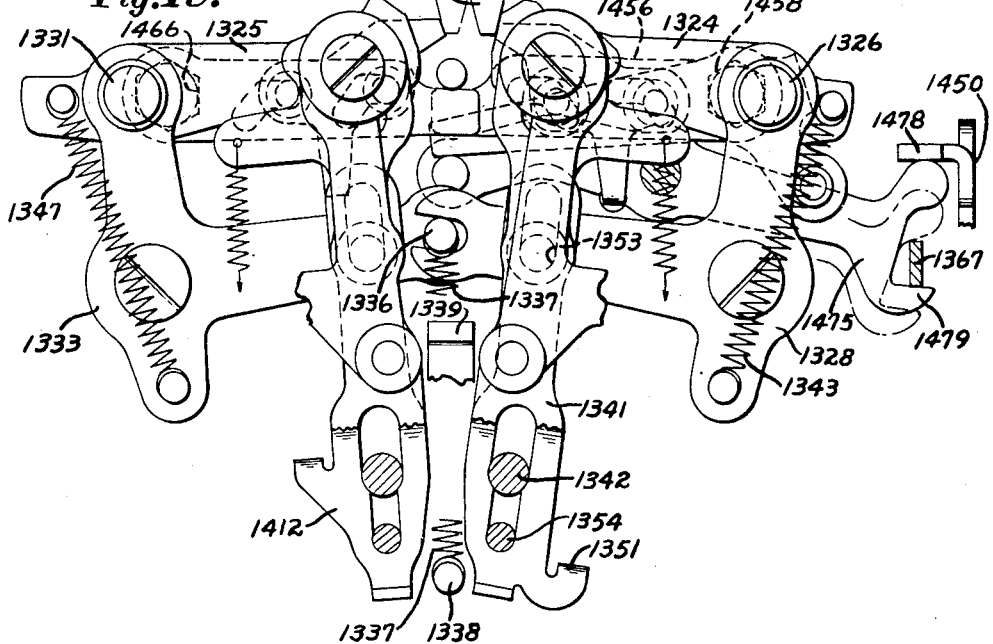
Fig. 19 is a rear elevation of certain of the carriage movement controlling parts illustrating the arrest of the paper carriage prior to rebound thereof.

The leftward end of an arm 1456 (Figs. 13, 18 and 19) is secured upon a hub 1457 rotatable upon a stud 1458 which has an eccentric threaded shank passing through the gear box back plate 1273 and secured in rotary adjusted position in the plate 1273 by a nut threaded on the end of the shank. The arm 1456 has two angular slots 1459 therein which are formed as shown in Fig. 18 and each of which receives a respective one of two headed studs 1460 secured in a cam slide 1461 which is formed as shown most clearly in Fig. 13. The cam slide 1461 is urged upwardly and rightwardly to the normal position relative to the arm 1456, as also shown in Figs. 13 and 18, by a tension spring 1462 connected at its lower end to the forwardly turned end of a lug extending from the lower edge of the cam slide 1461 and at its upper end to a stud 1463 secured in the plate 1273.

Another assembly 1464–1471, which is formed and arranged substantially as a mirror image of the assembly 1456 to 1463, is mounted at the right of the latter assembly with the arm 1464 slightly farther rearward than the arm 1456 so that the inward ends of the arms 1456 and 1464, located one in front of the other, are both normally held by the springs 1462 and 1470, respectively, against the underside of a stud 1472 secured in the plate 1273. However, short spacing sleeves 1473 on the studs 1460 between the arm 1456 and the cam slide 1461 position the cam slide 1461 in the same transverse vertical plane as the cam slide 1469. A stud 1474 which extends rearwardly through an opening in the plate 1273 and under the inner ends of both of the arms 1456 and 1464 is secured in the rightward end of a two-armed lever 1475 located forwardly of the plate 1273 and pivoted on a stud 1476 secured in the plate 1273. The leftward end of the lever 1475 has a projection 1477 underlying a horizontally inwardly turned portion 1478 of the latch yoke 1450 (see also Fig. 20).

When, during a tabulating movement of the carriage, a column stop 1323 approaches the position shown in Fig. 18, it acts on the cam 1469 and depresses the arm 1464. Likewise, during a return movement of the carriage, one or more column stops 1323 will act on the cam 1461 to depress the arm 1456. In either case, the stud 1474 will be depressed and the lever 1475, in rocking clockwise, will rock the latch 1450 counterclockwise to remove the shoulder 1454 from the lug 1455 of the slide 1444. If the shaft 1348 is held in tabulating position or if the shaft 1349 is held in carriage return position, the stud 1453 will prevent the slide 1444 from rising to engage the friction elements 1442 against the carriage decelerating brake disk 1441 and, as the column stop 1323 passes off of the cam slide 1469 in carriage tabulation or off of the cam slide 1461 in return of the carriage, the stud 1474 will be raised again and the latch shoulder 1454 will return to latching position over the lug 1455 under the influence of the springs 1452 and 1362. When, however, a column stop 1323 depresses either of the levers 1456 or 1464 and trips the latch 1450 while both shafts 1348 and 1349 are in their normal positions, the released slide 1444 is moved into braking position by the spring 1448 and the carriage is very quickly decelerated, regardless of the direction in which it is moving. It should also be noted that, while either of the arms 1456 and 1464 is held depressed by a column stop 1323, a lower lug 1479 on the left end of the lever 1475 will hold the arm 1367 in switch-closing position to insure completion of the carriage movement.

A column stop 1323, after passing off of the cam slide 1469 during carriage tabulation, will strike the rightward end of the cam slide 1461 and move the slide leftward. During such movement, the studs 1460 move first through the horizontal portions of the slots 1459 and then downward in the inclined portions of those slots whereby the slide 1461 is lowered sufficiently to permit the column stop 1323 to pass on over the slide 1461 if the column stop is not arrested by the counterstop 1324. Likewise, during carriage return, a column stop 1323 not arrested by the counterstop 1325 can pass on over the cam 1469 after moving it laterally. The cams 1461 and 1469 thus act as pass-by cams, so that the arm 1456 is not depressed by the column stops 1323 during carriage tabulation and the arm 1464 is not depressed by column stops 1323 during carriage return. Thus, the carriage decelerating brake will not be applied to check the carriage movement if the shaft 1348, during carriage tabulation, or the shaft 1349, during carriage return, should be restored to normal position immediately after a column stop 1323 has passed off of one of the cams 1461 or 1469 and while it is still above the other of said cams.

*Stopping carriage at extreme limits of lateral movements*

In the event that either the carriage tabulation control shaft 1348 or the carriage return control shaft 1349 is held counterclockwise in the tabulating or return position until after the last column stop 1323 at the right or the left has passed over the inner end of the counterstop 1325 or 1324, respectively, the coupled clutch 1311, 1312 or 1317, 1319 will nevertheless be uncoupled and the carriage will be arrested at the limit of its permitted movement.

A bracket 1480 (Fig. 21) secured to the inner side of the left-hand side plate 1070 of the carriage, as by screws, has a downwardly inwardly inclined and then rearwardly bent arm with a forwardly rebent portion 1481, the narrow forward part of which cooperates with the cam 1461 and counterstop 1325 to set the carriage brake 1441, 1442, and stop the carriage in much the same manner as any of the column stops 1323. However, the wider middle part of the portion 1481 acts on the link 1341 directly at its cam-like upper end edge, as shown in Fig. 21, instead of through the counterstop 1324, sleeve 1340 and pawl 1427 as a column stop 1323 would, to depress the link 1352 to rock the bell crank 1375 to uncouple the carriage return clutch 1317, 1319. A bracket 1482, shaped substantially as a mirror image of the bracket 1480, is secured to the inner side of the right-hand side plate 1069 and has a portion 1483 to cooperate similarly with the cam 1469, counterstop 1324 and link 1345 to set the carriage brake, arrest the carriage and uncouple the carriage tabulating clutch 1311, 1312, when the carriage is tabulated past the last column stop 1323. As the members 1481 and 1483 act directly on the links 1341 and 1345, respectively, they cause the return and tabulating clutches, respectively, to be uncoupled even when the control shaft 1349 or 1348, as the case may be, is held counterclockwise to keep the pawl 1427 or 1408 disengaged from the sleeve 1340 or 1344.

Against the upper surface of the rear carriage race rail 44 at about its middle, a small plate 1484 (Figs. 21 and 22) is held in a slightly yielding manner by two washers 1485 of rubber or other relatively resilient material pressed against the upper side of the plate 1484 by the heads of two screws passing through the washers and plate and threaded into the rail 44. The plate 1484 has a small rearwardly extending projection 1486 which, as it closely approaches either extreme end position, rides up on the inclined cam end of a projection 1487 of the member 1480 or 1482 and finally stops the carriage by engaging against the end of a projection 1488 of the member 1480 or 1482. Rebound of the carriage is prevented by the frictional engagement of the projection 1486 upon one or the other of the projections 1487.

In such extreme end positions of the carriage, some or most of the type bars 562 are located beyond one or the other end of the platen 1057. While the machine is in either such position and, in fact, at any time while the carriage is out of any exact columnar position determined by a column stop 1323, operation of the machine is prevented by means to be described hereinafter.

*Normal automatic tabulation of paper carriage*

A single column tabulation of the paper carriage normally occurs in each cycle of operation of the machine initiated by depression of any of the motor bars and "live" keys except the "Vertical" bar 293 which normally causes the carriage to remain stationary, the "Return" bar 294, which normally causes a return of the carriage after printing, and the "Skip" bar 292 which normally causes a tabulating movement of the carriage to a columnar position determined by control members on the carriage and through any intervening columnar positions, and except when automatic control means, described hereinafter, vary the movements of the carriage. In other words, the paper carriage movement control parts are normally so conditioned as to cause a single column tabulation in every machine cycle except when the condition of such control parts is altered by other means, manually or automatically conditioned, as will be explained hereinafter.

A link 1489 (Figs. 8, 27 and 28) is pivotally and slidably supported upon a grooved stud 1490 which is secured in and projects rightwardly from the right-hand side plate 1261 of the gear box and passes through a forwardly and rearwardly elongated slot in the rear portion of the link 1489. The forward end of the link 1489 is guided in a slot in a comb guide bracket 1491 (Fig. 28) secured to the outer side of the plate 1261 as by screws. A tension spring 1492 is connected at its rear end to a stud 1493 secured in the link 1489 and at its forward end to a long stud 1494 which is secured in the plate 1261 and extends rightwardly below the link 1489 so that the spring 1492 urges the link 1489 forwardly as well as downwardly into engagement with the stud 1494.

Figure 25:
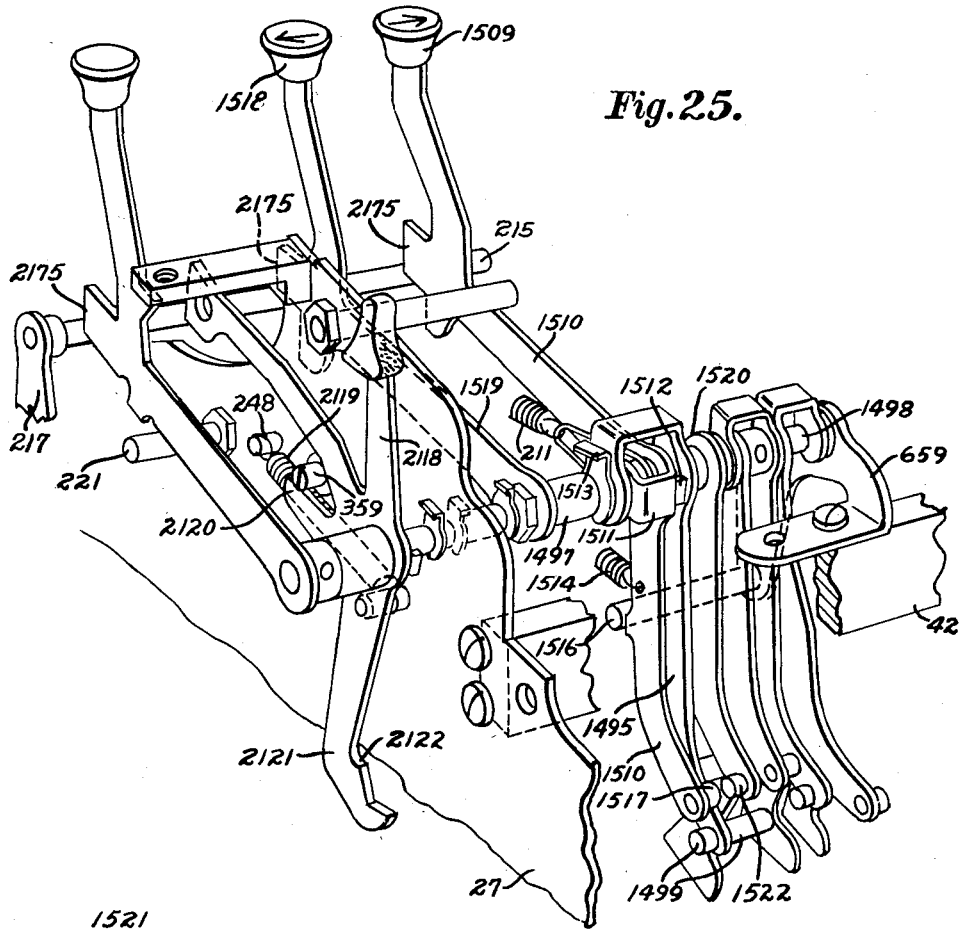
Fig. 25 is a perspective view of certain carriage control keys and associated control parts.

An arm 1495 (Fig. 25) has at its upper end a yoke portion which is rotatable on a sleeve 1497 rotatably supported on a shaft 1498 which, in turn, is rotatably supported in the frame side plate 27 and in a bracket 659 secured to the upper side of a crossbar 42 of the machine frame. A tension spring 1496, connected at its front end to a plate 1515, described hereinafter, and at its rear end to the arm 1495, normally yieldingly holds the latter forwardly against a stud 1516, described hereinafter. The lower end of the arm 1495 (Fig. 27) carries a stud 1499 which projects laterally from both sides of the arm and has its rightward portion located in front of the end of the link 1489 when the latter is in its normal lower position. The lower portion of the arm 1495 also has a cam projection 1500 extending forwardly into the path of a stud 1501 secured in an arm 1502 secured on the hub of a gear 1503 on the main shaft 126, the hub being pinned on the shaft so that the stud 1501 is swung completely around the shaft 126 in each cycle of operation of the machine. The angular position of the arm 1502 and stud 1501 on the shaft 126 is such that, immediately following the point in the machine cycle at which the printing mechanism effects a printing impression, the stud 1501 encounters the cam 1500 and rocks it and the arm 1495 and stud 1499 rearwardly.

The rearwardly moving stud 1499 moves the link 1489 rearwardly so that a stud 1504 secured in the link 1489 rocks rearwardly the upwardly extending right side arm of a yoke 1505 pivotally supported on a headed stud 1506 secured in the plate 1261. A stud 1507 secured in the rearwardly extending left arm of the yoke 1505 is engaged in the slotted forward end of an arm 1508 rigidly secured on the right-half end of the shaft 1348, so that as the yoke 1505 is rocked clockwise, the shaft 1348 is rocked counterclockwise and initiates a tabulating movement of the paper carriage as already explained.

Thus, in any cycle of operation of the machine performed when the link 1489 is in its normal position, the latter will be engaged and moved rearwardly by the stud 1499 and will cause a tabulating movement of the paper carriage.

*Manual control of tabulation and return*

The carriage tabulating and return power drive is controllable manually to move the carriage by power from any of its columnar positions to any other columnar position at any time while the machine is at rest.

The carriage tabulating key 1509 (Fig. 1, 2, 25 and 30) extends upwardly from the forward arm of a bell crank lever 1510 (Fig. 25) having a small yoke portion 1511 pivotally supported on the sleeve 1497 between the sides of the yoke of the arm 1495. A spring clip 1512 engages in a circumferential groove in the sleeve 1497 immediately to the left of the yoke 1511 and holds the latter against the yoke of the arm 1495 immediately at the right of which is another spring clip 1513 engaged in a circumferential groove in the sleeve 1497 whereby the bell crank 1510 and the arm 1495 are held in proper position lengthwise of the sleeve 1497.

Figure 26:
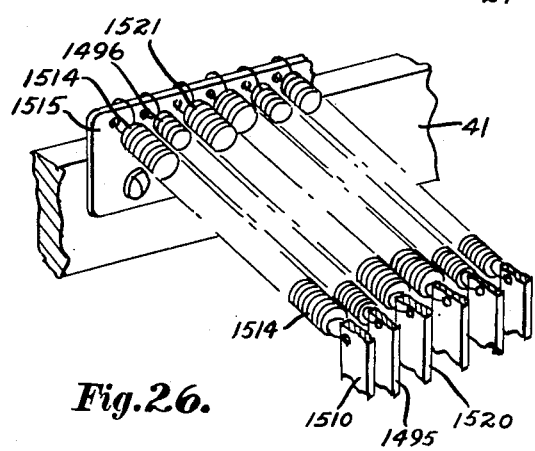
Fig. 26 is a detail.

A tension spring 1514 connected at its rear end to the lower arm of the bell crank 1510 and at its front end to a plate 1515 (Fig. 26) secured to a frame cross-member 41 urges that arm forward against a stud 1516 (Fig. 25) secured in and extending rightwardly from a downward branch of the bracket 659. The lower arm of the bell crank 1510 carries a stud 1517 projecting leftwardly across the front end of the link 1489 so that depression of the carriage tabulating key causes the stud 1517 to move the link 1489 rearwardly to rock the shaft 1348 to cause a tabulating movement of the paper carriage. It will be apparent that a momentary depression and immediate release of the carriage tabulating key 1509 will cause the carriage to be moved in the tabulating direction only until the next column stop 1323 is positioned between the counterstops 1324 and 1325 whereas if the key 1509 is held down for a time, the carriage will continue to move in the tabulating direction either until the key 1509 is released and a column stop 1323 arrives between the counterstops 1324 and 1325, or until the carriage reaches the leftward end of its travel where the member 1483 arrests the carriage and uncouples the carriage tabulating clutch 1311, 1312, as previously described, notwithstanding that the key 1509 may still be held depressed.

A carriage return key 1518 (Figs. 1, 2, 25 and 30) extends upwardly above the rear edge of the keyboard beside and to the right of the tabulating key 1509, from an arm 1519 (Figs. 25 and 30) keyed to a reduced diameter right-hand end portion of the sleeve 1497 (Fig. 25) on which it is secured by a nut threaded on the end of the latter. The left end of the sleeve 1497 is rigidly secured, as by spinning, in an arm 1520 which extends downwardly a little to the left of the lower arm of the bell crank 1519 and is urged clockwise against the stud 1516 by a tension spring 1521 secured at its rear end to the arm 1520 and at its front end to the plate 1515. At its lower end, the arm 1520 carries a stud 1522 which projects rightwardly and which, when the key 1518 is depressed, rearwardly moves a link 1523 (Fig. 27) mounted on the stud 1490 to the left of the link 1489 in a manner similar to the manner of mounting the latter link. A tension spring 1524 is connected at its forward end to the stud 1494 and its rearward end is connected to the lower end of an arm 1525 extending downward from the link 1523 so that the latter is urged forwardly and upwardly into the upper end of a guide slot (Fig. 28) in the comb guide bracket 1491.

As the link 1523 is moved rearwardly, a stud 1526 (Fig. 27) secured therein moves rearwardly the upward right-hand side arm of a yoke 1527. A stud 1528, secured in the rearward left side arm of the yoke 1527, engages in the slotted end of an arm 1529 secured rigidly on the right-hand end of the shaft 1349 so that, as the key 1518 is depressed and the yoke 1527 is thereby rocked clockwise, the stud 1528 rocks the arm 1529 and shaft 1349 counterclockwise to initiate a return movement of the paper carriage. From the previous description, it will be apparent that the return movement of the carriage will be stopped, after the key 1518 is released, as soon as the next column stop 1323 reaches a position between the counterstops 1324 and 1325, or when the member 1481 arrives at that position irrespective of the key 1518 being released or still held depressed.

In addition to the manual control, through the keys 1509 and 1518, of the movement of the carriage by power while the machine is not cycling, the power movements of the carriage incidental to machine cycles can be controlled by means conditioned manually through the small motor bars 292, 293 and 294 when the latter are depressed to initiate such machine cycles.

Figure 32:
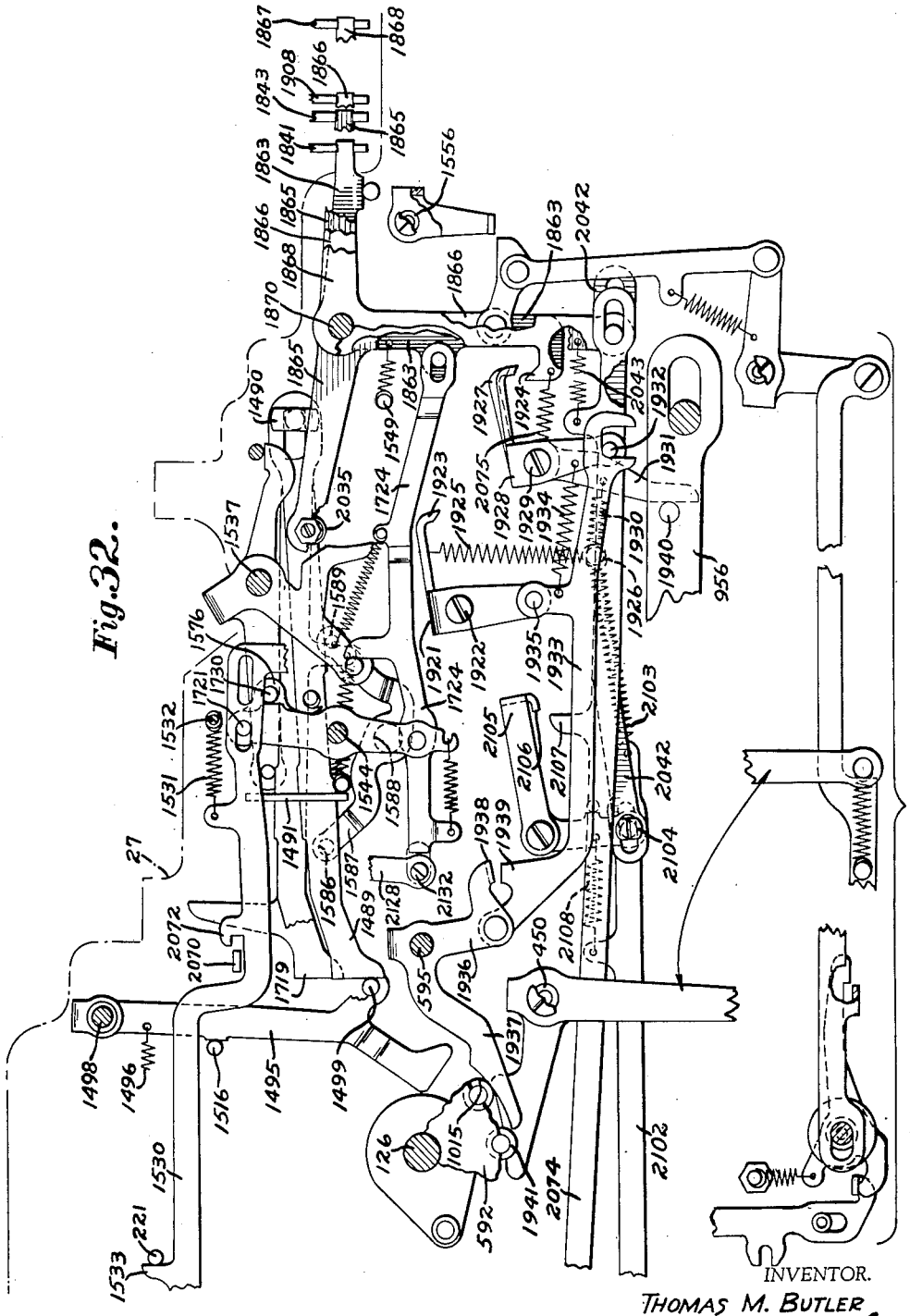
Fig. 32 shows in right side elevation portions of the automatic carriage movement control means and line-spacing control means together with portions of automatic function control means for the rear crossfooter.

Depression of the "Vertical" bar 293 causes the forward end of the link 1489 to be elevated above the stud 1499 so that tabulation of the carriage does not occur in any cycle of operation initiated by depression of that bar. As previously described, depression of the "Vertical" bar 293 rocks the lever 384 (Fig. 6) counterclockwise. The lever 384 has a third and upwardly extending arm pivotally connected by a stud to the forward end of a link 1530 which is urged rearwardly by a tension spring 1531 (Fig. 32) connected at its forward end to an ear on the link and at its rear end to a stud 1532 secured in the right-hand frame side plate 27 whereby an upward projection 1533 on the forward portion of the link 1530 is normally held rearwardly against a stud 221 secured in the plate 27.

The rearward end of the link 1530 (Fig. 28) has a forwardly and rearwardly elongated slot in which is a stud 1534 on the downward right-hand side arm 1535 of a yoke 1536 straddling the upper edge of the frame side plate 27 and pivotally supported on a shaft 1537 which is supported intermediate its ends in the plate 27 and, in its left end, has a bore receiving the end of the post 1271. The shaft 1537 is held against endwise movement by a spring clip engaged in a groove in the shaft at the inner side of the plate 27 and a second spring clip engaged in a groove near the right-hand end of the shaft immediately at the right of the right-hand side of the yoke 1536 which is held spaced from the plate 27 by the right-hand side portions of three other yokes, described hereinafter, and interposed spacing collars on the shaft 1537 between the plate 27 and the right side of the yoke 1536. The stud 1534 is normally held in the forward end of the slot in the link 1530 by a tension spring 1538 connected between the link 1530 and the arm 1535. The left side arm 1539 of the yoke 1536 extends forwardly beneath the stud 1493 so that as the link 1530 is pulled forwardly by the depression of the "Vertical" bar 293 and rocks the yoke 1536 clockwise, the link 1489 is swung upward so that its forward end is positioned above the path of the stud 1499.

It will be remembered that each of the small motor bars 292, 293 and 294, when depressed, is latched down until very late in the machine cycle which it initiates. Its automatic release, previously described, does not occur until well after the time that the stud 1499 has moved rearwardly. Thus, when the forward end of the link 1489 is raised above the stud 1499 by depression of the "Vertical" bar 293, it cannot be acted upon by the stud 1499 to cause tabulation of the carriage during the cycle of operation of the machine initiated by depression of that motor bar. Thus, the tabulation of the paper carriage which normally occurs in cycles of operation of the machine initiated by depression of the "Main" motor bar 291, is suppressed in cycles of operation initiated by depression of the "Vertical" bar 293.

Depression of the "Skip" bar 292 to initiate a cycle of operation of the machine also normally conditions the machine so that the paper carriage, instead of tabulating to the next columnar position, will move through any and all columnar positions intermediate the occupied columnar position and a predetermined position leftward. The depression of the "Skip" bar 292, as previously described, rocks the three-armed lever 381 (Fig. 6) counterclockwise. An upward arm of the lever 381 is pivotally connected at its upper end to the forward end of a link 1540 urged rearwardly by a tension spring 1541 (Figs. 31 and 33) connected at its forward end to an ear on the link 1540 and at its rearward end to the stud 1532. The rear end of the link 1540 has a forwardly elongated slot receiving a stud 1542 secured in the upper arm of a two-armed lever 1543 pivotally mounted on a shouldered collar carried on a stud 1544 secured in and projecting rightwardly from the frame side plate 27. The lever 1543 is spaced a little from the plate 27 by a spacing washer on the stud 1544 between the lever 1543 and the plate 27.

The lower arm of the lever 1543 is pivotally connected to the forward end of a link 1545, the rearward end of which (Fig. 31) has a rearwardly elongated slot receiving a stud secured in the downward arm of a bell crank 1546 pivotally mounted on a reduced end of a spacing sleeve placed next rightward of the plate 27 on a long stud 1547 secured in the plate 27. A tension spring 1548 connected between the rearward arm of the bell crank 1546 and a stud 1549 secured in the plate 27 normally holds the lower edge of the rearward arm of the bell crank 1546 engaged against a stud 1550 secured in the plate 27. The rear end of the rearward arm of the bell crank 1546 is engaged in the forked right-hand end of an arm 1551 (Figs. 36 and 38) pivotally mounted at its left end upon a shouldered spacing collar on a stud 1552 projecting rearwardly from and secured in a frame member 1553. The member 1553 has a forwardly bent left end portion (Fig. 5) secured to the plate 1262, as by a screw, and has its right-hand end secured by a threaded stud and nut to a leftwardly turned ear on the forward end of a comb guide plate 1554 (Figs. 3, 36 and 41) secured to the frame plate 45 as by headed screws 1555 (Fig. 36) and nuts and to the plate 27 by a stud 1556 (Fig. 32) having a reduced shank passing through the plate 27 and threaded into a bushing spun into the plate 1554.

The arm 1551 has a downward projection 1557 (Fig. 38) normally positioned immediately to the left of an upward projection 1558 on the right-hand end of a link 1559 having a rightwardly and leftwardly elongated slot through which extends a flattened, grooved guide stud 1560 secured in the member 1553. The left end of the link is pivotally connected to a downward arm 1561 on the forward side of a yoke member 1562 pivotally supported on a stud 1563 secured in the member 1553. A tension spring 1564 connected at its left end to a stud 1565 secured in the member 1553 and at its right-hand end to an ear on the arm 1561 urges the yoke 1562 clockwise so that, normally while the machine is at rest, the left edge of the lower end of an arm 1566 on the rear side of the yoke bears against a rightwardly turned flange on the rear end of an arm 1567 secured on a hub pinned on the tabulation control shaft 1348. The arm 1567 then holds the yoke 1562 and link 1559 in such position that there is a slight clearance between the leftward edge of the projection 1558 and the rightward edge of the projection 1557.

When the lever 381 (Fig. 6) is rocked counterclockwise by depression of the "Skip" bar 292, it pulls the link 1540 forwardly against the tension of the spring 1541 (Fig. 31) thereby rocking the lever 1543 counterclockwise and pushing the link 1545 rearwardly to rock the bell crank 1546 counterclockwise and raise the right-hand end of the arm 1551 to lift the projection 1557 (Fig. 38) above the projection 1558. The "Skip" bar 292 remains latched in depressed position until late in the ensuing cycle of operation of the machine so that when the tabulation control shaft 1348, immediately after printing, is rocked by the action of the stud 1499 on the link 1489 to cause carriage tabulation, the link 1559 and the yoke 1562 are free from the restraint of the projection 1557. The spring 1564 then rocks the yoke 1562 as the arm 1567 is raised and causes a latch shoulder 1568 on the arm 1566 to move under the flange on the arm 1567, whereby the arm 1567 and tabulation control shaft 1348 become latched in tabulating position.

While the shaft 1348 remains latched in tabulating position, the shoulder 1411 (Fig. 12) on the pawl 1408 is held withdrawn from under the sleeve 1344 so that column stops 1323 riding over the counterstop 1325 during that time do not depress the link 1345 to disengage the tabulating clutch. Although each depression of the cam arm 1464 rocks the latch 1450 to releasing position, the arm 1357 (Fig. 20) holds the carriage decelerating brake in released position as long as the shaft 1348 is in its tabulating position. Consequently, the tabulating movement of the carriage continues until first the yoke 1562 is rocked to release the shaft 1348 to permit it and the pawl 1408 to return to normal and, second, a column stop 1323 thereafter depresses the cam arm 1464 to set the carriage brake and depresses the counterstop 1325, and thus also the link 1345, to release the counterstop 1324 and to uncouple the tabulating clutch.

As hereinafter described, the carriage supports removably mounted manually adjustable control elements 1784 to act on a cam end of an upwardly and leftwardly inclined arm 1569 on the forward side of the yoke 1562 to rock the yoke to withdraw the shoulder 1568 on the arm 1566 from beneath the flange of the arm 1567 before the stop 1323 for the desired columnar position acts on the counterstop 1325 but after the time the stop 1323 for the preceding adjacent columnar position has passed over the counterstop 1325. It is important to note that that portion of the edge of the arm 1566 which is immediately below the latch shoulder 1568 is inclined downwardly and toward the arm 1567 so that after a small counterclockwise movement of the yoke 1562 has withdrawn the latch shoulder 1568 from beneath the flange on the arm 1567, the edge of that flange cams the yoke 1562 further counterclockwise to its normal position as the arm 1567 and shaft 1348 return to their normal positions. Thus, the above-mentioned carriage-supported control elements 1784 are not required to rock the yoke 1562 all the way to its normal position but need only to depress the cam end of the arm 1569 a short distance to release the flange on the arm 1567 which thereafter rocks the yoke 1562 further counterclockwise to withdraw the cam end of the arm 1569 below the reach of the carriage-supported control elements and to move the projection 1558 far enough rightwardly to clear the projection 1557.

If the "Skip" bar 292 is depressed to initiate a machine cycle while the paper carriage is in a columnar position such that there is no control element 1784 to trip the latch yoke 1562 during movement of the carriage to its extreme leftward position, the tabulating clutch will be disengaged when the carriage reaches its end position, as already explained. However, it is also necessary to trip the latch yoke 1562 to permit the shaft 1348 and its arm 1350 (Fig. 14) to restore to normal to permit the latch lever 1389 to relatch the clutch control lever 1397 in clutch disengaging position. For that purpose, a small yoke 1570 (Fig. 38) freely pivotally mounted on the stud 1563 has, on its forward side, an arm 1571 with a rearwardly extending lug 1572 overlying the cam arm 1569 of the latch yoke 1562 so that when the latter is in its skip-tabulation latching position, a cam end of the arm 1571 is positioned in the leftward end of the path of the rear end of the lug 1483. Thus, if the carriage enters its extreme leftward position with the tabulation control shaft 1348 latched in tabulating position by the arm 1566 of the yoke 1562, the lug 1483 acts through the arm 1571 and lug 1572 of the yoke 1570 to trip the latch yoke 1562 to permit the shaft 1348 to restore to normal.

A return movement of the paper carriage occurs in a cycle of operation of the machine initiated by depression of the "Return" bar 294 which also lifts the forward end of the link 1489 above the path of the stud 1499 as will be explained presently. As previously explained, the lever 388 (Fig. 6) is rocked counterclockwise by depression of the "Return" bar 294. The forward end of a link 1573 is pivotally connected by a stud to the upward arm of the lever 388 just to the rear of the connection of the link 387 to the same arm. The link 1573 is urged rearwardly by a tension spring 1574 (Fig. 30) which is connected at its forward end to an ear on the link and at its rear end to the stud 1532 so that an upward projection 1575 (Fig. 6) on the forward portion of the link is normally held rearward against the stud 221.

The rearward portion of the link 1573 (Figs. 30 and 31) passes under the link 1530 and then rearward on the left side of the latter link. The rear end of the link 1573 is pivotally connected by a stud to the upper arm of a lever 1576 which is mounted on a shouldered spacing collar carried on the stud 1544 next rightwardly of the lever 1543. The lower arm of the lever 1576 carries a stud 1577 engaged in a forwardly and rearwardly elongated slot in a link 1578 having its forward end connected to the forward end of a tension spring 1579 which is connected at its rear end to the lower end of the lever 1576 and normally maintains the link 1578 in its rearmost position relative to the stud 1577. The link 1578 has an upwardly projecting lug, the rear edge of which engages a stud 1580 secured in a downward right side arm of a yoke 1581 pivoted on the shaft 1537 and straddling the upper edge the frame right side plate 27 with its right-hand side next rightward of the plate 27.

A rearward left side arm of the yoke 1581 (Fig. 28) carries a stud 1582 to which is secured the upper end of a tension spring 1583 the lower end of which is connected to a lug on the lower side of a rearward right side arm of another yoke 1584 pivoted on the shaft 1537 leftward of the yoke 1581. The spring 1583 normally maintains the right side arm of the yoke 1584 engaged against the underside of the stud 1582. A forward left side arm of the yoke 1584 carries a stud 1585 projecting leftwardly over the upper edge of the link 1523. Thus forward movement of the link 1573 by depression of the "Return" bar 294 rocks the lever 1576 counterclockwise to move rearwardly the link 1578 which rocks the yoke 1581 and thus also the yoke 1584 counterclockwise to cause the stud 1585 to lower the forward end of the link 1523 into the path of the leftward portion of the stud 1499.

A stud 1586 (Fig. 27) underlying the link 1523 is secured in the forwardly and upwardly inclined left side arm of a lever 1587 which is pivoted on a stud 1588 secured in the plate 1261. A stud 1589 secured in a rightwardly offset rearwardly and upwardly inclined arm of the lever 1587 underlies the link 1489 so that as the forward end of the link 1523 is depressed into the path of the stud 1499, the lever 1587 and stud 1589 raise the forward end of the tabulation control link 1489 above the path of the stud 1499. The parts are so proportioned that only one of the links 1489 and 1523 can be in the path of the stud 1499 at any one time.

As previously described, the "Return" bar remains latched in depressed position until late in the machine cycle. Thus, it holds the forward end of the link 1523 in the path of the stud 1499 and holds the forward end of the link 1489 above the path of the stud 1499 until considerably after the stud 1499 moves rearwardly so that, when the stud 1499 moves rearwardly, it moves the link 1523 rearwardly to cause a return movement of the paper carriage.

Return movements of the carriage in machine cycles initiated by depression of the "Return" bar 294 are normally continued to predetermined selected columnar positions of the paper carriage instead of normally being interrupted when the carriage reaches the columnar position next subsequent to that from which the carriage started its return movement, regardless of which columnar position the latter might be.

A bell crank 1590 (Figs. 30 and 31) is pivotally mounted on a reduced end of a spacing sleeve on the stud 1547 next rightward of the bell crank 1546. A tension spring 1591 (Fig. 30) connected between the stud 1549 and the rearward arm of the bell crank 1590, normally holds the latter engaged against the stud 1550. A stud 1592, secured in the downward arm of the bell crank 1590, engages in a rearwardly elongated slot in the rear end of the link 1578 which, as previously explained, is pushed rearwardly by depression of the "Return" bar 294. The rear end of the rearward arm of the bell crank 1590 is engaged in the forked right-hand end of an arm 1593 pivotally mounted at its left end (Figs. 36 and 38) on a shouldered spacing collar on the stud 1552. A downward projection 1594 (Fig. 38) of the arm 1593 is normally positioned slightly rightward of the right-hand end of a link 1595 which has a rightwardly and leftwardly elongated slot through which the guide stud 1560 passes. The left end of the link 1595 is pivotally connected to a downward arm 1596 on the leftward side of a yoke member 1597 pivotally mounted on a stud 1598 secured in the member 1553. The yoke 1597 is urged counterclockwise by a tension spring 1599 connected at its rightward end to a stud 1600, secured in the member 1553, and at its left end to the arm 1596 so that a downward arm 1601 on the rear side of the yoke normally bears against the edge of a leftwardly turned flange on the rear end portion of an arm 1602 secured on a hub pinned on the return control shaft 1349.

When the link 1578 is pushed rearwardly by depression of the "Return" bar 294, it rocks the bell crank 1590 to rock the arm 1593 to raise the projection 1594 above the end of the link 1595. Then, when the return control shaft 1349 is rocked counterclockwise as previously explained to initiate a return movement of the carriage, while the bar 294 remains latched down after printing has occurred during the ensuing machine cycle, the arm 1602 rocks with the shaft 1349 and the spring 1599 rocks the yoke 1597 to move a shoulder on the arm 1601 under the flange of the arm 1602 so that the return control shaft 1349 is latched in the return position, thereby holding counterstop 1325 down and also holding the shoulder 1429 of the pawl 1427 (Fig. 12) withdrawn from under the sleeve 1340. The rocking of the yoke 1597 to latching position also elevates the cam end of an arm 1603 thereof into the path of certain of the control elements 1784 on the paper carriage. While the shaft 1349 remains latched in the return position, column stops 1323 camming the cam arm 1456 (Fig. 18) and the counterstop 1324 downward neither cause the carriage brake to be applied nor depress the link 1341 to release the counterstop 1325 and disconnect the return clutch. Consequently, the return movement of the carriage continues until, first, the yoke 1597 is rocked by one of the control elements 1784 on the carriage to release the return control shaft 1349 to return to normal and to permit the pawl 1427 to return to normal and, second, a column stop 1323 thereafter depresses the cam arm 1456 to cause the carriage brake to be applied and depresses the counterstop 1324 and thus also the link 1341 to uncouple the carriage return clutch and release the counterstop 1325 for return to normal.

Just as it is necessary to insure that the latch yoke 1562 is tripped when the carriage reaches its extreme leftward position, so also it is necessary to insure that the latch yoke 1597 is tripped when the carriage reaches its extreme rightward position. A small yoke 1604 freely pivotally supported on the stud 1598 has, on its forward side, an arm 1605 with a rearward lug 1606 overlying the cam arm 1603 so that, when the yoke 1597 is in latching position, a cam end of the arm 1605 is in the rightward end of the path of the rear end of the lug 1481. Consequently, when the carriage enters its extreme rightward position while the yoke 1597 is in latching position, the lug 1481 will, through the arm 1605 and lug 1606, trip the latch yoke 1597 to permit the return control shaft 1349 to restore to normal.

AUTOMATIC SELECTION OF MACHINE FUNCTIONS

The machine is provided with means controlled automatically in accordance with the positions of the paper carriage to select automatically the functions to be performed by the machine in each cycle of operation thereof in accordance with a predetermined program encompassing a series of machine cycles. Such means is capable of being preset at one time for a plurality of predetermined programs and is readily adjustable by the machine operator during use of the machine, and without disturbing such settings, to cause the selection of machine functions to follow any desired one of such plurality of preset programs. The automatic function control means is so constructed and arranged that control elements thereof are readily insertable, replaceable and adjustable by servicemen in the field so that the programs of automatic function selection can readily be varied to suit variations in the work required to be performed without any objectionable interruption in the use of the machine. Furthermore, the automatic control elements are supported by a means which is readily removable as a unit from the machine by the machine operator for replacement by another unit having control elements arranged for a different group of programs. Thus, automatic control of machine function selection to the fullest extent is readily provided for practically any number of kinds of work which it is desired to perform on the machine and the conditioning of the machine for any of those kinds of work is effected in a most simple way by the machine operator.

The functions controlled by the automatic function control means include movement of the paper carriage as will be particularly described following a description of the general construction and operation of the automatic control mechanism.

Function control program unit

The automatic function control means comprises an automatic function selection program unit readily removably supported on the paper carriage. That unit comprises a plate having its front, rear and end edges turned down to form a rectangular inverted shallow pan 1731 (Figs. 34, 36, 2 and 5). At each end of the pan 1731 (Fig. 34) and somewhat rearward of the transverse mid-line of the pan, is a supporting lug 1732 integral with and extending upward from the downwardly turned end flange 1733 of the pan, said lug having been cut out of the top of the pan inwardly from the flange 1733 and leaving an aperture 1734 in the top of the pan when the flange 1733 is turned down. The lug 1732 is formed with a forwardly open slot 1735 to receive the post 1073 at the respective end of the rod 1072 of the carriage frame.

At each end of the pan 1731, a latch lever 1736 (Figs. 5 and 34) is pivotally mounted on a hub formed on a nut 1737 secured to the inner side of the flange 1733 by a headed screw extending inwardly through the flange. A wire spring 1738 supported on studs on the inner side of the flange 1733 presses against the underside of a stud in the latch lever 1736 to urge the latch lever upward to place a shoulder 1739 thereon in front of the post 1073 when the latter is in the rear end of the slot in the lug 1732. The latch levers 1736 are formed to permit them to be readily manually depressed for easily connecting and disconnecting the pan 1731 to and from the posts 1073 on the carriage.

A shaft 1740 (Figs. 34 and 36), formed of a square-section rod with its end portions turned around, is rotatably mounted in the pan close to the front thereof, as will be explained in more detail hereinafter, and extends beyond the flange 1733 at each end. On each end of the shaft 1740 is a twirler 1741 having a hub 1742 which is secured to the shaft, as by a small screw, the hub 1742 having a circumferential groove formed near its inward end between two square flanges 1743 on the hub. The portion of the hub 1742 between the flanges 1743 is of a diameter to fit in a rearwardly open slot formed in a downwardly extending projection 1744 (Figs. 5 and 21) of the respective end plate 1069 or 1070 of the paper carriage. Thus, the pan 1731 is readily detachably attachable to the paper carriage by inserting the grooved portions of the hubs 1742 in the slots in the projections 1744 of the carriage end plates 1069 and 1070 while engaging the slotted projections 1732 of the pan around the posts 1073 on the plates 1069 and 1070 and permitting the springs 1739 to rock the latch levers 1736 to place their shoulders in front of the posts 1073.

Within the pan 1731 (Fig. 34) are two strips 1747 and 1748, each having its opposite bent-over ends secured, as by rivets, to the respective end flanges 1733 of the pan with the upper edges of the strips 1747 and 1748 in contact with the underside of the pan. The forward strip 1747 has, on its upper edge, a series of regularly spaced notches 1749 and, in its lower edge, a similar series of notches 1749 aligned vertically with those in the upper edge. A rearward strip 1748 has a similar series of notches 1749 in its lower edge only, these notches being aligned in the forward and rearward direction with the notches 1749 in the forward strip 1747.

The strips 1747 and 1748 support between them a number of forwardly and rearwardly extending bars 1750 each having, at its forward end, two short forwardly projecting lugs 1751 (Fig. 36) fitting in a pair of vertically aligned upper and lower notches 1749 in the strip 1747 and also having, at its lower rear corner, a single short lug 1752 to fit in a notch 1749 in the strip 1748. After the bars 1750 are positioned with their lugs 1751 and 1752 in the notches 1749 of the strips 1747 and 1749, a strip 1753 is readily removably secured to the rear side of the strip 1748 as by means of headed screws 1754 (Fig. 34) accessible to a screw-driver inserted through registering openings 1755 in the downwardly turned rear flange 1756 of the pan 1731 and in a strip 1757. The strip 1753 has, along its lower edge, a narrow flange extending forwardly under the lugs 1752 close to the lower edge of the strip 1748 whereby the inserted bars 1750 are securely held on the strips 1747 and 1748.

The strip 1757 extends from end to end of the pan 1731 and is secured, as by means of headed screws 1758, to the rear side of the rear flange 1756 of the pan. The strip 1757 has along its lower edge a forwardly turned flange 1759 which enters between a rearwardly turned lug 1760 (Fig. 36) of the rear frame plate 45 and a roller 1761 on a stud secured in the plate 45 below the lug 1760. Easy accurate replacement of the strip 1757 on the flange 1756 after removal is secured by means of two adjustable locator members 1762 which are flattened on one side and closely fitted into openings in the strip 1757. These locators are secured to the rear side of the flange 1756 by bolts 1763 which pass through slots in the flange 1756 and are tightened only after the strip 1757 is initially secured in the desired position by the screws 1758, thus correctly positioning the locators 1762 on the flange 1756.

Each strip 1750 has on its rightward face a series of eleven evenly spaced vertically extending narrow ridges 1764 forming between them a series of ten vertical channels of equal uniform width. Control members 1765 fitting into those channels can be secured to the bars 1750 by means of short flat-headed screws 1766 passing through countersunk openings in the bars 1750 midway between each pair of adjacent ridges 1764 and threaded into the members 1765. The control pieces 1765 have, either forwardly or rearwardly or both forwardly and rearwardly of their vertical mid-lines, downwardly extending control lugs 1767 of various lengths. The lugs 1767 may, therefore, be located in any of twenty positions lengthwise of each of the bars 1750. Such lugs 1767, as will be explained in detail hereinafter, in accordance with their various lengths and their various positions in the control pan 1731, are adapted automatically to variably control various functions of the machine in machine operations performed with the paper carriage in different columnar positions in accordance with selected ones of four selectable preset grams.

The left-hand cylindrical end portion of the shaft 1740 is fitted in an opening in the forward end portion of the left flange 1733 of the pan 1731 for rotary and longitudinal relative movement therein. On the shaft 1740 near its right-hand end is secured a sleeve 1768 fitting in an opening in the right-hand flange 1733 of the pan 1731 for rotary and longitudinal movement therein. The sleeve 1768 has a right-hand helical groove of rectangular section receiving a roller 1769 supported on a stud secured in an ear on the right-hand end of the forward downwardly turned flange 1770 of the pan 1731. As the end plates 1069 and 1070 of the paper carriage are engaged in the grooves between the flanges 1743 on the hubs 1742, rotation of the shaft 1740 and helically grooved sleeve 1768 shifts the pan 1731 laterally of the machine along the shaft 1740 and on the supporting posts 1073.

The pitch of the helical groove in the sleeve 1768 is exactly four times the spacing interval of the notches 1749 in the strips 1747 and 1748 so that three 90° rotations of the shaft 1740 in a given direction will remove one forwardly and rearwardly extending line of control projections 1767 out and each of the three lines of projections 1767, next adjacent in one direction, successively into active position in vertical alignment with feeler or sensing tappets (hereinafter described in detail) arranged in a forwardly and rearwardly extending line on the stationary frame of the machine beneath the pan 1731. To hold the shaft 1740 in each of its four (0°, 90°, 180°, and 270°) positions, a spring 1771 of rectangular channel form has its transverse top portion secured to the underside of the pan 1731 and its depending sides pressing flatly against a squared flange 1772 on a sleeve 1773 secured on the shaft 1740 inward of the left-hand flange 1733 of the pan.

Each of the twirlers 1741 has four flattened faces on its periphery bearing numerals "1," "2," "3" and "4" in order clockwise, the "1" faces being those visible from directly forward of the machine when the shaft 1740 is at the clockwise limit of its rotation, at which time the pan 1731 is in its "1," i. e., its most rightward, position relative to the paper carriage. In that position of the parts, clockwise rotation of the shaft 1740 is prevented by engagement of the leftward one of the pair of flanges 1743 on the right-hand hub 1742 against the roller 1769. Three successive 90° counterclockwise movements of the shaft 1740 will shift the pan 1731 leftward successively to its "2," "3" and "4" positions, in the last of which further counterclockwise movement of the shaft 1740 is prevented by engagement of the left flange 1733 by a collar 1774 secured on the shaft 1740 near the hub of the left twirler 1741.

The column stops 1323, hereinbefore mentioned, are formed as radially extending projections on hubs 1775 slidably but nonrotatably fitted on the squared portion of the shaft 1740. The hubs 1775 are adjustably secured in the desired positions lengthwise of the shaft 1740 as by small set screws 1776 threaded into the hubs. Each hub 1775 may have one, two, three or four column stop projections 1323, spaced 90° or 180° apart, in a common plane normal to the shaft 1740. The stops 1323 are at such radial positions relative to the square bores in their hubs 1775 and to the squared flange 1772 that they project either parallel or normal to the flat portion of the pan 1731 in the several positions of the shaft 1740, the straight downward positions being their active positions. It will be apparent that each of four column stops 1323 on the same hub 1775 will arrest the carriage in identically the same columnar position but each with a different one of four lines of control projections 1767 in active control position.

The mid-portion of the shaft 1740 is also supported by a collar 1777 slidably fitted on the shaft and rotatably secured, as by two spaced annular flanges, in an opening in a small plate 1778 which is adjustably secured to the underside of the pan 1731 as by a headed screw passing through a laterally elongated slot 1779 in the pan 1731 and threaded into the thickened upper end of the plate 1778.

To provide added support for the shaft 1740, each of the hubs 1775 is formed near one end with a circumferential groove to fit in a downwardly open slot in a small plate 1780, the upper edge of which is thereby held in contact against the underside of the pan 1731. However, plates 1780 are provided for only a few of the hubs 1775 to support the shaft 1740, where required, at points intermediate the plate 1778 and the flanges 1733.

Rearwardly of the shaft 1740 is another square shaft 1781 with its end portions turned round and rotatably and slidably fitting in openings in the flanges 1733. The mid-portion of the shaft 1781 is supported on the pan 1731 by means similar to the means 1777, 1778 previously described for the mid-portion of the shaft 1740. Each of a number of hubs 1782, slidably but nonrotatably fitted on the shaft 1781 and secured in the desired positions lengthwise of that shaft, has, at one end, a flange 1783 (Fig. 40) which has been cut down from a square form so as to leave control projections 1784 of desired lengths in any of five positions along any or all of the sides of the square.

A pinion 1785 on a hub pinned on the rightward end portion of the shaft 1781 meshes with an idler pinion 1786 on a hub secured on a short shaft 1787 which is rotatable in the right-hand flange 1733 and in a small bracket 1788 secured, as by rivets, to the pan 1731. The idler pinion 1786 meshes with a pinion 1789 on a hub pinned on the shaft 1740, the pinions 1785 and 1789 being of the same size so that the shafts 1740 and 1781 rotate in unison. The pinions 1785 and 1789 are meshed with the pinion 1786 in such relation that one set of the control projections 1784 is directed straight downward in each of the four rotary positions of the shafts 1740 and 1781. A spring 1790 and square flanged collar 1791 similar to the parts 1771, 1772 and 1773 for the shaft 1740, are provided to aid the latter parts to hold the shafts 1740 and 1781 yieldingly in each of their four effective positions. Two washers of greater diameter than pinion 1786 are secured on the hub of that pinion tight against the opposite sides thereof to keep all three pinions 1785, 1786 and 1789 in meshing alignment and to cause both of the shafts 1787 and 1781 to move lengthwise relative to the pan 1731 with the shaft 1740 so that the control projections 1784 will be maintained in the desired positions relative to the column stops 1323.

As will become more apparent later, it would be undesirable to permit the control pan 1731 to be removed from or placed on the carriage with the carriage in any position except either of its extreme end positions where no column stops 1323 and no control projections 1767 or 1784 are in active position. On the outer side of each of the carriage end plates 1069 and 1070 (Fig. 21) a small locking slide 1792 is slidably guided in a path inclined at a small angle clockwise from the vertical by four studs 1793 which are secured in the carriage end plate and, with the exception of the forward lower stud 1793, are formed with circumferential grooves through which the edges of the slide 1792 pass. The vertical position of each slide 1792 is determined by a stud 1794 engaged in a notch in the rear edge of the slide and secured in the rear end of an arm of a lever 1795 secured to an end of a shaft 1796 rotatably supported in the carriage end plates 1069 and 1070. Just inwardly from each of the end plates 1069 and 1070, a rearwardly extending cam arm 1797 is secured to the shaft 1796, each of said arms having an inwardly extending portion with an upwardly inclined inner end. A tension spring 1798, connected at its forward end to the forward arm of the lever 1795 and at its rearward end to the stud 1176, urges the lever 1795 and shaft 1796 clockwise and the slide 1792 downward to position the vertical forward edge of the slide in engagement with whichever of the four edges of the outward one of the flanges 1745 is in the rearward vertical position.

When the carriage closely approaches either of its extreme end positions, one or the other of the cam arms 1797 rides up on the conically topped head of one of two screws 1799 secured to the top of the rear carriage race rail 44 at each end of the plate 1484, camming the shaft 1796 counterclockwise and lifting the slides 1792 upwardly from behind the flanges 1743 to permit rotation of the shaft 1740. When the carriage is moved out of either extreme end position, the springs 1798, aided by gravity, move the slides 1792 downwardly behind the outer flanges 1743 to lock the shaft 1740 in any one of its four proper rotary positions.

Means are provided to prevent the carriage from being moved out of either extreme end position while the shaft 1740 is in any position other than one of its four proper positions. Two three-armed detent members 1800 (Fig. 21) are pivotally mounted on screw studs 1801 secured in the outer sides of the respective carriage frame end plates 1069 and 1070. A tension spring 1802 secured at its forward end on the stud 1176 and at its rearward end to a stud in the rearward arm of the detent 1800 urges the latter counterclockwise to engage the forward arm of the detent against the upper side of the shaft 1796, in which position of the detent 1800, the downward arm thereof is positioned a little rearwardly of a respective one of two inwardly facing stop shoulders 1803 formed on the plate 1273.

Whenever the shaft 1740 is rocked out of any of its four proper positions, one or another of the four corners of the outer flange 1743 engages the lower arm of the detent 1800 and rocks it forwardly against the tension of its spring 1802 so that, depending upon which of the two extreme end positions the carriage occupies at that time, the lower arm of one or the other of the detents 1800 is positioned on the inward side of one of the shoulders 1803 and prevents movement of the carriage out of that end position until the shaft 1740 is rotated to one of its proper positions and locked therein by the locking slides 1792.

Sensing mechanism

Below the control pan 1731 is a vertically wide bar 1804 (Fig. 36) secured, at its forward end, against the rear side of the frame member 1553 and, at its rearward end, against the forward side of the frame member 45, as by means of headed screws passing through the frame members and threaded into the ends of the bar 1804. The upper edge of the bar 1804 has a lowered step near its rear end and the under edge of the bar has a raised step near its forward end as shown most clearly in Fig. 5. Guide strips 1805 and 1806 are secured, as by countersunk screws, upon the upper edges of the bar 1804 so that they project substantially rightward of the bar.

The guide strips 1805 and 1806 are formed with a row of rectangular perforations 1807, the left ends of which are spaced very slightly rightward of the rightward face of the bar 1804, the perforating being arranged in two groups, one group comprising the five perforations in the strip 1806 and fifteen perforations in the strip 1805, all twenty perforations of that group being equally spaced in the forward and rearward direction. The other group comprises three perforations 1807 in the forward portion of the strip 1805 and is separated from the first-mentioned group by somewhat more than double the spacing between the perforations of such first-mentioned group. The three perforations 1807 of the forward group are more closely spaced than the perforations of the rear group.

Guide strips 1808 and 1809, similarly secured to the lower edges of the bar 1804, are formed with a total of twenty-three rectangular perforations 1810 each of which, excepting the first and third, counting from the front, is vertically aligned with a respective one of the twenty-three perforations 1807. The first and third perforations 1810 are spaced from the second a distance substantially equal to the spacing between adjacent ones of the rear twenty perforations 1810. The perforations 1807 and 1810 are substantially centered in the vertical fore-and-aft plane passing midway between the adjacent ends of the counterstops 1324 and 1325 so that any line of control projections 1767 and 1784 which is in the same fore-and-aft line with a column stop 1323 engaged between the counterstops 1324 and 1325 will also be directly vertically above the line of perforations 1807.

In each vertical pair of perforations 1807 and 1810, a sensing pin or feeler tappet may be vertically slidably guided. In the drawings, seventeen such pins or tappets, numbered 1811 to 1827 consecutively from front to rear, are shown. Each tappet 1811 to 1827 is in the form of a long strip or pin 1828 (Fig. 37) of small rectangular cross section having a freely sliding fit in the perforations 1807 and 1810, all of said pins being straight excepting the first 1811 and third 1813 which have their upper end portions 1829 (Fig. 36) offset toward the second pin 1812 to compensate for the closeness of spacing between the front three apertures 1807. The upper ends of each of the front three pins 1811, 1812 and 1813, respectively, are vertically aligned with the rearmost three positions for control projections 1784 and the rear fourteen pins 1814 to 1827 are, respectively, aligned with fourteen respective ones of the twenty positions for the control projections 1767.

Each of the pins 1811 to 1827 is formed with at least a pair of rightwardly projecting lugs 1830 vertically spaced to embrace closely the rounded leftward end of a respective one of the control levers 1831 to 1847. Washers 1848 (Fig. 37) are secured by a rivet on the opposite sides of the leftward end of each of the control levers 1831 to 1847 to embrace the lugs 1830 between them to prevent fore-and-aft relative movement between the control levers and lugs, by which movements, the control levers could become disconnected from the sensing pins. The sensing pins 1814 to 1825, inclusive, have two pairs of lugs 1830, the left ends of the control levers 1834 to 1839, inclusive, being engaged between the upper pair of lugs 1830 of the sensing pins 1814 to 1819, respectively, and the left ends of the control levers 1840 to 1845 being engaged between the lower pair of lugs 1830 of the pins 1820 to 1825, respectively.

Each of the control levers 1831 to 1846 has, near its left end, a vertically widened portion in which is a closed, substantially vertically elongated slot. The control lever 1847 has a widened and slotted portion spaced substantially further rightward. A guide rod 1849, threaded at its forward end into the frame member 1553 and supported at its rear end in a small bracket 1850 secured to the rear frame plate 45, extends through the slots in the control levers 1831 to 1839 and a guide rod 1851 similarly mounted below the rod 1849 passes through the slots in the control levers 1840 to 1846. A stud 1852 secured by a threaded shank and nut in the frame plate 45 engages in the slot in the control lever 1847. Thus, the control levers 1831 to 1847 are prevented from moving endwise to become disconnected from the sensing pins 1811 to 1827.

The rightward end portions of the control levers 1833 to 1847 are guided in individual, narrow, vertical guide slots in the comb plate 1554 and the rightward ends of the levers 1831 and 1832, together with certain other parts hereinafter described, are guided in a single wide guide slot in the plate 1554. The rightward ends of the control levers 1831 to 1839 are located in an upper level and project rightwardly beyond the plate 1554 progressively greater distances to cooperate with the rearward arms of respective ones of a series of bell cranks 1853 to 1861 pivotally mounted on the reduced ends of individual spacing sleeves on the stud 1547 rightwardly of the bell crank 1596. The rightward ends of the control levers 1840 to 1847 are in a lower level and also extend rightwardly of the plate 1554 progressively greater distances to cooperate with the rearward arms of respective ones of a series of bell cranks 1862 to 1869 pivotally mounted on the reduced ends of individual spacing sleeves on a long stud 1870 secured in and extending rightwardly from the right frame plate 27 rearward from and lower than the stud 1547. The control levers 1832, 1833 and 1847 have their rightward ends bifurcated to embrace the rear arms of the bell cranks 1854, 1855 and 1869, respectively, whereas the rightward ends of the control levers 1831 and 1834 to 1846 merely engage the underside of the rear arms of the bell cranks 1853 and 1856 to 1868, respectively.

In various ways, as will be explained hereinafter, the rearward arms of the bell cranks 1853 to 1861 are normally held downward against the stud 1550 and the rearward arms of the bell cranks 1862 to 1869 are normally held downward against a long stud 1871 secured in and extending rightwardly from the frame side plate 27.

A rod 1872 threaded at its forward end into the member 1553 and supported at its rear end in an opening in the rear frame plate 45 serves as an anchor rod for the lower ends of a series of springs 1873 which are connected at their upper ends, individually, to respective ones of the control levers 1831 to 1847, each at a point between the left end of the lever and the comb plate 1554 but substantially nearer to the latter. At various times very early in a machine cycle, each of the control levers 1831 to 1847 receives an upward thrust from elements mounted on or actuated by a shaft 1874, such thrust being applied to the control lever at a place leftward of the connection of its spring 1873 thereto, so that the effect of such thrust is, first, to elevate the leftward end of the control lever and the sensing pin connected therewith. If no obstruction is encountered by the upper end of the sensing pin, the spring 1873 holds the rightward end of the connected control lever against rising from its normal position.

The proportions and arrangement of the various parts are such that the upward thrusts on the control levers 1834 to 1847 are applied through such distances as required to raise the connected sensing pins 1814 to 1827 from their normal and lowest positions, where their lowermost lugs 1830 bear upon the strip 1809, to their uppermost positions, where their uppermost lugs 1830 almost contact the strip 1805 or the strip 1806 without raising the extreme rightward ends of the control levers. Elevating thrusts are applied to the levers 1831, 1832 and 1833 so as to produce only somewhat shorter strokes of the pins 1811, 1812 and 1813. However, the lowermost lugs 1830, by engagement with the strips 1808 and 1809, limit downward movements of the pins 1811 to 1827 at their normal positions and the uppermost lugs 1839 prevent overthrow in upward movement of the pins. If upward movement of any sensing pin 1811 to 1827 is stopped by a control projection 1784 or 1767 before the pin reaches the upper end of its normal full upward stroke, the connected one of the control levers 1831 to 1847 will pivot about its leftward end and lift its rightward end and thus also the rearward arm of the associated one of the bell cranks 1853 to 1869 to an extent which varies in accordance with the length of the control projection 1767 or 1784 engaged by the sensing pin. Such rocking of the several bell cranks 1853 to 1869 effects certain selections and controls of functions performed by the machine during the cycle of operation, including the carriage movement controls which will be explained in detail hereinafter. Before that point in the cycle at which tabulating or return movement of the paper carriage is initiated, the control levers 1831 to 1847 and their sensing pins 1811 to 1827 are lowered to their normal positions as also hereinafter explained.

The above-mentioned shaft 1874 is driven from the main machine drive shaft 126 through the gear 1503 (Fig. 41) which meshes with a gear 1875 spun onto the hub of a bevel pinion 1876 held, as by a headed screw, upon the reduced leftward end of a stub-shaft 1877 fixedly secured in and extending rightward from the lower front corner of the plate 1261. Another bevel pinion 1878 has a hub which is slidable on the forward end of a shaft 1879 and is formed with rearwardly open elongated slots to receive the ends of a pin 1880 secured in and extending transversely through the shaft 1879 whereby the bevel pinion 1878 and its hub may slide a short distance forwardly and rearwardly on the shaft 1879 but, if rotated, will drive that shaft.

Rearward of the pin 1880, the shaft 1879 is journalled in a bushing 1881 in a bracket member 1882 having a forwardly turned left end secured, as by headed screws, to the plate 1261. The rightward end of bracket 1882 is connected, as by a small bolt and nut, to the leftward end of a second bracket member 1883 (Fig. 36) secured, as by headed screws, to the inner side of the frame plate 27. A spring clip 1884 engages in a circumferential groove in the shaft 1879 immediately behind the bushing 1881 to prevent forward movement of the shaft.

The rear end of the shaft 1879 is supported in a socket 1885 having a threaded shank screwed into an exteriorly hexagonal sleeve 1886 pinned on the forward end of the shaft 1874 (Figs. 41 and 43) which is journalled in a bushing in the member 1553. A lock nut 1887 on the threaded shank of the socket member 1885 is tightened against the end of the sleeve 1886 to prevent undesired relative rotation between the socket member and sleeve. A cross pin 1888 secured in the rear end portion of the shaft 1879 has its ends engaged in forwardly open slots in the socket member 1885. The rear end of the shaft 1874 is of reduced diameter and is journalled in a bushing secured in the rear frame plate 45.

Thus, when the bevel gear 1878 is in its forward position where it meshes with the bevel gear 1876, the shaft 1874 will be driven clockwise from the shaft 126 and, as the gear ratio of the gears 1503, 1875, 1876 and 1878 is 1:1, the shaft 1874 will be driven through exactly one revolution in each machine cycle. Means, hereinafter described in detail, for sliding the pinion 1878 rearwardly to disconnect the shaft 1874 from the shaft 126 and forwardly to reconnect the shaft 1874 to the shaft 126, can be operated only while the machine is at rest and the shaft 126 is in its normal position.

A disk 1889, secured on the rear end of the sleeve 1886 and spaced from the member 1553 by a washer on the shaft 1874, has, in its periphery, a V-notch (Figs. 36, 42 and 44) which, at the completion of each revolution of the shaft 1874, is entered by a roller 1890 rotatably mounted on a stud secured in a lever 1891 which, at its rightward end, is pivotally mounted on a stud secured in the member 1553 and, at its leftward end, is connected to the upper end of a tension spring 1892 which is connected at its lower end to a stud secured in the member 1553, so that the shaft 1874 is yieldingly held in its exact normal position at all times while it is disconnected from the shaft 126. Thus, at all times when the shafts 126 and 1874 are connected together to drive the shaft 1874, the rotational angular relation between the two shafts is always exactly correct. The means to effect such connection and disconnection will be described after those effects of rotation of the shaft 1874 which are most pertinent to the present invention have been fully explained.

As previously mentioned, projections 1784 may have any of five positions along each side of the flange 1783 on a hub 1782 and control projections 1767 may be located in any of twenty positions on each of the bars 1750. There are, in effect, twenty-five lanes running transversely of the machine, in the front five of which, control projections 1784 may be located in different positions lengthwise of those lanes, whereas control projections 1767 may be located in various ones of the rearward twenty lanes. The apertures 1807 and 1810 are so located that sensing pins, such as 1811 to 1827, may be provided in all but the first two lanes at the front. In the following detailed explanation of the controls effected by the projections 1784 and 1767, it will be most convenient to identify the locations of the control projections 1784 and 1767 by reference to such lanes which, for that purpose, are numbered from 1 to 25 consecutively from front to rear.

Just rearward of the member 1553 is a crank arm 1893 (Figs. 38 and 43) which is secured on a hub pinned on the shaft 1874 and, at its outer end, carries a stud supporting a roller 1894. Early in the clockwise rotation of the shaft 1874, the roller 1894 engages the lower edge of a downwardly extending cam projection 1895 on a rightward arm 1896 on the forward side of a yoke member pivotally mounted on the rear end of the stud 1569. Thereafter, the arm 1896 is raised so that a stud 1897 secured in the leftward end of the arm 1896 and extending forwardly under and close to the control levers 1831, 1832 and 1833 considerably leftward of the points of connection of the springs 1873, engages and rocks those control levers clockwise about the points at which they bear on the comb plate 1554, thus raising their leftward ends and the sensing pins 1811, 1812 and 1813. If and when any sensing pin 1811, 1812 or 1813 encounters a control projection 1784 positioned above it in control lane 3, 4 or 5, respectively, the connected control lever 1831, 1832 or 1833 is then rocked about its left end and raises its rightward end. Somewhat later, the roller 1894 passes the lower end of the cam projection 1895 and, during further rotation of the shaft 1874, permits the springs 1873 for the control levers 1831, 1832 and 1833 to lower those control levers, the sensing pins 1811, 1812, and 1813 and the arm 1896 to their normal positions. The parts are so proportioned and arranged that the upward movement of the sensing pins 1811, 1812 and 1813 commences at about the 30° point and the same pins are fully restored at about the 117° point of the machine cycle.

Rearward of the crank 1893, the shaft 1874 (Figs. 43 and 44) is flattened along opposite sides and carries a series of cam disks 1898 to 1906, a crank arm 1907 and four more cam disks 1908 to 1911, all nonrotatably fitted thereon and each spaced from its neighbors by spacing collars 1912 whereby the cam disks 1898 to 1906, 1908, 1909 and 1910 are aligned vertically with cam follower rollers 1913 on studs secured in downward projections of the control levers 1834 to 1842, 1844, 1845 and 1846, respectively. The cam disk 1911 is also vertically aligned with a cam follower roller 1913 on a stud secured in the control arm 1847. A roller 1914 on a stud secured in the crank arm 1907 is vertically aligned with a cam portion 1915 of an arm 1916 which, at its left end, carries a stud 1917 engaged in a rightwardly open slot in a downward projection of the control arm 1843. The rightward end of the arm 1916 is formed with a small yoke portion (Fig. 36) pivotally supported on a stud 1918 secured in a bracket 1919 which is secured, as by rivets, to the leftward face of the comb guide plate 1554. The cam disks 1898 to 1906 and 1908 to 1911, the crank arm 1907 and the spacing collars 1912 are clamped tightly together on the shaft 1874 between the hub of the crank 1893 and a pair of nuts 1920 threaded on the shaft 1874 just forwardly of the rear frame plate 45.

The control arms 1834 to 1847 actuated by the elements 1898 to 1911, respectively, are controlled, through the connected sensing pins 1814 to 1827, respectively, by the control projections 1767 in the control lanes 6 to 16, 18, 21 and 22, respectively.

Because of the omission, in the illustrated machine, of sensing pins and control levers for the control lanes 17, 19, 20, 23, 24 and 25, cams, disks or the like for the omitted control levers have been omitted from the assembly on the shaft 1874 and the spaces which they would occupy are filled by extra spacing collars 1912. Likewise, in the assembly on the stud 1870, bell cranks for the unused control lanes are omitted but shouldered spacing collars like those on which the bell cranks 1862 to 1869 are mounted are present on the stud 1870 to space the remaining parts of the assembly properly. It will be apparent that the control lanes not utilized in the illustrated machine may be utilized for additional automatic controls, when desired, by insertion of the necessary sensing pins, control levers, cam disks and bell cranks, etc., in the spaces remaining for that purpose.

To avoid mechanical interference between closely spaced parts, the downward projections of the control levers 1834, 1836, 1838, 1840, 1842 and 1845, carrying the rollers 1913, are positioned leftwardly, and the corresponding projections of the control levers 1835, 1837, 1839, 1841, 1843 and 1846 are positioned rightwardly of the vertical plane containing the axis of the shaft 1874. Partly for that reason and partly to obtain somewhat different timing of the movements of certain of the control levers 1834 to 1847, the shapes of the cam disks 1898 to 1906 and 1908 to 1911 are varied as shown in Fig. 44 wherein the values in degrees shown for different points on the cam disks represent the points in the rotation of the shaft 1874 at which such points of the cam disks come into radial alignment with the centers of the respective rollers 1913.

Figure 35:
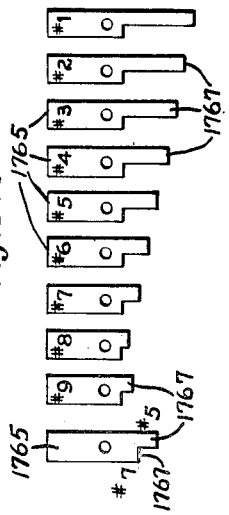
Fig. 35 illustrates the various lengths of control projections adapted to be attached to the control unit of Fig. 34.
Figure 34:
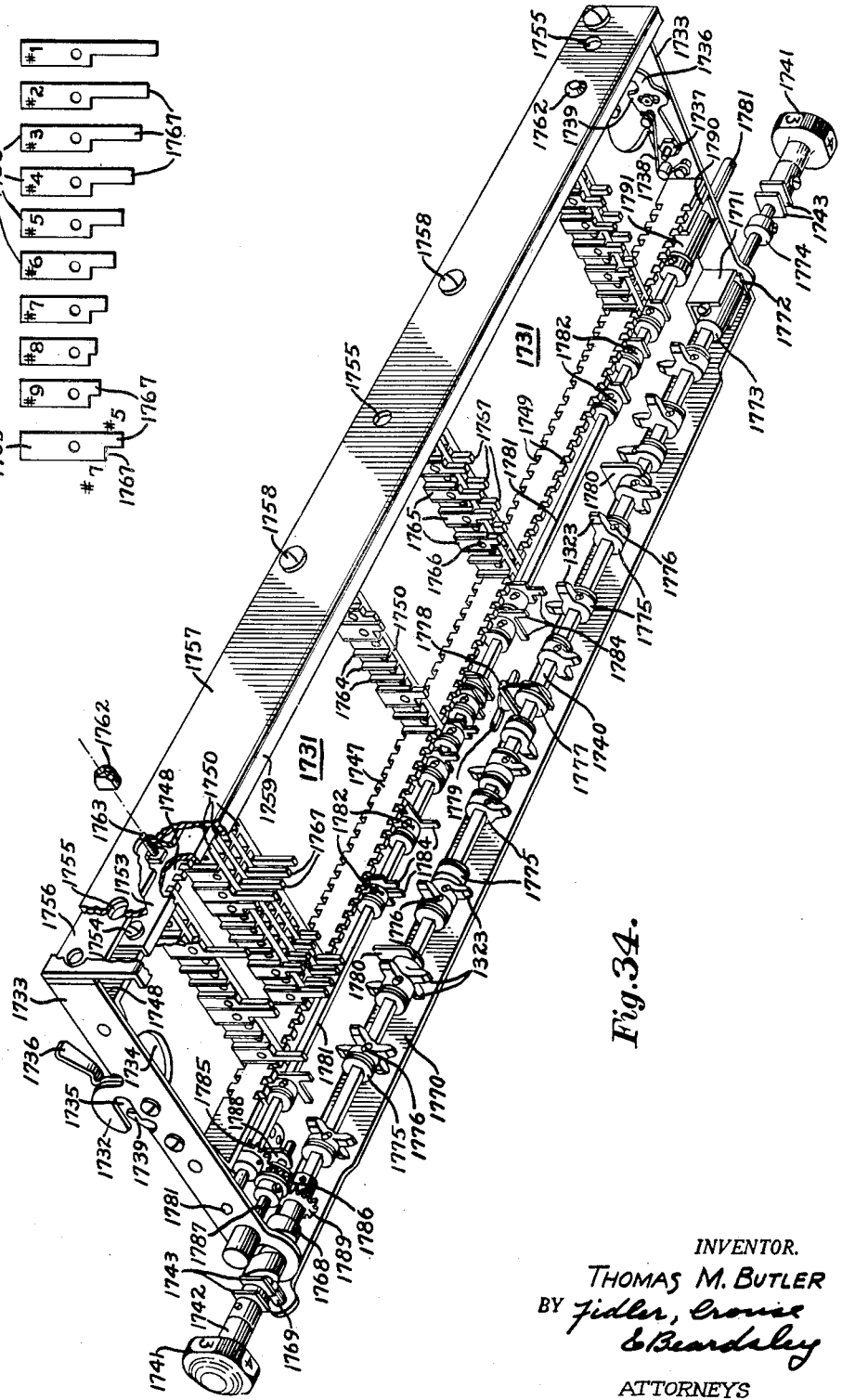
Fig. 34 is a perspective view of a program control unit detached from the paper carriage and as viewed from a point rearwardly, rightwardly and below, some of the function control elements being removed to more clearly reveal others.

The control projections 1767 are made in nine different lengths as illustrated for the nine members 1765 numbered consecutively from 1 to 9 in Fig. 35. Hereinafter, the relative lengths of the various projections 1767 will be specified by reference to the numbers #1 to #9 by which they are identified in Fig. 35 from which it can be seen that the #1 to #8 control projections 1767 are shortened progressively by a uniform amount while the length of the #9 control projection 1767 is intermediate the lengths of the #8 and #7 projections. It will be apparent that the projections 1767 of different lengths will cause different amounts of elevation of the right ends of the control levers 1834 to 1847 as the shaft 1874 is rotated in a machine cycle. Each of the first nine members 1765 at the right of Fig. 35 has a downward control projection 1767 at one side only of its median line to adapt it for control in a single control lane, though by merely turning it about on its vertical mid-line, it may be employed for control in either an odd-numbered control lane or an even-numbered control lane. As shown for the leftmost member 1765 of Fig. 35, any member 1765 may have control projections 1767 on both sides of its median line to adapt it for control in two adjacent lanes. The leftmost member 1765 of Fig. 35 is formed with a #7 projection 1767 at one side and a #5 projection 1767 at the other side.

In the illustrated machine, the sensing pins 1811, 1812 and 1813 (Fig. 36) for lanes 3, 4 and 5 normally project about $\frac{3}{32}$″ above the strip 1805 and must rise about $\frac{3}{32}$″ to engage long projections 1784 and about $\frac{5}{32}$″ to engage short projections 1784. When no control projection 1784 is above them, they can rise about $\frac{5}{32}$″. In the illustrated machine, only the #5 and shorter control projections 1767 can be used in lanes 6 to 21. In lanes 6 to 21, the sensing pins 1814 to 1826 normally project about $\frac{3}{32}$″ above the strip 1805, must rise about $\frac{3}{32}$″ to engage a #5 projection 1767, $\frac{4}{32}$″ to engage a #6 projection, $\frac{5}{32}$″ for #7, $\frac{7}{32}$″ for #8, $\frac{9}{32}$″ for #9 and can rise about $\frac{9}{32}$″ when no projection 1767 is above them. In lane 22, the sensing pin 1827 normally projects about ⅛″ above the strip 1805, must rise about $\frac{3}{32}$″ for engaging a #1 control projection 1767, $\frac{4}{32}$″ for #2, $\frac{5}{32}$″ for #3, $\frac{7}{32}$″ for #4, $\frac{9}{32}$″ for #5, $\frac{11}{32}$″ for #6, $\frac{13}{32}$″ for #7, $\frac{15}{32}$″ for #8, and can rise about $\frac{17}{32}$″ when no control projection 1767 is above it. Similar sensing pins can be provided in lanes 23, 24 and 25. The above-mentioned dimensions can, of course, be varied.

Certain ones of the automatic controls resulting from the raising of the rightward ends of the control levers 1831 to 1846 when upward movements of the sensing pins 1811 to 1826 are limited by control projections 1784 or 1767 must, as will become apparent hereinafter, be maintained beyond that time in the machine cycle at which the sensing pins must be restored to normal prior to movement of the paper carriage to another columnar position. For that purpose, means are provided to latch certain ones of the bell cranks 1853 to 1868 in the positions to which they are rocked by their control levers 1831 to 1847 until a time in the machine cycle subsequent to the restoration of the sensing pins 1811 to 1827. Provision is also made to latch the bell crank 1596 in rocked position for reasons which will appear hereinafter.

Forwardly of the lower ends of the downward arms of the bell cranks 1590 and 1853 to 1861 (Figs. 32 and 33) is a wide latch bail 1921 having at each side near its front edge a down-turned portion by which it is pivotally mounted on a headed screw stud 1922 threaded into the frame side plate 27. The rear edge of the latch bail 1921 has across its full width, a down-turned flange 1923 which is beveled on its forward side to a sharp lower edge and cooperates with complementarily beveled projections 1924 on each of the bell cranks 1590, 1853, 1854, 1855, 1856, 1858, 1859 and 1860. The bell cranks 1857 and 1861 are without such projections 1924. The bail 1921 is urged clockwise by a tension spring 1925 connected between the rearward portion of the bail and a stud 1926 secured in the plate 27.

Two similar but narrower latching bails 1927 and 1928 are pivotally mounted side by side on a headed screw stud 1929 also secured in the plate 27. The leftward latching bail 1927 cooperates with latching projections 1924 on the downward arms of the bell cranks 1862, 1863 and 1864 and is urged clockwise by a tension spring 1930 connected between a downward arm 1931 on the left side of the latching bail 1927 and the stud 1926. The spring 1930 yieldingly holds the arm 1931 of the latching bail 1927 in engagement with the rear of a stud 1940 secured in the rear portion of a slide 956 forwardly and rearwardly slidably mounted on studs secured in and extending rightwardly from the plate 27. The slide 956 is operated from the shaft 126 as described in detail in my original application.

The rightward latching bail 1928 cooperates with latching projections 1924 on the downward arms of the bell cranks 1865, 1867 and 1868 and has on its right side a downward arm carrying a stud 1932 which is yieldingly held in the forward side of a downwardly open wide notch in the rear end of a link 1933 by a tension spring 1934 connected between the last-mentioned arm and an upward projection on the link 1933. That upward projection on the link 1933 is pivotally supported on a stud 1935 secured in a downward arm on the right side of the latching bail 1921. The forward end of the link 1933 is pivotally connected to the downward arm 1936 of a bell crank which is pivotally mounted on a stud 595 secured in the plate 27 and has a forward arm 1937 normally engaged against the underside of a roller 1015 mounted on a stud secured in and extending leftwardly from a cam disk 592 secured on a hub pinned on the shaft 126.

Early in each cycle of operation of the machine, as the roller 1015 leaves the arm 1937, the spring 1925 rocks the bail 1921 clockwise, moves the link 1933 forward and rocks the bail 1928 and the bell crank 1936, 1937 clockwise so that the rear latching flanges of the bails 1921 and 1928 are moved downward into cooperation with the projections 1924. At about the same time, the slide 956 moves forward so that the spring 1930 rocks the latching bail 1927 to latching position at about the same time as the latching bails 1921 and 1928 are rocked to latching position. This occurs after the control arms 1834 to 1841, inclusive, have been fully raised but before the other control arms have risen. This permits the rear flange of the latching bail 1921 to move down in front of the latching projections 1924 on any of the bell cranks 1856, 1858, 1859 and 1860 which may have been rocked. If any of the sensing pins 1811, 1812, 1813, 1822, 1823, 1825 and 1826, when they are subsequently elevated, are blocked by control projections 1784 or 1767 so that the rearward arms of any of the bell cranks 1853, 1854, 1855, 1864, 1865, 1867 and 1868 are raised, the bevels on the rear latch flanges on the bails 1921, 1927 and 1928 and the complementary bevels on the projections 1924 on the downward arms of the last-mentioned bell cranks can cam the latching bails 1921, 1927 and 1928 counterclockwise sufficiently to permit those projections to pass to the rear of the flanges on the latching bails which then snap down in front of the projections to latch the rocked bell cranks in their rocked positions. None of the bell cranks 1856, 1858, 1859 or 1860 is released at that time as their control levers 1834, 1836, 1837 and 1832 are still held elevated by the cams 1898, 1900, 1901 and 1902.

The clockwise movements of the bell crank 1936, 1937 and of the latching bails 1921 and 1928 are limited by mutual engagement of stop projections 1938 and 1939 on adjacent portions of the arm 1936 and link 1933.

Shortly before the end of the rotation of the shaft 126, a second roller 1941 supported on a stud in the cam disk 592 engages and depresses the arm 1937, thereby restoring the bell crank 1936, 1937, the link 1933 and the latching bails 1921 and 1928 to normal, and releasing any bell cranks held in their rocked positions by those latching bails. The roller 1941 holds the arm 1937 depressed until, just before the completion of the rotation of the shaft 126, the roller 1015 again holds the arm 1937 in its normal position. The slide 956 is not restored until a little after the stud 1941 restores the latching bails 1921 and 1928 so that the latching bail 1927 remains in latching position a little longer than the bails 1921 and 1928.

*Controls operated by sensing means*

A detailed disclosure of all of the automatic controls effected by the projections 1767 and 1784 in all of the control lanes for which sensing pins 1811 to 1827 are shown in Fig. 138 is contained in my original application previously mentioned. The following description covers only those particular ones of the automatic controls with which the present invention is directly concerned.

LANE 1.—SKIP-TABULATION FROM SKIP BAR

The long projections 1784 in lane 1 are the elements on the carriage which, during tabulating or skip-tabulating movement of the paper carriage in machine cycles initiated by depression of the "Skip" bar 292, engage and depress the cam arm 1569 (Figs. 38 and 40) to release the arm 1567 and the tabulation control shaft 1348 to determine the columnar positions of the carriage in which tabulating or skip-tabulating movements of the carriage will terminate. Short projections 1784 in lane 1 would not depress the cam arm 1569 and would not have any effect at all in the illustrated machine.

LANE 2.—CARRIAGE RETURN FROM RETURN BAR

The long projections 1784 in lane 2 are the control elements which, during return movements of the paper carriage in machine cycles initiated by depression of the "Return" bar 294, depress the cam arm 1603 (Figs. 38 and 40) to rock the arm 1601 to release the arm 1602 and carriage-return control shaft 1349 to determine the columnar positions in which such return movements of the paper carriage will be terminated. Short projections 1784 in lane 2 also would be without any effect in the illustrated machine.

LANE 3.—AUXILIARY CONTROL OF CARRIAGE MOVEMENTS

Limitation of upward movement of the sensing pin 1811 by control projections 1784 in lane 3 can produce any one of a number of useful variations of the columnwise movements of the paper carriage depending upon which of certain other carriage movement control means are active in the same machine cycle, and will be explained under individual headings.

*Single column return from Return bar*

Normally, as previously explained, in a machine cycle initiated by depression of the "Return" bar 294, the paper carriage is moved in the return direction from its current columnar position to a columnar position automatically selected by a long control projection 1784 in lane 2, regardless of the number of intervening columnar positions. Under circumstances which are identical except that the sensing pin 1811 encounters a control projection 1784 in lane 3, the return movement of the carriage will be arrested by the first column stop 1323 which, in the return movement of the carriage, arrives between the counterstops 1324 and 1325.

The downward arm of the bell crank 1853 (Fig. 33) has a latching projection 1924 to cooperate with the latch bail 1921 and carries a stud 1942 (Fig. 38) extending leftwardly somewhat forwardly of the downward arm of the bell crank 1599, through an opening in the frame side plate 27. A yoke 1943 is pivotally mounted on a stud 1944 secured in and extending leftwardly from the plate 27. A downward arm 1945 on the rightward side of the yoke has a lug connected to the forward end of a tension spring 1946 which is connected at its rear end to the stud 1942 so that it yieldingly holds the arm 1945 in contact with the front of the stud. An arm 1947 on the left side of the yoke 1943 extends downwardly and rearwardly under the lower end of a slide 1948 having a vertically elongated slot through which the stud 1560 extends, the slide being positioned between the member 1553 and a spacing washer on the stud. A stud 1949 (Fig. 33) secured in the slide 1948 extends forwardly through a vertically elongated slot in the member 1553 and is shouldered for guidance on the front face of the latter member along the side edges of the slot. A tension spring 1950 connected at its upper end to the stud 1949 and at its lower end to a stud secured in the member 1553 urges the slide 1948 downward. The slide 1948 has a lower rearward projection 1951, the upper edge of the rear end of which is slightly rightward of but below a downward projection 1952 (Fig. 38) on the lower edge of the rightward portion of the link 1595.

Depression of the "Return" bar 294, as previously described, initiates a machine cycle in which, unless the sensing pin 1823 encounters a control projection 1767 in lane 15, the carriage-return control shaft 1349 is rocked to cause a return movement of the carriage. Such depression of the "Return" bar 292 also, as previously explained, rocks the bell crank 1590 to lift the projection 1594 (Fig. 38) clear of the link 1595 and, if the sensing pin 1811 does not encounter a control projection 1784 in lane 3, thereby frees the yoke 1597 to enable its arm 1601 to latch the return control shaft 1349 and the arm 1602 in the return position until the cam arm 1603 of the yoke is depressed by a long control projection 1784 in lane 2.

When upward movement of the sensing pin 1811 is limited by a control projection 1784 in lane 3, the rightward end of the control arm 1831 is raised and rocks the bell crank 1853 counterclockwise against the tension of a spring 1853' connected between the rearward arm of the bell crank 1853 and the stud 1549. The bell crank 1853, through the spring 1946, rocks the yoke 1943, the arm 1947 of which raises the slide 1948, the spring 1950 (Fig. 33) yielding to the spring 1946, to place the rear end of the upper edge of the projection 1951 directly rightward of the projection 1952 on the link 1595 whereby the yoke 1597 and its arm 1601 are prevented from rocking to latch the arm 1602 and the return control shaft 1349 in the return position. Such rocking of the bell crank 1853 is completed prior to rearward movement of the stud 1499 (Fig. 27). The latching bail 1921 cooperating with the latching projection 1924 on the bell crank 1853 holds the parts in their moved positions until after the stud 1499 has moved rearwardly and again returned to its normal position. Consequently, when the return control shaft 1349 is rocked to the return position in a machine cycle in which a control projection 1784 in lane 3 is encountered by the sensing pin 1811, the return control shaft 1349 is permitted to return to normal position immediately the stud 1501 (Fig. 27) passes the cam projection 1500, so that the return movement of the carriage will be stopped by the first active column stop 1323 to the left of the stop 1323 which was between the counterstops 1324 and 1325 when the machine cycle was initiated. Upon restoration of the latching bail 1921, the spring 1950 and the above-mentioned spring connected to the rearward arm of the bell crank 1853 return the latter and the parts operated thereby to their normal positions.

*Skip-tabulation from Return bar*

As will be explained hereinafter, if the sensing pin 1823 encounters a #5 control projection 1767 in lane 15 in a machine cycle initiated by depression of the "Return" bar 294, the carriage return movement which would occur in the absence of the #5 control projection 1767 in lane 15 will be suppressed and, instead, a skip-tabulation of the carriage under control of the yoke 1562 and a long projection 1784 in lane 1 will occur, such movement being the same as would have resulted, as previously described, from depression of the "Skip" bar 292. Though the long projection 1767 in lane 15, by itself, merely causes the effects of depression of the "Return" bar 294 to become the same as the effects of depression of the "Skip" bar 292, this becomes very useful in combination with the effects produced by a #5 control projection 1767 in lane 18 as will be explained hereinafter. However, in combination with a #5 control projection 1767 in lane 15, a control projection 1784 in lane 3 will cause another variation in paper carriage movement occurring in a machine cycle initiated by depression of the "Return" bar 294.

Depression of the "Return" bar 294, as previously described, rocks the bell crank 1590 counterclockwise. A lever 1953 (Figs. 31, 36 and 38), pivotally supported at its left end on a shouldered spacing collar on the stud 1552 (Figs. 36 and 38), has a forked rightward end embracing the rearward arm of the bell crank 1590 and has a downward projection 1954 (Fig. 38) which normally is positioned immediately to the left of an upward projection 1955 on the rightward end of a link 1956 slotted in its rightward portion for lengthwise sliding support on the stud 1560. The left end of the link 1956 is pivotally connected with a downward arm 1957 on the forward end of a yoke 1958 pivotally supported on the stud 1563 between spacing collars between the sides of the yoke 1562 and urged clockwise by a tension spring 1959 connected between the arm 1957 and the stud 1565. The yoke 1958 has on its rearward side a downward arm 1960 shouldered similarly to the arm 1566 of the yoke 1562 for similar cooperation with the flanged arm 1567 secured on the carriage-tabulation control shaft 1348. The link 1956 also has, leftwardly of the projection 1955, a second upward projection 1961 which, normally, is immediately at the right of the rear end portion of an upper rearwardly projecting lug 1962 of the slide 1948.

The counterclockwise rocking of the bell crank 1590 by the depression of the "Return" bar 294, previously explained, lifts the projection 1954 on the lever 1953 clear of the projection 1955 of the link 1956. However, the lug 1962 is still in the path of the projection 1961 so that if full upward movement of the sensing pin 1811 is not blocked, the yoke 1958 and its arm 1960 cannot rock to latch the arm 1567 and the tabulation control shaft 1348 in tabulating position when the latter is rocked to that position in a machine cycle in which the sensing pin 1823 encounters a #5 control projection 1767 in lane 15. However, the stud 1739 (Fig. 31) which is pulled forwardly by depression of the "Return" bar 294 also extends leftwardly immediately behind the upper arm of the lever 1543 so that, through the link 1545 and the bell crank 1546, the lever 1551 (Fig. 38) is also raised to lift the projection 1557 clear of the projection 1558 when the "Return" bar 294 is depressed. Thus, the yoke 1562 is free and its arm 1566 will latch the tabulation control shaft 1349 in tabulating condition when it is rocked thereto in a machine cycle initiated by depression of the "Return" bar 294 with a #5 control projection 1767 effective in lane 15 but without a control projection 1784 effective in lane 3. The resulting skip-tabulation of the carriage is, therefore, the same as would result from depression of the "Skip" bar 292 in the same circumstances. The usefulness of this will be explained later in connection with lane 18.

Though the lifting of the arm 1593 and its projection 1594 by the depression of the "Return" bar 294 frees the link 1595 and yoke 1597, that is without effect when the return control shaft 1349 remains in its normal position as it does in machine cycles in which a #5 projection 1767 is effective in lane 15.

When both a #5 projection 1767 in lane 15 and a projection 1784 in lane 3 are effective in a machine cycle initiated by depression of the "Return" bar 294, the raising of the slide 1948, which occurs when the upward movement of the sensing pin 1811 is restricted, places the projection 1951 (Fig. 38) immediately at the left of a downward projection 1963 on the link 1559 so that the yoke 1562 and its latch arm 1566 are latched in ineffective position while, at the same time, the lug 1962 is lifted clear of the projection 1961 so that the yoke 1958 and its latch arm 1960 are free to latch the arm 1567 and tabulating control shaft 1348 in tabulating position when they are rocked thereto because of the effectiveness of the #5 projection 1767 in lane 15. Thus, the carriage will be moved in the tabulating direction until, in the course of that movement, a long projection 1787 in lane 3 engages and depresses a cam arm 1964 on the forward end of the yoke 1958 to rock it and its latch arm 1960 to release the arm 1567 to permit the tabulation control shaft 1348 to return to normal, and until, during further movement of the carriage in the tabulating direction, a column stop 1323 first depresses the counterstop 1325 and link 1345 to disengage the tabulating clutch and restore the counterstop 1324 and then becomes engaged between the counterstops 1324 and 1325. As is also true with regard to the cam arm 1569 of the yoke 1562 and the cam arm 1603 of the yoke 1597, only a long control projection 1784 can engage the cam 1964 and rock the yoke 1958 to releasing position.

The lug 1572 extends over the cam arm 1964 to trip the yoke 1958 if it is in latching position when the arm 1571 is depressed by the lug 1483 when the carriage enters its extreme leftward position.

Means to be described hereinafter renders a control projection 1784 in lane 3 above the sensing pin 1811 ineffective in machine cycles initiated by depression of the "Skip" bar 292.

Thus, with the paper carriage in a columnar position where a #5 control projection 1767 in lane 15 is above the sensing pin 1823 and either a long or a short control projection 1784 in lane 3 is above the sensing pin 1811, the operator of the machine has the option of initiating the machine cycle by depression of the "Skip" bar 292 and obtaining a skip-tabulation of the carriage to a columnar position determined by a long projection 1784 in lane 1, the option of initiating the machine cycle by depression of the "Return" bar 294 and obtaining a skip-tabulation of the carriage to a columnar position determined by a long projection 1784 in lane 3, the option of initiating the machine cycle by depression of the "Vertical" bar 293 and having the paper carriage remain in the same columnar position, and the further option of initiating the machine cycle by depression of the "Main" motor bar 291. In the event the "Main" motor bar 291 is depressed and the projection 1784 in the lane 3 above the sensing pin 1811 is a short one, that is, only long enough to insure full elevation of the slide 1948 if the "Skip" bar 292 or "Vertical" bar 293 is not depressed, all three yokes 1562, 1597 and 1958 are held in ineffective position, the yoke 1562 by projections 1963 and 1951, the yoke 1597 by the projections 1951, 1952 and 1594, and the yoke 1958 by the projections 1954 and 1955, so that a single-column tabulation of the carriage results.

Skip-tabulation from Main motor bar

In a machine cycle which is initiated by depression of the "Main" motor bar 291 with the carriage in a columnar position where a long control projection 1784 in lane 3 is above the sensing pin 1811, the carriage will be moved in the tabulating direction to a columnar position determined by another long control projection 1784 in lane 3. This is the same carriage movement as would be obtained if the machine cycle were initiated by depression of the "Return" bar 292 in the same circumstances, provided also that a #5 control projection 1767 in lane 15 is above the sensing pin 1823. The utility of that effect of the lane 3 control will be explained fully later in connection with lane 18. The long control projection 1784 in lane 3 above the sensing pin 1811 varies the effects of depression of the "Return" bar 294 only in the same way as does a short projection 1784 as previously described.

When there is a long control projection 1784 in lane 3 above the sensing pin 1811 but no #5 control projection 1767 in lane 15 above the sensing pin 1823, the operator has the option of initiating the machine cycle by depressing the "Main" motor bar 291 and obtaining a skip-tabulation of the carriage to a columnar position determined by another long projection 1784 in lane 3, the option of initiating the machine cycle by depressing the "Return" bar 294 and obtaining a single-column return movement of the carriage, the option of initiating the machine cycle by depression of the "Skip" bar 292 and obtaining a skip-tabulation of the carriage to a columnar position determined by a long projection 1784 in lane 1, and the option of initiating the machine cycle by depression of the "Vertical" bar 293 and having the paper carriage remain stationary in the same columnar position.

Such "long" control projection 1784 in lane 3 is of a length sufficient to cause the control lever 1831 (Fig. 38), as the crank 1893 is rotated, to rock the bell crank 1853 far enough to cause the stud 1942 to engage the bell crank 1590 and rock the latter and the lever 1953 far enough to permit the latching projection 1924 on the downward arm of the bell crank 1590 to be latched by the latching bail 1921 and to lift the projection 1954 on the arm 1593 clear of the projection 1955 on the link 1956, whereby the yoke 1958 is freed so that its latch arm 1960 can latch the arm 1567 and the tabulation control shaft 1348 in tabulating position when the latter are rocked to that position. Near the end of the machine cycle, after the carriage tabulating clutch has been coupled and the arm 1567 has been latched by the arm 1960 of the yoke 1958, the latch bail 1921 is returned to normal releasing position. Consequently, the carriage will skip-tabulate to a columnar position determined by another long control projection 1784 in lane 3 engaging the cam arm 1964 and rocking the yoke 1958 to releasing position.

It is to be noted that as the cam arm 1964 is rightward of the sensing pin 1811, a long control projection 1784 in lane 3 which acts on the sensing pin 1811 to cause a skip-tabulation of the carriage is moved away from the cam arm 1964 instead of toward it by such movement of the carriage and so could not participate in terminating that carriage movement though it can act on the cam arm 1964 to bring about the termination of a lane 3 skip-tabulation starting from a preceding columnar position. However, because of the number of controls which the machine has for initiating and terminating skip-tabulation of the paper carriage, the above-mentioned restriction on the use of long control projections 1784 in lane 3 alone to bring about skip-tabulations of the carriage does not result in any important limitation of the adaptability of the machine to various kinds of work.

In any case in which it may be desirable to obtain lane 3 controlled skip-tabulations of the paper carriage in a machine cycle initiated by depression of the "Main" motor bar 291 without using a long control projection 1784 in lane 3 except for tripping the lane 3 latch yoke 1958 to select the terminal columnar positions of such skip-tabulations, it is only necessary to insert in the aperture in the mid-portion of the lever 1593 a stud 1965 (indicated in dot-dash lines in Fig. 38) projecting rearwardly over a lug 1966 extending forwardly from the lower edge of the control lever 1831. The parts are so proportioned that, when the rise of the lane 3 sensing pin is restricted by control projection 1784 of a length (such as indicated by the dotted line in Fig. 40) intermediate the lengths of the long and the short control projections 1784, the control lever 1831, acting through the lug 1966 and the stud 1965, will lift the lever 1593, the rearward arm of the bell crank 1590 and the lever 1953 sufficiently to disengage the latching lug 1954 clear of the projection 1955 of the link 1956 while the lug 1962 of the slide 1948 is lifted clear of the projection 1961 of the link 1956 in the manner previously described. The bell cranks 1853 and 1590 are then held in their rocked positions by the latching bail 1921 and thus hold the slide 1948 and lever 1953 in their elevated positions so that when the tabulating control shaft 1348 and its arm 1567 are rocked to tabulating position, the yoke 1958 and its arm 1960 may rock to latch the arm 1567 and shaft 1348 in tabulating position until the yoke 1958 is tripped as previously described by a long projection 1784 in lane 3.

If, instead of inserting the stud 1965 in the lever 1593, the lever 1953 is removed from the machine, a lane 3 controlled skip-tabulation of the carriage will be produced if the rise of the sensing pin 1811 is restricted by a short control projection 1784 in a machine cycle initiated by depression of the "Main" motor bar 291. After removal of the lever 1953, the link 1956 and yoke 1958 are latched only by the lug 1962 of the slide 1948. It will be remembered that the slide 1948 is raised when the sensing pin 1811 encounters a short projection 1784 so that the yoke 1958 and its arm 1960 are then free to latch the arm 1567 and shaft 1348 in tabulating position when the latter are rocked thereto.

LANE 4.—AUTOMATIC SKIP-TABULATION

The presence of a control projection 1784 in lane 4 above the sensing pin 1812 in a machine cycle initiated by depression of the "Main" motor bar 291 results in a skip-tabulating movement of the carriage to a columnar position selected by a long projection 1784 in lane 4.

A squared stud 1967 (Fig. 38), secured in the control lever 1832 near its rightward end, is normally immediately at the left of a latching projection 1968 on the rightward end of a link 1969 slotted for endwise sliding guidance on the stud 1560 between spacing washers thereon. The leftward end of the link 1969 is pivotally connected to a downward arm 1970 on the forward end of a yoke 1971 which is pivoted on the stud 1563 between spacing washers between the ends of the yoke 1958. A tension spring 1972 connected between the stud 1565 and the arm 1970 urges the yoke 1971 clockwise but such movement is normally prevented by the stud 1967. At its rear end the yoke 1971 has a downward latch arm 1973 formed like the latch arm 1960 and adapted for similar cooperation with the flange of the arm 1567. At its forward end, the yoke 1971 has an upwardly leftwardly inclined arm 1974 with a cam end directly rightward of the sensing pin 1812 and normally just below the path of the long projections 1784 in lane 4. The lug 1572 also extends over the cam arm 1974 to trip the yoke 1971 if it is in latching position when the arm 1571 is depressed by the lug 1483 when the carriage enters its extreme leftward position.

When upward movement of the sensing pin 1812 is limited by a control projection 1784 above it in lane 4 during rotation of the crank 1893, the right end of the control lever 1832 is raised to lift the stud 1967 clear of the latching projection 1968 and the bell crank 1854 is rocked to move the latching projection 1924 (Fig. 33) on the downward arm thereof rearward of the latch bail 1921 which then holds the bell crank 1854 and the rightward end of the control lever 1832 with its stud 1967 in such positions until near the end of the machine cycle. Thus, when the tabulation control shaft 1348 and its arm 1567 are rocked to their tabulating positions during the machine cycle, the yoke 1971 is free to rock so that the arm 1973 latches the arm 1567 and tabulation control shaft 1348 in tabulating position and raises the cam end of the arm 1974 into the path of the long projections 1784 in lane 4. When, in the course of the resulting tabulating movement of the carriage, a long projection 1784 in lane 4 depresses the cam end of the arm 1974, the yoke 1971 and the arm 1973 are rocked to release the arm 1567 and tabulation control shaft 1348 which immediately returns to normal position after which the carriage is arrested in the manner previously explained.

If a control projection 1784 in lane 4 is above the sensing pin 1812 while the carriage occupies a columnar position in which a long control projection 1784 in lane 3 is above the sensing pin 1811, both of the yokes 1958 and 1971 rock to latching position when the tabulation control shaft 1348 and its arm 1567 are rocked to tabulating position but, because of a slight downward inclination from the front to the rear of the latch flange of the arm 1567, the shoulder of the arm 1960 holds the flange of the arm 1567 slightly above the shoulder of the arm 1973 so that the latter arm, if moved to releasing position, can again return to latching position as long as the arm 1960 remains in latching position. However, if the arm 1960 is moved to releasing position, the flange of the arm 1567 is lowered to engage the shoulder of the arm 1973 and blocks return of the arm 1960 to latching position. Thus, to terminate the resulting skip-tabulation of the carriage, it is necessary either that long projections 1784 in lanes 3 and 4 cause both yokes 1958 and 1971 to be in releasing position at the same time or that a long projection 1784 in lane 4 must rock the yoke 1971 to releasing position after a long projection 1784 in lane 3 has rocked the yoke 1958 to releasing position.

For obtaining skip-tabulations of the paper carriage in cycles of machine operation, three mutually independent means have previously been described. Obviously, by the independent use of two or all three such means, it is possible to obtain overlapping skip-tabulations of the paper carriage, that is, skip-tabulations, one of which terminates in a columnar position between the starting and terminal columnar positions of another, and/or one of which starts from a columnar position between the starting and terminal columnar positions of another. Only one such previously described means does not require the operator to choose the "Skip" bar 292 or the "Return" bar 294 for depression to initiate the machine cycle. However, by placing a control projection 1784 in lane 4 so that it is above the sensing pin 1812 when a long control projection 1784 in lane 3 is simultaneously above the sensing pin 1811, overlapping skip-tabulations in machine cycles initiated by depression of the "Main" motor bar 291 alone are also obtainable.

LANE 5.—AUTOMATIC SELECTIVE CARRIAGE RETURN

In a machine cycle initiated by depression of the "Main" motor bar 291, either a short or a long control projection 1784 in lane 5 above the sensing pin 1813 will cause the paper carriage to be moved in the return direction to a columnar position automatically selected by a long projection 1784 in lane 5.

A square stud 1975 (Fig. 38) secured in the control lever 1833 near its rightward end is normally immediately rightward of the rightward end of a link 1976 slotted for endwise sliding guidance on the stud 1560. The leftward end of the link 1976 is pivotally connected to a downward arm 1977 on the forward end of a yoke 1978 pivotally supported on the stud 1598 with its rear end confined between a spacing collar and a spring clip engaged in a circumferential groove in the stud. The yoke 1978 is urged counter-clockwise by a tension spring 1979 connected between the stud 1600 and the arm 1977. A downward arm 1980 on the rear end of the yoke 1978 is shaped like the arm 1601 for similar cooperation with the flange of the arm 1602 secured to the return control shaft 1349.

Figure 28:
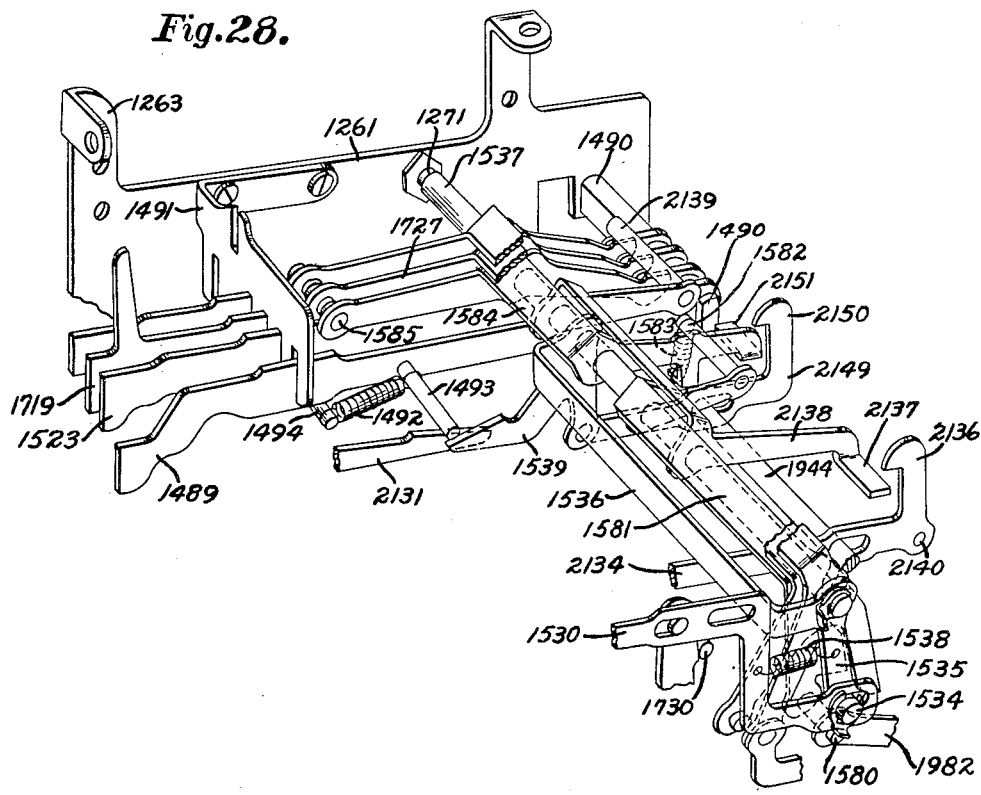
Fig. 28 is another perspective including certain of the elements of Fig. 26 and additional control elements involved in the control of the carriage.

The downward arm of the bell crank 1855 (Figs. 30 and 31) has a latching projection 1924 for cooperation with the latching bail 1921 and carries a stud 1981 projecting through the rearward end of an elongated slot in the rear portion of a link 1982 pivotally secured on the stud 1580 (see also Fig. 28).

When the rightward end of the control lever 1833 (Fig. 38) is elevated as the upward movement of the sensing pin 1813 is stopped by a control projection 1784 in lane 5, the stud 1975 is raised above the rightward end of the link 1976 so that the yoke 1938 is freed. The rocking of the bell crank 1855 by the control lever 1833 places the latching projection 1924 of the bell crank 1855 rearward of the flange 1923 (Fig. 30) of the latching bail 1921 so that the stud 1975 is held in its elevated position until the latching bail 1921 is restored. Through the link 1982 and stud 1580, the rocking of the bell crank 1855 also rocks the bail 1581 (Fig. 28) counter-clockwise to lower the forward end of the carriage-return control link 1523 into the path of the stud 1499 so that, when the stud 1501 (Fig. 27) acts on the cam projection 1500, the return control shaft 1349 will be rocked to initiate a return movement of the paper carriage.

When the return control shaft 1349 and its arm 1602 (Fig. 38) are rocked to their return position, the arm 1602 is latched by the arm 1980 and the cam end of an arm 1983 on the forward end of the yoke 1978, which cam end is normally immediately below the path of long projections 1784 in lane 5, is elevated into that path. The return control shaft 1349 is thereby maintained in the return position until a long projection 1784 in lane 5 depresses the cam arm 1983, after which the movement of the carriage is stopped by a column stop 1323 and the counterstops 1324 and 1325 as previously explained.

The lug 1606 also extends over the arm 1983 to trip the yoke 1978 if it is in latching position when the arm 1605 is depressed by the lug 1481 when the carriage moves into its extreme rightward position.

LANE 15.—AUTOMATIC SKIP-TABULATION OF CARRIAGE FROM RETURN BAR
*Disabling automatic control of machine cycling by Return bar, Vertical bar and Skip bar*

In a machine cycle in which the rise of the sensing pin 1823 is limited by a #5 control projection 1767 in lane 15, the controls for the carriage-return control link 1523 (Fig. 28) will be locked in ineffective position so that a skip-tabulation of the paper carriage will occur in a machine cycle in which the "Return" bar 294 is depressed. If the "Return" bar is depressed and the rise of the sensing pin 1811 is limited by a control projection 1784 in lane 3 while a #5 control projection 1767 is effective in lane 15, a lane 3 controlled skip-tabulation of the carriage will occur, as has already been explained, although, if the rise of the sensing pin 1811 is not limited by a control projection 1784 in lane 3, a lane 1 controlled skip-tabulation of the paper carriage will occur.

A third function of the lane 15 control is to block the disabling effect of depressions of the "Return" and "Skip" bars 294 and 292 upon the automatic machine cycling control of lane 21 to be described hereinafter. If the rise of the sensing pin 1826 is limited by a #8 or longer control projection 1767 in lane 21 in a machine cycle in which the sensing pin 1823 encounters a #7 or longer control projection 1767 in lane 15, such machine cycle, if initiated otherwise than by depression of the "Vertical" bar 293, will be followed by an automatically initiated further cycle of operation in the machine. If the rise of the sensing pin 1826 is limited by a #8 or longer control projection 1767 in lane 21 in a machine cycle in which the sensing pin 1823 does not encounter a #7 or longer control projection 1767 in lane 15, such machine cycle, only if initiated otherwise than by depression of any of the small motor bars 292, 293, and 294, will be followed by an automatically initiated machine cycle.

To prevent the "Return" bar 294 from causing the carriage to be returned, the bell crank 1865 (Figs. 30 and 31) has a forward third arm in which is secured an adjustable eccentrically mounted stud supporting a roller 2035 which is normally held in an upper ineffective position by a tension spring 2036 connected at its upper end to the rearward arm of the bell crank 1865 and at its lower end to a stud 2037 (Fig. 36) secured in the frame side plate 27. The downward arm of the bell crank 1865, in place of a projection 1924 with a single latching point such, for example, as is provided on the bell crank 1855, has a latching projection 2038 (Fig. 31) with two forwardly and rearwardly spaced latching points to cooperate with the latching bail 1928.

A #5 control projection 1767 in lane 15 above the sensing pin 1823 in a machine cycle will so restrict the rise of that sensing pin that the control lever 1843 will rock the bell crank 1865 far enough to place the forward latching tooth on its projections 2038 behind the latching flange on the bail 1928 and lower the roller 2035 sufficiently to cooperate with a cam projection 2040 on the rear edge of the downward right side arm of the yoke 1581 to suppress return of the carriage.

As previously explained, the yoke 1581 is rocked counterclockwise by depression of the "Return" bar 294 and by the lane 5 automatic control when a control projection 1784 limits the rise of the sensing pin 1813. Such rocking of the yoke 1581 depresses the forward end of the carriage-return control link 1523 (Fig. 28) which, acting through the yoke 1587 (Fig. 27) and its studs 1586 and 1589, raises the forward end of the carriage-tabulation control link 1489 so that, near the end of the machine cycle, the stud 1499 moves the link 1523 instead of the slide 1439 rearward and brings about a return movement of the paper carriage. However, as the roller 2035 is depressed to its lower effective position when the rise of the sensing pin 1823 is limited by a #5 control projection 1767 in lane 15, the roller acts on the cam projection 2040 to restore the yoke 1581 which then permits the spring 1524 to return the forward end of the return control link 1523 to its normal position out of the path of the stud 1499 and permits the spring 1492 to lower the forward end of the tabulation control link 1489 to its normal position in the path of the stud 1499 so that, after printing, the carriage-tabulating clutch will be engaged if the machine cycle was initiated otherwise than by depression of the "Vertical" bar 293 which, when depressed, raises the forward end of the tabulation control link 1489 and holds it elevated independently of the return control link 1523 and yoke 1587, as previously explained.

Upon restoration of the latching bail 1928, the bell crank 1865 is returned to normal by the spring 2036.

The stud 1730 (Fig. 31), which is carried by the upper arm of the lever 1576, extends leftwardly behind the upper arm of the lever 1543 so that, when the stud 1730 is pulled forwardly by depression of the "Return" bar 294, the latch arm 1551 (Figs. 31 and 38) is rocked to lift the projection 1557 clear of the projection 1558 so that, when the tabulation control shaft 1348 is rocked to tabulating position, the arm 1567 thereon is latched by latch arm 1566 of the yoke 1562 just as in a machine cycle initiated by depression of the "Skip" bar 292. Thus, in a machine cycle in which either the "Return" bar 294 or the "Skip" bar 292 is in depressed position and the rise of the sensing pin 1823 is limited by a #5 control projection 1767 in lane 15 while no control projection 1784 is effective in lane 3, the carriage will receive a lane 1 controlled skip-tabulation, but if the rise of sensing pin 1811 is also limited by a control projection 1784 in lane 3, a lane 3 controlled skip-tabulation will result as previously explained.

To perform the above-mentioned third function of the lane 15 control, the downward arm of the bell crank 1865 (Figs. 30 and 31) has a stud 2041 secured in its lower end. The stud 2041 projects through an elongated slot in the rear end of a link 2042 and is normally held in the forward end of the slot by a tension spring 2043 connected at its rear end to the downward arm of the bell crank 1865 and at its forward end to an ear on the link 2042. The manner in which these parts control the effect of the small motor bars 292, 293 and 294 upon the lane 21 control will be explained hereinafter in connection with the description of the lane 21 control.

LANE 18.—AUTOMATIC REPEAT CYCLE FROM RETURN BAR

In a machine cycle in which the "Return" bar 294 is latched in depressed position by the latch slide 302 and in which the rise of the sensing pin 1825 is limited by a #5 control projection 1767 in line 18, the previously described means for operating the latch slide 302 to release the small motor bars 294, 293 and 292 is disabled by lifting the stud 368 (Fig. 33) clear of the shoulder 370. Consequently, the "Return" bar 294 is not restored in that machine cycle which, therefore, is followed automatically by another machine cycle just as though the "Return" bar 294 had been held depressed manually. That function of the lane 18 control is, however, suppressed in machine cycles in which either the "Vertical" bar 293 or the "Skip" bar 292 is in depressed position. It is without effect in machine cycles initiated by depression of the "Main" motor bar 291, which is not latched down by the latch slide 302, and in all other machine cycles in which no small motor bar is in depressed position.

A stud 2062 (Figs. 33 and 36) secured in the downward arm of the bell crank 1867 projects rightwardly through an elongated slot in the rear end of a link 2063. A tension spring 2064 connected at its rear end to the lower end of the downward arm of the bell crank 1867 and at its forward end to a downward projection of the link 2063, normally holds the stud 2062 at the forward end of the slot in the link 2063 and urges the rearward arm of the bell crank 1867 against the stud 1871. The forward end of the link 2063 (Fig. 33) is pivotally connected to the downward arm of a lever 2065 which is pivotally mounted on a stud 2066 secured in the frame side plate 27. The upward arm of the lever 2065 has a vertically elongated slot in its upper end embracing a stud 2067 secured in the lower end of a downward arm of a bell crank 2068 which is pivotally mounted on a stud 2069 secured in the frame side plate 27. The bell crank 2068 has a forward arm which has a rightwardly turned projection 2070 and underlies a stud 2071 secured in the rear end of the link 369.

When the rise of the sensing pin 1825 is limited by a #5 control projection 1767 in lane 18 in a machine cycle initiated otherwise than by depression of either the "Skip" bar 292 or the "Vertical" bar 293, the bell crank 1867 is rocked to place its latching projection 1924 behind the latching flange of the bail 1928 which holds the bell crank 1867 in its rocked position until after the link 369 has been pulled forwardly by the projection 251 of the cam 240 upon the roller 242 (Fig. 36). The bell crank 1867 acts through the spring 2064, the link 2063, the lever 2065, the bell crank 2068 and the stud 2071, to lift the rear end of the link 369 sufficiently to raise the stud 368 clear of the shoulder 370 so that, in that machine cycle, the link 356 is not actuated as previously described to move the latch slide 302 to releasing position. Thus, if the "Return" bar 294 is held down by the latch slide 302, it will remain held down to initiate a further machine cycle.

Upon restoration of the latching bail 1924, the bell crank 1867, link 2063, bell crank 2068 and stud 368 are restored to normal by the springs 371 and 2064 so that the "Return" bar 294 will be restored in the next machine cycle if, in such cycle, the rise of the sensing pin 1825 is not again restricted by a #5 control projection 1767.

Each of the links 1530 and 1540 which are pulled forwardly, as previously described, by depression of the "Vertical" bar 293 and of the "Skip" bar 292, respectively, has an upwardly and forwardly directed hook projection 2072 (Fig. 33) rearwardly and, normally, just clear of the path of the projection 2070 on the forward arm of the bell crank 2068. When either of the links 1530 or 1540 is forward because of the respective one of the "Vertical" and "Skip" bars 293 and 292 being in depressed position, its hook 2072 is in the path of the projection 2070 and prevents the bell crank 2068 from raising the stud 268 from its normal position behind the shoulder 370 regardless of the rocking of the bell crank 1867 when the rise of the sensing pin 1825 is restricted.

The lane 18 control can easily be made to render the "Skip" bar 292 effective to cause repeat cycles of the machine by merely omitting or removing the hook 2072 from the link 1540. Also, provisions to enable the latch slide 302 to latch the main motor bar 291 down will enable the lane 18 control, described above, to render the "Main" motor bar 291 effective to cause repeat cycles.

This last-described feature has some very important advantages. By itself, it permits the operator to select a control of carriage movement which is to be effective in a machine cycle which will occur automatically following a machine cycle to be initiated manually by the operator who would have no opportunity to manipulate any controls at any time between the start of the first and the end of the second of those cycles. In combination with the previously-described lane 15 automatic control, when the carriage is in a position where #5 control projections 1767 in lanes 15 and 18 are over the sensing pins 1823 and 1825, it permits the operator to select for the automatically initiated second machine cycle, a control of carriage movement which will be held in abeyance or temporarily rendered ineffective during the manually initiated first machine cycle during which a different carriage movement may be effected under automatic control. In combination with both the lane 3 and the lane 15 automatic controls, when the carriage is in a position where a long control projection 1784 in lane 3 is above the sensing pin 1811 and #5 control projections 1767 in lanes 15 and 18 are above the sensing pins 1823 and 1825, it gives the operator the option of depressing the "Return" bar 294 to initiate a machine cycle in which the carriage movement will be as determined by the lanes 3 and 15 automatic controls and which machine cycle will be followed by an automatically initiated machine cycle, or of depressing the "Main" motor bar 291 to initiate a machine cycle in which the same carriage movement will occur but which will not be followed by an automatically initiated machine cycle. It will also be appreciated that in an automatically initiated machine cycle brought about by the lane 18 automatic control following a machine cycle initiated by depression of the "Return" bar 294, the control of the carriage movement may be determined either by the "Return" bar 294 and the lane 2 control or by the lane 15 or lanes 3 and 15 automatic controls.

LANE 21.—AUTOMATIC MACHINE OPERATION: KEYBOARD REPEAT: LOCKING KEYBOARD BETWEEN MACHINE OPERATIONS

Each machine cycle, initiated otherwise than by depression of the "Skip" bar 292, the "Vertical" bar 293 or the "Return" bar 294, in which the rise of the sensing pin 1826 is limited by any #5 to #8 control projection 1767 in lane 21, is followed by an automatically initiated machine cycle. If also the rise of the sensing pin 1823 is restricted by a #7 or longer control projection 1767 in lane 15, then regardless of how the machine cycle is initiated, the automatically initiated cycle will follow. In either case, if the rise of the sensing pin 1826 is restricted by a #5 control projection 1767 in lane 21, amounts set up on the keyboard will also be repeated in the automatically initiated machine cycle as disclosed in detail in my original application.

The downward arm of the bell crank 1868 (Figs. 30 and 36) has a latching projection 1924 to cooperate with the latching bail 1928 and carries a stud 2073 which projects rightwardly through an elongated slot in the rear end of a long link 2074. A tension spring 2075, connected at its rear end to the projection 1924 of the bell crank 1868 and anchored at its forward end on the stud 1929, urges the bell crank 1868 clockwise against the stud 1871. Another tension spring 2076, connected at its rear end to the downward arm of the bell crank 1868 and at its forward end to an upstanding ear on the link 2074, normally holds the stud 2073 at the forward end of the slot in the link 2074.

The forward end of the link 2074 (Fig. 99) has an elongated slot by which it is forwardly and rearwardly movably supported and guided upon the stud 386. Near its forward end, the link 2074 has an upward projection 2077 (Fig. 34), the forward portion of the upper edge of which normally stops the laterally turned end of a forward arm 2078 of a three-armed lever 2078, 2079, 2080, formed on the right-hand side of a yoke pivotally supported on the stud 254. The rearward arm 2079 has a shouldered rear end normally positioned slightly below the stud 378 and the downward arm 2080 is pivotally connected to the forward end of a link 2081, the rearward portion of which is supported and guided for forward and rearward movement between spacing collars on a stud 446 secured in the plate 27 and on a reduced portion of one of the collars. A tension spring 2082, connected at its forward end to a stud secured in an upward projection in the link 2081, urges the latter rearwardly and the three-armed lever 2078, 2079, 2080 counterclockwise. The rear end of the link 2081 is located forwardly of and normally above the path of a stud 2083 secured in a lever 594 which as fully explained in my original application, is rocked clockwise prior to printing and returned counterclockwise subsequent to printing in each machine cycle.

When, in a machine cycle initiated otherwise than by depression of the "Return" bar 294, "Vertical" bar 293 or "Skip" bar 292 when no #7 or longer control projection 1767 is effective in lane 15, the rise of the sensing pin 1826 is limited by any #5 to #8 control projection 1767 in lane 21, the bell crank 1868 (Fig. 30) is rocked to pull the link 2074 rearwardly so that the projection 2077 (Fig. 6) is positioned rearwardly of the laterally bent end of the arm 2078. Thereupon, the three-armed lever 2078, 2079, 2080 is rocked counterclockwise by the spring 2082 which pulls the link 2081 rearwardly and positions the notched rearward end of the arm 2079 in latching position under and in front of the stud 378 secured in the forward arm 253 of the member 231 which, with the shaft 139, is rocked clockwise in every manual initiation of a machine cycle. This occurs after the stud 2083 has been moved forwardly under the rear end of the link 2081 and, therefore, does not interfere with the rearward movement of the latter. Then, in the final portion of the machine cycle, while the arm 229 is restored to normal position momentarily, the arm 2079 holds the member 231 and shaft 139 against returning to their normal positions, so that, at the end of the machine cycle, the lug 196 can again move downwardly to initiate a further machine cycle automatically.

Upon the return of the arm 594 and stud 2083 to normal, the rear end of the link 2081 is pulled down into the path of the stud 2083 by the spring 2082 so that, early in the automatically initiated machine cycle, the stud 2083 pushes the link 2081 forwardly to rock the three-armed lever 2078, 2079, 2080 back to normal, whereby the laterally bent end of the arm 2078 is raised clear of the projection 2077. That permits the spring 2075 to move the link 2074 forwardly to place its projection 2077 under the arm 2078, so that the three-armed lever 2078, 2079, 2080 is again latched in normal position, unless at this time the rise of the sensing pin 1826 has again been restricted by another #5 to #8 control projection 1767 in lane 21, in which case the lever 231 is again latched in position to cause another machine cycle to be initiated automatically. However, in any machine cycle in which the projection 2077 is permitted to relatch the lever 2078, 2079, 2080 in its normal position, the member 231 and shaft 139 return to normal position so that a further machine cycle is not initiated automatically.

In a machine cycle initiated by depression of either the "Skip" bar 292, the "Vertical" bar 293 or the "Return" bar 294, in which no #7 or longer control projection is effective in lane 15, the lane 21 control is ineffective. A stud 2100 (Fig. 6) positioned immediately behind the downward arms of the levers 381, 384 and 388 which, as previously explained, are rocked counterclockwise by depression of the "Skip" bar 292, the "Vertical" bar 293 and the "Return" bar 294, respectively, is secured in the upper arm of a lever 2101 which is pivotally mounted on the shaft 139. The stud 2100 is located at a greater distance from the shaft 213 than is the stud 382. The lower arm of the lever 2101 is pivotally connected with the forward end of a link 2102, the rearward end of which (Fig. 30) is connected with the forward end of a tension spring 2103, the rear end of which is anchored on the stud 1926. The rearward part of the link 2102 has an elongated slot through which projects a stud 2104 secured in a downward arm on the left side of a latching bail 2105 which is pivotally mounted on the stud 2066 and has a latching flange 2106, the forward edge of which is normally above but very slightly rearward of the rear edge of an upward projection 2107 on the link 2074. A tension spring 2108, connected at its forward end to an ear on the link 2102 and at its rear end to the downward arm of the bail 2105, normally holds the stud 2104 at the front end of the slot in the link 2102.

When either the "Skip" bar 292, the "Vertical" bar 293 or the "Return" bar 294 is depressed in a machine cycle in which the rise of the sensing pin 1823 is not restricted by a #7 or longer control projection 1767 in lane 15, the lever 2101 is rocked to pull forwardly the link 2102 which, through the spring 2108, rocks the bail 2105 to place its flange 2106 immediately behind the projection 2107 so that the link 2074 is blocked and cannot be moved rearwardly to render effective the means for causing an automatic cycle and the means for disabling the releasing means for the keys 255. However, the forward end of the link 2042 has a slot through which the stud 2104 also projects, so that, if the rise of the sensing pin 1823 is limited by a #7 or longer control projection 1767 in lane 15, the consequent rocking of the bell crank 1865 pulls the link 2042 rearwardly and returns the latching bail 2105 to its normal position clear of the projection 2107 on the link 2074 because the spring 2043 is substantially stronger than the spring 2108. Thus, in a machine cycle in which a #7 or longer control projection 1767 in lane 15 is effective, the lane 21 control cannot be rendered ineffective by depression of the "Skip" bar 292, the "Vertical" bar 293 or the "Return" bar 294.

By shortening the downward arm of any of the levers 381, 384 or 388 so that it cannot act on the stud 2100, depression of the respective small motor bar 292, 293 and 294 will be disabled from rendering the lane 21 control ineffective to cause automatic machine operation regardless of the lane 15 control.

In addition to the advantages resulting from the last-described feature per se, that feature in combination with the lanes 15 and 18 automatic controls, when the carriage is in a position where a #7 or #5 control projection 1767 in lane 15 is above the sensing pin 1823 and #5 control projections 1767 in lanes 18 and 21 are above the sensing pins 1825 and 1826, gives the operator the option of initiating a first machine cycle which will be followed by an automatically initiated second cycle in which the carriage movement may be (a) that determined by depression of the "Return" bar 294 to initiate such first cycle with or without modification or conversion by the lanes 3 and 15 controls, (b) that determined by depression of the "Skip" bar 292 to initiate the first cycle, or (c) that determined by lane 3, lane 4 or lane 5 control if the "Main" motor bar 291 be depressed to initiate such first cycle.

It would seem apparent from the description thus far given, that the manual and automatic controls of the illustrated machine provide the operator with a wide choice of carriage movements to be obtained not only in manually initiated machine cycles but also in automatically initiated machine cycles.

*Means to disable automatic selection of machine functions*

The above-described means for automatic selection of machine functions, excluding the lane 2 control, are disabled upon rearward movement of the upper end of a manipulative control lever 2118 (Figs. 1, 25 and 41) which projects upwardly through a slot in the rightward portion of the casing member 64, from its counterclockwise position shown in full lines in Fig. 41 to its clockwise position indicated by dot-dash lines. At the same time, the forward end of the carriage-tabulation control link 1489 is raised and held above the path of the stud 1499 and the forward end of a line-spacing control link 1719 is lowered to effective position behind the stud 1499 so that the paper carriage will not be tabulated but as disclosed in my original application, a line-spacing rotation of the platen will be effected in each cycle of operation performed by the machine while the upper end of the control lever 2118 remains in its rearward position.

The lever 2118 is secured on a hub which is rotatably supported on the shaft 1498 between the left end of the hub of a carriage opening and closing key lever 1641 and a spring clip engaged in a circumferential groove in the shaft 1498 rightwardly of the frame side plate 27. A tension spring 2119, connected at its rear end to a stud on the downward arm of the lever 2118 and anchored at its forward end on a stud 248 secured in the plate 27, urges the lever 2118 clockwise toward a position in which a short lower forward arm 2120 of the lever 2118 engages against a stud 359 also secured in the plate 27. The downward arm of the lever 2118 has a rearwardly directed extension 2121 with an upper cam edge extending rearwardly with a downward inclination from a small notch 2122 at its forward end. When the manipulative control lever 2118 is in its clockwise position, the rear end of the cam extension 2121 is below the right-hand end of a stud 2123 extending through an opening in the side plate 27 and secured in the end of a forward arm 2124 on the right side of a yoke 2125 pivotally supported on a headed stud 2126 threaded into and extending leftwardly from the plate 27. The yoke 2125 is urged counterclockwise by a tension spring 2127 connected at its forward end to a stud secured in a downward arm 2128 on the right-hand side of the yoke 2125 and at its rearward end to a small diameter portion of the stud 1544 which extends through and leftwardly from the plate 27. A downward arm 2129 on the left side of the yoke 2125 carries a roller stud 2130 engaged in a circumferential groove in the hub of the previously-mentioned bevel pinion 1878.

When the upper end of the control lever 2118 is moved to its forward position as shown in full lines in Fig. 41, the cam extension 2121 lifts the stud 2123, moving the stud 2130 and the bevel pinion 1878 forwardly until the stud 2123 is engaged in the notch 2122 and the stud 2130 holds the bevel pinion 1878 in mesh with the bevel pinion 1876 so that the cam shaft 1879 is driven through one revolution in each cycle of operation of the machine. In that position of the parts, the notch 2122, the stud 2123 and the spring 2127 provide a detenting action to releasably hold the bevel pinion 1878 fully meshed with the bevel pinion 1876. However, when the upper end of the level 2118 is manually moved rearwardly sufficiently to disengage the stud 2123 from the notch 2122, the spring 2119 pulls the lever 2118 to its clockwise limit against the stud 359 and the spring 2127 pulls the yoke 2125 counterclockwise to fully disengage the bevel pinion 1878 from the bevel pinion 1876 so that the previously-mentioned detent roller 1890, being engaged in the notch in the disk 1889, holds the automatic control cam shaft 1879 stationary in its normal position regardless of rotation of the main drive shaft 126 during cycles of operation of the machine.

The rightward end of the previously-mentioned stud 1493 on the tabulation control link 1489 lies above the rearward end of an L-shaped arm 2131, which is pivotally supported at its upper end on the stud 2126 immediately at the right of the arm 2129 to which the arm 2131 is secured, as by a headed screw passing through the elbow of the arm 2131 and threaded into the arm 2128. The spring 2127 is of sufficient strength that, when it pulls the arm 2128 rearwardly, the rear end of the arm 2131 engages the stud 1493 and lifts the forward end of the link 1489 above the path of the stud 1499 against the tension of the spring 1492, and a stud 2132 secured in the lower end of the arm 2128 acts on the forward end of a link 1724 which, as disclosed in my original application, when moved rearwardly, depresses the forward end of the line-spacing control link 1719 to its effective position behind the stud 1499. Thus, while the upper end of the control lever 2118 remains rearward, the paper carriage will not be automatically tabulated but the platen will be line-spaced in each machine cycle. Because no carriage tabulation occurs in any machine cycle performed while the upper end of the control lever 2118 is rearward, no skip-tabulation can then result in a machine cycle initiated by depression of the "Skip" bar 292 and the lane 1 control is thus also inactive.

When the upper end of the control lever 2118 is again moved forwardly, to the full line position of Fig. 41, the cam extension 2121 acting on the stud 2123 rocks the yoke 2125 clockwise against the tension of the spring 2127 to mesh the bevel pinion 1878 with the bevel pinion 1876 to again render the automatic selection of machine functions effective and to permit the carriage tabulating and line-spacing controls to return to normal.

MANUAL CONTROLS PREDOMINATING OVER AUTOMATIC CONTROLS

Some of the above-described manual controls of carriage movements predominate over certain of the automatic controls as will be explained in detail.

*Manual selection of skip-tabulation prevents automatic (lanes 3, 4 and 5) selection of carriage movement*

In each machine cycle of initiated by depression of the "Skip" bar 292, except while the manipulative control lever 2118 is in its rearward position, the paper carriage is skip-tabulated under control of lane 1 regardless of whether or not a control projection 1784 in lane 3, lane 4 or lane 5 limits the rise of the sensing pin 1811, 1812 or 1813.

The rear end portion of the link 1540 which is pulled forward by depression of the "Skip" bar 292, has a small slot through which extends the rightward end of a stud 2133 (Figs. 31 and 33) which projects through a forwardly and rearwardly elongated aperture in the frame side plate 27 and is secured in the forward end portion of a link 2134 which also has a forwardly open slot by which it is guided for forward and rearward movement on a stud 2135 (Fig. 33) secured in the plate 27. Toward its rearward end, the link 2134 has a forwardly and rearwardly elongated slot by which it is guided on the stud 1944. At its rearward end the link 2134 has an upward extension terminating in a forwardly extending latching projection 2136 (Fig. 28) slightly above but normally rearwardly clear of a rightwardly turned lug 2137 on the rear end of an arm on the rightward side of a yoke 2138 pivotally supported on the shaft 1537, the rightward side of the yoke being located between spring clips (not shown) engaged in annular grooves in the shaft 1537 between the sides of the yoke 1581. The left side of the yoke 2138 is positioned between the sides of the yoke 1584 and has a rearward arm carrying a stud 2139 which extends leftwardly over the rear end of a rearward arm on the left side of the yoke 1584.

Figure 33:
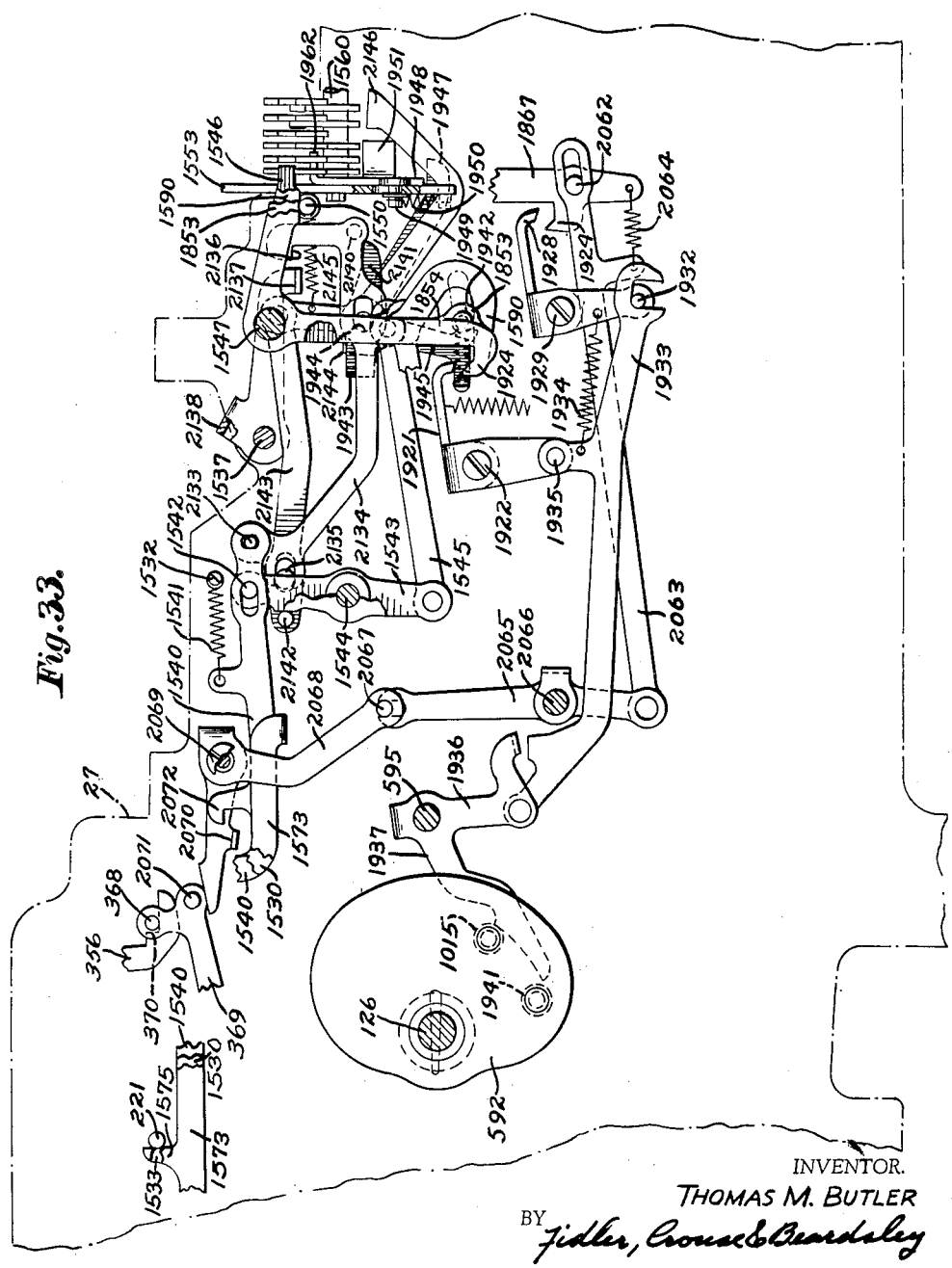
Fig. 33 shows in right side elevation portions of the automatic carriage movement control means.

Normally, the yoke 2138 rocks counterclockwise freely whenever the yoke 1584 is rocked to depress the control link 1523 to active position for causing return of the carriage, but when the "Skip" bar 292 is depressed, the forwardly moving link 1540 pulls the link 2134 forwardly to place the projection 2136 over the lug 2137 to latch the yoke 2138 in its normal position of Figs. 28 and 33 so that, while the "Skip" bar 292 remains in depressed position, the stud 2139 holds the yoke 1584 against being rocked to depress the control link 1523. Consequently, carriage-return cannot occur in any machine cycle while the "Skip" bar 292 is depressed, even if the sensing pin 1813 is limited by a control projection 1767 in lane 5. The link 2134 is returned to normal by the link 1540 when the latter returns to normal.

A stud 2140 (Figs. 28, 33 and 38) secured in the rear end of the link 2134 extends leftwardly slightly higher than, but normally rearwardly clear of, a rearward arm 2141 (Fig. 38) on the rightward side of the yoke 1943. Forward movement of the link 2134 by depression of the "Skip" bar 292 moves the stud 2140 forwardly to blocking position immediately above the arm 2141 so that, even if the lane 3 bell crank 1853 is rocked counterclockwise and also rocks the bell crank 1590, it stretches the spring 1946 without rocking the yoke 1943. The link 1956 and lane 3 yoke 1958 then remain latched in their normal positions by the lug 1962 so that the latch arm 1960 of the lane 3 yoke 1958 is prevented from latching the carriage-tubulation control arm 1567 and shaft 1348 even though the rise of the sensing pin 1811 has been limited by a long control projection 1784 in lane 3.

A stud 2142 (Figs. 31 and 33) projecting rightwardly immediately in front of the upper arms of the levers 1576 and 1543 is secured in the forward end of a link 2143 which has a forwardly and rearwardly elongated slot by which it is guided on the stud 2135. The rearward end of the link 2143 is pivotally connected (Fig. 38) to an upward arm on the rightward side of a yoke 2144 which is pivotally supported on the stud 1944 between the sides of the yoke 1943 and is urged clockwise by a tension spring 2145 connected at its forward end to the upward arm of the yoke 2144 and at its rearward end to the leftward end of the stud 1550. On the left side of the yoke 2144 is an arm 2146 (Figs. 33 and 38) which extends downwardly and rearwardly beneath the bracket 1553 and then rearwardly and upwardly to its horizontally edged rear end which is slightly leftward of and below a projection 2147 on the lower side of the link 1969 and is also slightly rightward of and below a projection 2148 on the link 1976. Thus, when the "Skip" bar 292 is depressed, pulling the link 1540 forward and rocking the lever 1543 counterclockwise, the link 2143 is pulled forward and rocks the yoke 2144 counterclockwise to place the end of arm 2146 immediately leftward of the projection 2147 and immediately rightward of the projection 2148. The links 1969 and 1976, the lane 4 latch yoke 1971 and the lane 5 latch yoke 1978 are then latched in their normal positions so that their latch arms 1973 and 1980 cannot latch the carriage tabulation and return control arms 1567 and 1602 and shafts 1348 and 1349 even if a control projection 1784 in lane 4 or in lane 5 limits the rise of the sensing pin 1812 or 1813. The link 2143 and yoke 2144 are returned to normal by the spring 2145 when the lever 1543 returns to normal.

*Depression of Vertical bar prevents automatic (lanes 3, 4 and 5) selection of carriage movements*

As previously explained, depression of the "Vertical" bar 293 rocks the yoke 1536 (Fig. 28) clockwise so that its arm 1539 acting on the stud 1493 lifts the forward end of the carriage-tabulating control link 1489 above the path of the stud 1499 so that the carriage-tabulation control shaft 1348 and arm 1567 are not rocked and the carriage-tabulating clutch is not engaged in the ensuing machine cycle. Any control projections 1784 in lanes 3, 4 and 5 limiting the rise of any of the sensing pins 1811, 1812 and 1813 will cause the respective ones of the bell cranks 1853, 1854 and 1855 to be rocked counterclockwise and latched by the bail 1921 in position to free the latch yokes 1958, 1971 and 1978 for operation. However, as the tabulation control arm 1567 is not rocked during the cycle, its flange will hold the yokes 1958 and 1971 in their normal positions until after the bell cranks 1853 and 1854 are released from the latch bail 1921 and returned to normal to permit the yokes 1958 and 1971 to be relatched by the lug 1962 and stud 1967.

A link 2149 (Fig. 28) is supported for forward and rearward sliding movement on the left end of the stud 1944 which passes through a slot in the link 2149. The forward end of the link 2149 is pivotally connected to a downward arm of the yoke 1536 so that when the latter is rocked by depression of the "Vertical" bar 293, the link 2149 is pulled forwardly to position a forwardly directed latch projection 2150 on an upward extension of the rear end of the link 2149 above a leftwardly bent lug 2151 on the rear end of the rearward arm of the rightward side of the yoke 1584. The yoke 1584 is thereby prevented from being rocked counterclockwise by the spring 1583 while the "Vertical" bar 293 is in depressed position, even if the yoke 1581 is rocked through the link 1982 by the bell crank 1855. Thus, the forward end of the carriage-return control link 1523 is not lowered to active position and the carriage-return control shaft 1349 and arm 1602 are not rocked during the machine cycle. The flange on the arm 1602 holds the yoke 1978 in its normal position until after the bell crank 1855 is released from the bail 1921 to permit the yoke 1978 to be relatched by the stud 1975.

*Depression of Return bar normally prevents automatic (lanes 3, 4 and 5) selection of carriage movements*

In any machine cycle in which the "Return" bar 294 is in depressed position, unless the rise of the sensing pin 1823 is limited by a #5 control projection 1767 in lane 15, the carriage will be returned to a columnar position selected by the lane 2 control regardless of whether or not the rise of any of the sensing pins 1811, 1812 and 1813 is limited by a control projection 1784 in lane 3, 4 or 5.

When the lever 1576 (Fig. 31) is rocked counterclockwise by depression of the "Return" bar 294 as previously described, the lever 1576 acts on the stud 2142 to pull forwardly the link 2143 which rocks the yoke 2144 (Fig. 38) to place the arm 2146 in blocking position relative to the projections 2147 and 2148 on the links 1969 and 1976 whereby the lane 4 and lane 5 latch yokes 1971 and 1978 are rendered ineffective even if a control projection 1784 in lane 4 or lane 5 limits the rise of the sensing pin 1812 or 1813. Also, because the depression of the "Return" bar 294, as previously described, depresses the forward end of the carriage-return control link 1523 (Figs. 27 and 28) into the path of the stud 1499 and raises the forward end of the carriage-tabulation control link 1489 above the path of the stud 1499, the carriage-tabulating clutch will not be engaged and the flange of the arm 1567 will hold the lane 3 latch yoke 1958 (Fig. 38) in normal position until after the link 1956 is relatched by the projection 1954, unless a #5 control stud in lane 15 limits the rise of the sensing pin 1823, in which case the carriage-movement controls are affected as already explained in connection with the description of the lane 3 and lane 15 controls.

INTERLOCKS

In addition to the interlocks described herein, various other interlocking devices and mechanisms of the machine are disclosed in detail in my original application. One such interlocking means prevents cycling of the machine while the keyboard is not properly conditioned for operation. That interlocking means includes the bail 217 and rod 215 (Figs. 6 and 7) and further provisions whereby the lever 192 and its lug 196 (Figs. 20 and 29) are prevented from moving downward to initiate a machine cycle at all times while the rod 215 is held against moving substantially rearward from its normal position. Also, the rod 215 is considerably rearward of its normal position from the start of each machine cycle until about the 300° point of the cycle. A detailed description of the operation and effects of the rod 215 is contained in my original application.

*Preventing shifting of automatic function selection disabling lever during machine cycles and preventing cycling of machine while that lever occupies any intermediate position*

The manipulative control lever 2118 (Fig. 41) which, as above described, is moved to its rearward position to disable the automatic function selecting mechanism of the machine and is moved to its forward position to re-enable the automatic function selecting mechanism, has an upper forwardly extending arm 2172, the forward end of which is so proportioned that a portion of it is immediately behind a rightwardly bent rear end of a leftwardly bent lug on a rearward extension 2173 (see also Fig. 6) of the upper end of the upward left side arm of the yoke 217 at all times except when the lever 2118 is in either of its extreme positions. When the control lever 2118 is in any intermediate position, the arm 2172 prevents the extension 2173, and thus also the bail rod 215, from moving rearwardly far enough to permit a machine cycle to be initiated. Thus, a machine cycle cannot be initiated while the automatic function selecting mechanism of the machine is not either fully enabled or fully disabled.

While the bail rod 215 is in a rearward position during about the first 300° of each machine cycle, the end of the extension 2173 is either immediately under or immediately over the end of the arm 2172 and so prevents the control lever 2118 from being shifted during that portion of any machine cycle. A leftwardly bent lug on the upper end of an arm 2174 normally occupies a position immediately forward of the rightward end of the stud 2123 at such a height that it can move under the stud 2123 when the latter is in its upper position shown in Fig. 41 and the pinion 1878 is meshed with the pinion 1876, and can move over the stud 2123 when the latter is in its lower position and the pinion 1878 and 1876 are unmeshed. As fully disclosed in my original application, the arm 2174 moves to a rearward position such that the lateral lug on its upper end is above or below the stud 2123 very early in each machine cycle and remains there until a time very late in the cycle such that the pinion 1878 is less than one-half tooth space from its normal position. Thus, the pinions are prevented from being meshed in incorrect relation at all times while the machine is operating.

*Preventing cycling of machine while the carriage tabulating key, the carriage returning key or the carriage opening and closing key is wholly or partially depressed and preventing depression of those keys during machine cycles*

Each of the three key levers 1510 and 1519 (Figs. 25 and 30) has a forward projection 2175 which, when the respective key lever is either partially or wholly depressed, is immediately behind the bail rod 215 and so prevents the latter from moving rearwardly to permit a machine cycle to be initiated. After the bail rod 215 has moved rearwardly and a machine cycle is initiated, the bail rod 215 is under the projections 2175 where it remains and prevents depression of either of the above-mentioned keys until well after printing is completed and all of the sensing pins 1811 to 1827 have been restored to normal position.

*Means preventing initiation of machine cycle while the paper carriage is not stationary in a proper columnar position and while either the carriage-tabulating clutch or the carriage-return clutch is engaged*

A lever 2188 (Fig. 8), swingably mounted on a stud 2189 secured in and projecting upwardly from top plate 1268, has on the downwardly bent end of its leftward arm a forward projection 2190 (Fig. 29) the upper edge of which is adapted to engage the underside of the lug 196 of the machine cycling control arm 192. The end of the rightward arm of the lever 2188 is pivotally connected to the forward end of a member 2191 (Figs. 8, 21 and 23) which extends rearwardly across the top of the plate 1268 and is guided for forward and rearward movement between spacing collars on a stud 2192 which is secured in the plate 1268 and extends through a forwardly and rearwardly elongated slot in the slide member 2191. A tension spring 2193 (similar to and directly under the spring 2217 in Fig. 8), connected at its rearward end to a stud 2194 in the plate 1268 and at its forward end to an ear on the slide 2191, urges the latter rearwardly to project its bluntly V-pointed rear end into the path of the column stops 1323 above the inward ends of the counterstops 1324 and 1325.

When no column stop 1323 is located between the inward ends of the counterstops 1324 and 1325 (the paper carriage is not in a proper columnar position) the spring 2193 holds the slide 2191 rearward and the projection 2190 under the lug 196 so that the latter is prevented from moving downward to initiate a machine cycle. As the paper carriage is moved into a proper columnar position where a column stop 1323 is positioned between the inward ends of the counterstops 1324 and 1325, the column stop 1323 cams the slide 2191 forward against the tension of the spring 2193 and rocks the lever 2188 to withdraw the projection 2190 rearward of the lug 196. However, a machine cycle still cannot be initiated if either the carriage-tabulating clutch or the carriage-return clutch is engaged to move the paper carriage to another columnar position.

As previously explained, the forward end of the lever 1371 (Figs. 20 and 29) is depressed whenever the carriage-tabulating clutch or the carriage-return clutch is engaged. An aperture in the forward end portion of the lever 1371 embraces a stud 2195 in a rearward arm on the rightward side of a yoke 2196 pivotally mounted on the stud 155. The lower end of a forwardly and downwardly extending arm 2197 on the rightward side of the yoke 2196 is engaged by a stud 2198 extending rightwardly from a downward arm on the left side of a yoke 2199 which is pivotally mounted on a stud 2182 secured in the right-hand portion of the bracket 148. The yoke 2199 is urged clockwise by a light tension spring 2200 connected at its lower rear end to the stud 2198 and anchored at its upper front end in an ear of the bracket 148. When the forward end of the lever 1371 is lowered as either the carriage-tabulating clutch or the carriage-return clutch is engaged as previously described, the yoke 2196 is rocked clockwise to permit the spring 2200 to rock the yoke 2199 to position an upwardly facing shoulder 2201 on the rear edge of an upward arm on the right side of the yoke 2199 immediately under the lug 196 to prevent a machine cycle from being initiated.

As previously explained, the carriage-tabulating clutch or the carriage-return clutch is disengaged when a column stop 1323 depresses one or the other of the counterstops 1325 and 1324 as the carriage approaches the columnar position in which it is to be stopped. As such clutch-disengagement occurs, the projection 2190 will be under the lug 196 to prevent initiation of a machine cycle. However, because of the widths of the stop 1323 and of the spear point on the rear end of the slide 2191, a very short further movement of the paper carriage toward the precise columnar position where it is to be stopped will withdraw the projection 2190 from beneath the lug 196 while the carriage is still far enough from such precise columnar position that it is desirable to prevent the initiation of a machine cycle until the carriage is more accurately positioned to insure that the control projections 1784 and 1767 are properly aligned with the sensing pins 1811 to 1827.

It has been explained that as the paper carriage approaches a columnar position, a column stop 1323 will depress one or the other of the arms 1456 and 1464 carrying the pass-by cams 1461 and 1469, respectively, to rock the lever 1475 clockwise to set the carriage-decelerating brake. When the lever 1475 is so rocked, the lower lug 1479 on the left end of the lever 1475 under the rearward end of the lever 1367 lifts the latter and so depresses the rear end of the lever 1371, whereby the shoulder 2201 of the yoke 2199 is maintained under the lug 196 after the carriage tabulating or return clutch has been disengaged. The column stop 1323 does not move off of the inward end of the pass-by cam 1461 or 1469 until just as it contacts the inward end of the counterstop 1325 or 1324. At that point (as shown by the dot-dash line position of the stop 1323 in Fig. 19 at the end of a carriage tabulation) where the carriage is in substantially the exact columnar position where it is to be stopped, the lever 1456 or 1464 is restored by the spring 1462 or 1470 and the spring 1372, which is strong enough to overcome the spring 2200, raises the forward end of the lever 1371, rocking the yokes 2196 and 2199 counterclockwise to swing the shoulder 2201 forwardly clear of the lug 196.

The carriage may, and frequently does, have enough momentum to carry it farther, moving one or the other of the counterstops 1324 or 1325 with it against the tension of the spring 1337 until the carriage momentum is absorbed by the latter spring and the decelerating brake, whereupon the carriage rebounds against the other of the two counterstops. It is, therefore, desirable to still further delay the initiation of a machine cycle to insure that the carriage will be stationary in exactly the proper columnar position when the sensing pins 1811 to 1827 rise. If the shaft 139 is in machine cycling position when the shoulder 2201 is moved forwardly from beneath the lug 196, the latter, except under certain conditions explained in my original application, is normally free to move downwardly. For the lug 196 to move downwardly far enough to engage the arm 150 which it must, as previously explained, depress to close the motor switch and release the main drive clutch control arm 142, takes a period of time which, though extremely small, is greater than the time required for the carriage, in moving beyond the exact columnar position where it should be stopped at the end of a usual tabulation or return, to move one or the other of the counterstops 1324 or 1325 sufficiently to set a further means to delay initiation of a machine cycle.

When the paper carriage, after engagement of a column stop 1323 against the inward end of one of the counterstops 1324 or 1325, moves beyond the exact columnar position where it should be stopped, and moves that counterstop endwise outwardly, the other counterstop is also moved endwise outwardly by reason of the stud and slot connection between the ends of the inward arms of the members 1328 and 1333. Thus, regardless of the direction in which the carriage is moving at the time a column stop 1323 directly moves one of the counterstops 1324 or 1325 endwise outwardly, the member 1328 is rocked counterclockwise and its upward arm acts on a stud 2202 (Fig. 15) in the lower end of a downward arm on the rear side of a yoke 2203 which is pivoted on the stud 1458. The yoke 2203 is thereby rocked clockwise so that a rightward arm 2204 on the forward side of the yoke depresses the stud 1474 and rocks the lever 1475 clockwise, lifting the rear end of the lever 1367 and depressing the forward end of the lever 1371. At this time, the lug 196, if it rested on the shoulder 2201 just before the latter was moved out from under the lug 196, will be below the upper edge of the shoulder 2201 which, therefore, cannot re-engage under the lug 196 when the yokes 2196 and 2199 are again rocked clockwise.

A stud 2205 (Fig. 29) in the end of a forwardly and downwardly extending arm on the left side of the yoke 2196 is engaged by a downwardly and rearwardly extending arm 2206 on the right side of a yoke 2207 which is pivoted on the left end portion of the shaft 147 and is urged clockwise by a tension spring 2208 connected at its upper forward end to the leftward one of the arms 720 and at its lower rearward end to a forwardly and downwardly extending arm on the right side of the yoke 2207. On the left side of the yoke 2207 is an arm 2209 which extends downwardly on the rear side of the lug 143 of the clutch control lever and has an upwardly facing shoulder 2210 very slightly lower than the shoulder 144 of the arm 145 of the yoke 146 so that, while the shoulder 144 holds the lug 143, the shoulder 2210 can move freely under the lug 143. While the yoke 2196 is in its normal position, the stud 2205 holds the yoke 2207 in such a position that the shoulder 2210 is just clear of the path of the lug 143.

The clockwise rocking of the yoke 2196 resulting from the outwardly endwise movement of the counterstops 1324 and 1325 by a column stop 1323 occurs prior to the instant when the lug 196 has moved far enough downwardly to act on the arm 150 to rock the yoke 146 to withdraw the shoulder 144 from beneath the lug 143. Consequently, the shoulder 2210 is permitted to move under the lug 143 so that a machine cycle cannot be initiated until the carriage settles back to exactly the proper columnar position, permitting the members 1333, 1328, 2202, 1367, 1371, 2196, 2199 and 2207 to be restored to normal by the springs 1337, 1362 and 1372, the latter of which overcomes the combined forces of the springs 2200 and 2208, to withdraw the shoulder 2210 from beneath the lug 143.

Although the time intervals above mentioned are sufficient to permit the described interlocks to function to prevent cycling of the machine with the paper carriage not properly positioned, they are still so very short that they do not delay initiation of a machine cycle materially beyond the time at which the carriage is correctly positioned to insure proper operation of the machine.

MODIFICATION

While the above-described machine is very flexible and adaptable to the widest variety of accounting work, it also lends itself readily to modification to secure special facility for particular kinds of work. Where the work to be performed would require the operator to operate one of the upper small motor bars 292 or 293 much more frequently than the lower bar 294 in the previously-described machine, the control functions of the small motor bars may readily be transposed en bloc so as to permit the operator to use the lower bar 294 most frequently and the upper bars 292 and 293 less frequently, thereby reducing the physical effort required of the operator. The automatic function controls also may be modified readily or additional controls may be inserted in the automatic control lanes which are left unoccupied in the above-described machine. For illustration, modification of the previously-described machine to give it special facility for use in banks for posting customers' commercial checking account statements will be described.

In posting commercial checking account statements, the paper carriage movement most frequently required is skip-tabulation to a balance columnar position from one of the check or deposit columnar positions. It would, therefore, be advantageous to have the "Skip" motor bar in the lower position. For that reason, in the modified machine, the link 1573 (Fig. 31) of the first-described machine is replaced by a link 2234 (Fig. 45) which, like the link 1573, is connected at its forward end to the upper arm of the lever 388 so as to be pulled forwardly by depression of the lower small motor bar 294. The link 2234 has, in its rearward portion, a greater leftward offset than the link 1573 and is formed with an elongated aperture receiving, normally in its rearward end, the stud 1542 in the lever 1543. The rearward end of the link 2234 is extended and apertured to embrace the stud 2133. The link 1540 (Fig. 31) of the first-described machine is replaced by a link 2235 (Fig. 45) which, like the link 1540, is connected at its forward end to the upper arm of the lever 381 which pulls it forwardly when the uppermost small motor bar 292 is depressed. The rear end of the link 2235 is formed with an elongated aperture receiving, normally in its rearward end, the stud in the upper end of the lever 1576. The rear end of the link 2235 is shortened, as compared with the link 1540, so that it does not connect to the stud 2133. The link 2234 is connected to the forward end of the spring 1541 and the link 2235 is connected to the forward end of the spring 1574. The link 1530 remains as in the first-described machine. With those changes of connections, the lower small motor bar 294 becomes the "Skip" bar and the uppermost small motor bar 292 becomes the "Return" bar.

In the kind of work intended to be performed on the modified machine, it is advantageous to employ the lane 15 automatic control of carriage movement from one or more columnar positions only in machine cycles initiated by certain ones of the small motor bars while having the lane 5 control of carriage movement effective in other machine cycles initiated with the carriage in such columnar position or positions. For that purpose, the lane 15 bell crank 1865 (Fig. 31) of the first-described machine is replaced by a flexible two-part lever comprising a straight lever 2236 (Fig. 45) which is pivotally supported on the stud 1870 and, at its rear end, overlies the right end of the lane 15 control lever 1843. The rearward arm of the lever 2236 is connected, through a tension spring 2237, with the downward arm of a bell crank 2238 also pivotally mounted on the stud 1870 at the left side of the lever 2236 and urged clockwise by a tension spring 2239 which is considerably lighter than the spring 2237 and is connected between the downward arm of the bell crank 2238 and the stud 1549. The bell crank 2238 is similar to the bell crank 1865 except that its rearward arm is cut off short so that it is not acted upon directly by the control lever 1843, and its forward arm which carries the roller 2035 has, secured in it, a stud 2240 which is normally held against the upper edge of the forward arm of the lever 2236 by the spring 2237. The forward arm of the bell crank 2238 also has, on its lower edge, a leftwardly turned lug 2241 normally overlying the end of an upward projection 2242 on a link 2243. The link 2243 is pivotally mounted at its rear end on a stud in the downward arm of the lane 4 bell crank 1854. The forward end of the link 2243 is pivotally mounted on a stud secured in the lower arm of a lever 2244 which is pivotally mounted on the stud 1544 rightward of the lever 1722 from which it is separated by a spacing collar on the stud 1544. A tension spring 2245 connected at its rear end to the lower arm of the lever 2244 and at its forward end to the stud 595 urges the lever 2244 clockwise so that a stud 2246 in the upper arm of the lever 2244 is normally positioned in the rear end of an elongated closed slot in the forward part of a short link 2247 pivoted on the rightward portion of the stud 2133 which, in the modified machine, is considerably elongated rightwardly for that and one other purpose.

Additionally, the stud 2142 is shortened so that it is not acted upon by the lever 1576, and the stud 1730 is shifted lengthwise rightwardly so that it no longer engages the lever 1543 but now engages the rear edge of the upper arm of the lever 2244. Also the parts 2138, 2139 (Fig. 141) are removed from the modified machine.

In cycles of operation of the so modified machine, initiated otherwise than by depression of the two small motor bars 292 and 294, the projection 2242 remains under the lug 2241 so that if the rise of the lane 5 sensing pin 1813 is limited by a #5 control projection 1784, a lane 5 controlled return movement of the paper carriage will be effected regardless of whether or not the rise of the lane 15 sensing pin 1823 is limited by a #5 control projection 1767. If the rise of the lane 15 sensing pin 1823 is restricted, the rocking of the control lever 1843 merely lifts the rear arm of the lever 2236 and tensions the spring 2237 without rocking the bell crank 2238 to lower the roller 2035 as required to prevent a return movement of the carriage from being effected.

When the lower small motor bar 294 is depressed, the link 2234 acts through the stud 2133, link 2247 and stud 2246 to rock the lever 2244 counterclockwise. When the uppermost motor bar 292 is depressed, the link 2235 acts through the lever 1576 and stud 1730 to rock the lever 2244 counterclockwise. In either case, the lever 2244 moves the link 2243 rearwardly so that the projection 2242 is moved rearwardly clear of the lug 2241. Consequently, if a #5 control projection 1767 in lane 15 limits the rise of the sensing pin 1823 in the ensuing machine cycle, the lever 2236 and bell crank 2238 are rocked to lower the roller 2035 sufficiently to return the yoke 1581 to or hold it in normal position to suppress any return movement of the paper carriage. The rearward movement of the link 2243 also rocks the lane 4 bell crank 1854 counterclockwise so that, if the machine cycle is initiated by depression of the uppermost "Return" bar 292, a lane 4 controlled skip-tabulation of the paper carriage is effected if also the rise of the lane 15 sensing pin 1823 is limited by a #5 projection 1767, but if the sensing pin 1823 is permitted a greater rise, the yoke 1581, which is rocked to its carriage-return position by the link 2235 acting through the lever 1576, the link 1578 and the stud 1580, remains in that position until after the carriage-return clutch is closed and, as the link 1578 also rocks the lane 2 bell crank 1590 counterclockwise, a lane 2 controlled return movement of the carriage is effected.

Depression of the lower "Skip" bar 294 not only moves the link 2243 rearwardly but also rocks the lever 1543 counterclockwise and, through the link 1545, rocks the lane 1 bell crank 1546 counterclockwise. It also, through the stud 2142 and link 2143, rocks the yoke 2144 (Fig. 38) so that the arm 2146 of the latter blocks movement of links 1969 and 1976 controlling the lane 4 and lane 5 latch yokes 1971 and 1978, and through the stud 2133, link 2134 and stud 2140, prevents the yoke 1943 from rocking to raise the slide 1948 to release the link 1956 connected to the lane 3 latch yoke 1958. Thus, in a machine cycle initiated by depression of the lower "Skip" bar 294, a lane 1 controlled skip-tabulation of the paper carriage will be effected unless the rise of the lane 5 sensing pin 1813 is limited by a projection 1784 while the lane 15 sensing pin 1823 is permitted to rise beyond the position in which it would be stopped by a #5 control projection 1767, in which event a single-column return movement of the paper carriage will be effected.

Figure 6:
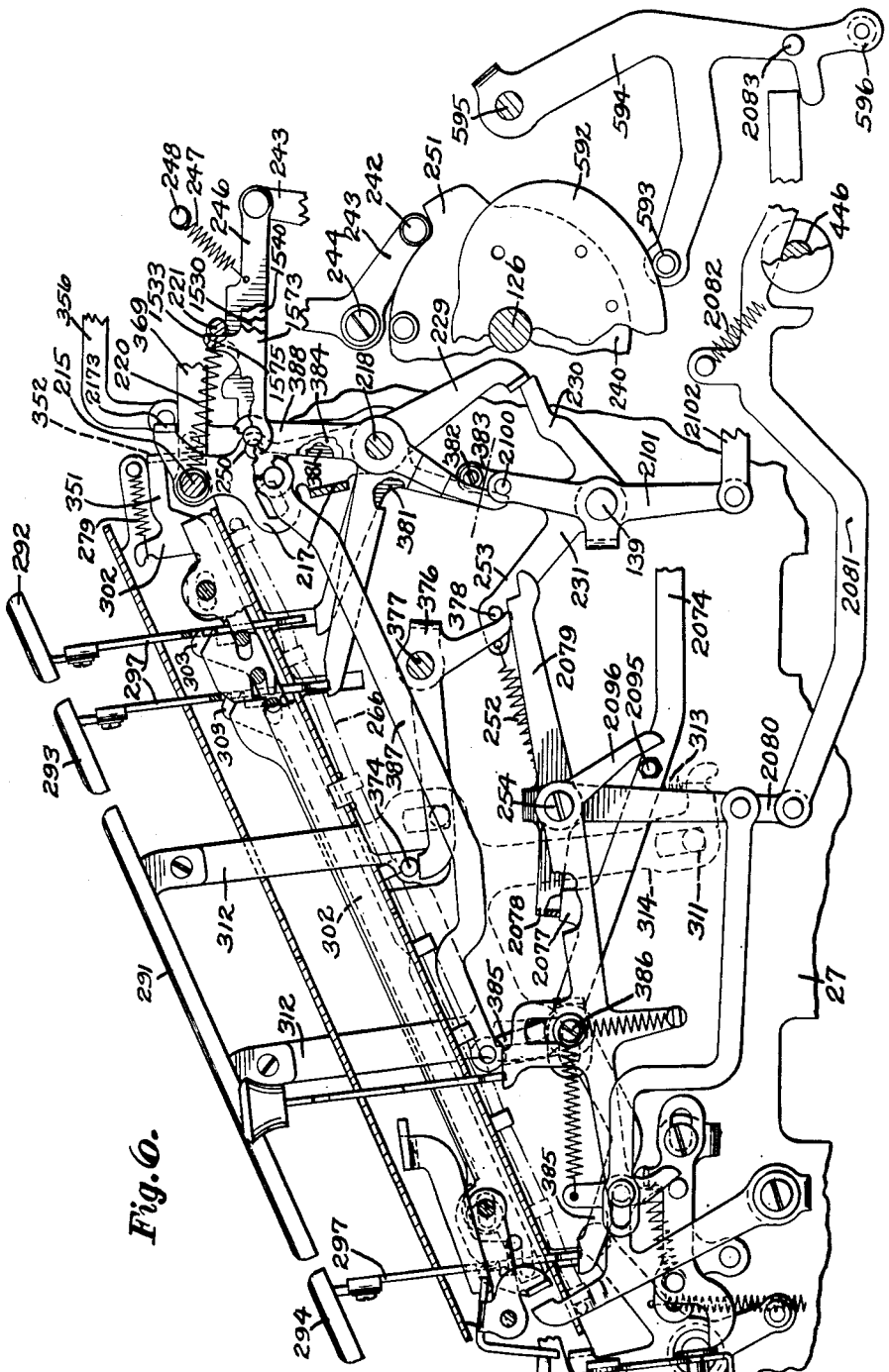
Fig. 6 is a right side elevation of the motor bars and the repeat key of the machine and of various parts associated with said bars and key, many other elements being omitted for clearness of illustration.

In the modified machine, the downward arm of the lever 388 is shortened to the dot-dash line in Fig. 6 so that, when the lower small motor bar 294 is depressed, the lever 388 does not act on the stud 2100 to pull the link 2102 forwardly and thereby lower the bail 2105 (Fig. 30) behind the projection 2107 to disable the lane 21 automatic cycling control. Also, the stud 2133 (Fig. 45) is extended far enough rightwardly to engage in an aperture in the upper end of a lever 2248 pivoted on the stud 1544 rightward of the lever 2244 from which it is separated by a spacing collar on the stud 1544. The lower end of the lever 2248 is bent rightwardly forwardly of an upward projection 2249 of the link 2074 so that, when the lever 2248 is rocked counterclockwise by depression of the lower "Skip" bar 294, it will move the link 2074 rearwardly far enough to cause the machine cycle initiated by depression of the bar 294 to be followed by an automatically initiated machine cycle just as though the rise of the lane 21 sensing pin 1826 were limited by a #8 control projection 1767.

As, with the foregoing alterations, a lane 4 controlled skip-tabulation of the carriage is obtained from the "Return" bar 292 with the aid of a #5 projection 1767 in lane 15, it is no longer necessary to employ the lane 3 control to aid in obtaining a skip-tabulation from the "Return" bar. Also, in the particular variety of work for which the modified machine is intended, there is a greater need for variety in the automatic return movements of the paper carriage than in the tabulating movements. For those reasons, lane 3 is converted into a carriage-return control lane. To that end, the yoke 1958 of Fig. 38 is removed from the modified machine and a new yoke 2250 (Fig. 46) is pivotally mounted on the shaft 1598. The yoke 2250 is urged counterclockwise by a tension spring 2251 connected at its left end to a downward arm 2252 on the forward side of the yoke 2250 and at its rightward end to the stud 1600. On its rearward end, the yoke 2250 has a downward arm 2253 located between the arms 1980 and 1601 and similarly formed for latching cooperation with the flange of the arm 1602. On its forward side, the yoke 2250 has an arm 2254, with an upper cam end which is normally below the path of the ends of the long projections 1784 in lane 3. The link 1956 of Fig. 38 is replaced by a link 2255 which is similar except that it is longer and pivotally connected to the downward arm 2252 on the forward side of the yoke 2250.

With this arrangement of parts, a lane 2 controlled carriage return is effected in a machine cycle initiated by depression of the uppermost "Return" bar 292 and in which the lane 3 and lane 15 sensing pins 1811 and 1823 are not restricted by a projection 1784 and a #5 projection 1767. Under conditions which are identical except that the rise of the lane 3 sensing pin 1811 is limited by a short projection 1784, a lane 3 controlled return of the carriage will be effected. Depression of the "Return" bar 292 rocks the yoke 1581 to cause engagement of the carriage-return clutch as previously explained and rocks the bell crank 1590 to lift the latch levers 1593 and 1953. If the rise of the lane 3 sensing pin 1811 is not restricted by a projection 1784, the slide 1948 and its lugs 1951 and 1962 remain in their lower positions so that the link 1595 connected to the lane 2 latch yoke 1597 is free and the link 2255 connected to the lane 3 latch yoke 2250 is latched. Consequently, when the return control shaft 1349 and arm 1602 rock to their return position, they are latched by the arm 1601 of the lane 2 yoke 1597. If, however, the rise of the lane 3 sensing pin 1811 is restricted by a short projection 1784, the slide 1948 and its lugs 1951 and 1962 are raised so that the lane 2 link 1595 is latched and the lane 3 link 2255 is released so that the arm 1602, when it rocks to its return position, is latched by the arm 2253 of the lane 3 yoke 2250.

Figure 31:
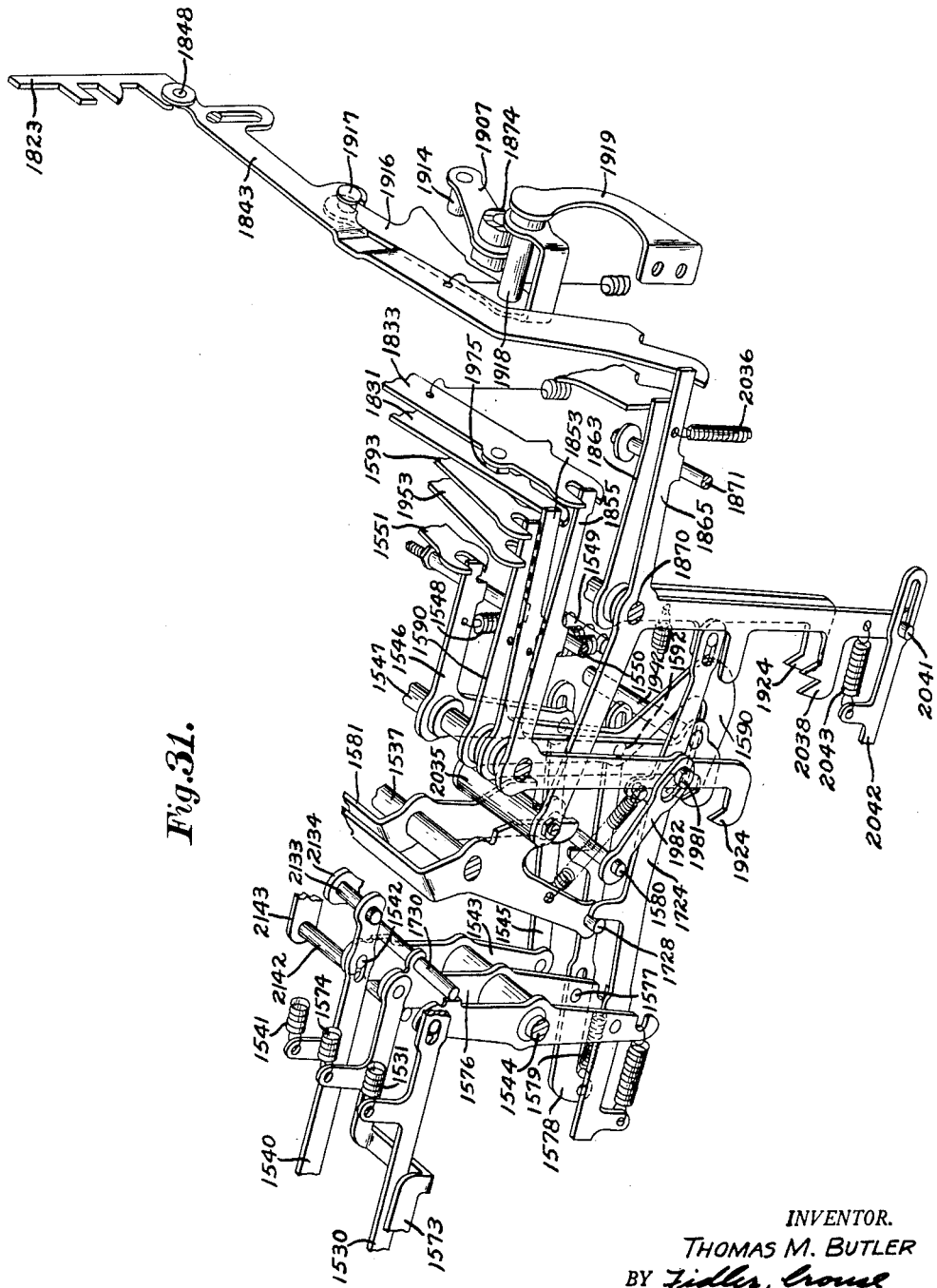
Fig. 31 is a spread perspective of elements of the carriage movement control means.
Figure 46:
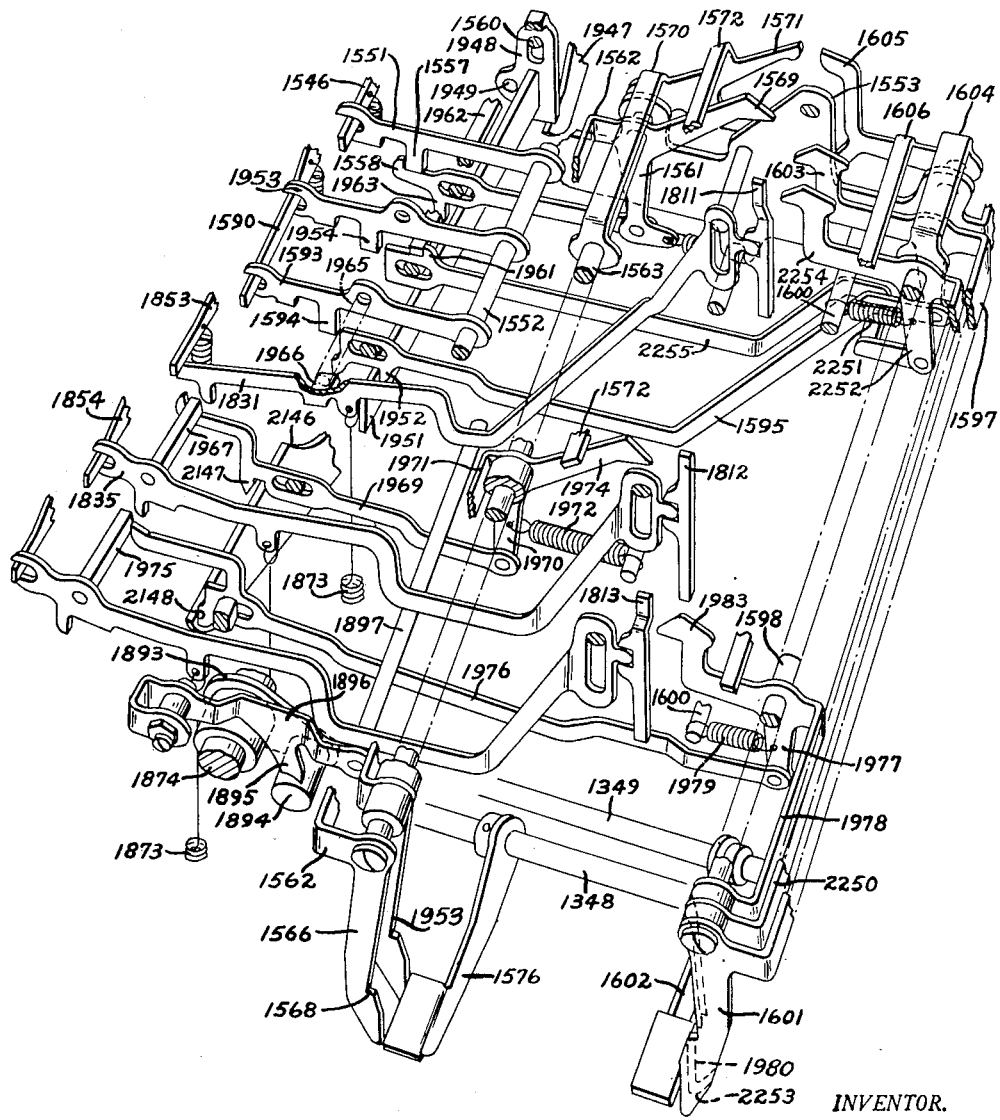
Fig. 46 is a view similar to Fig. 38 but shows the construction employed in the modified machine.
Figure 47:
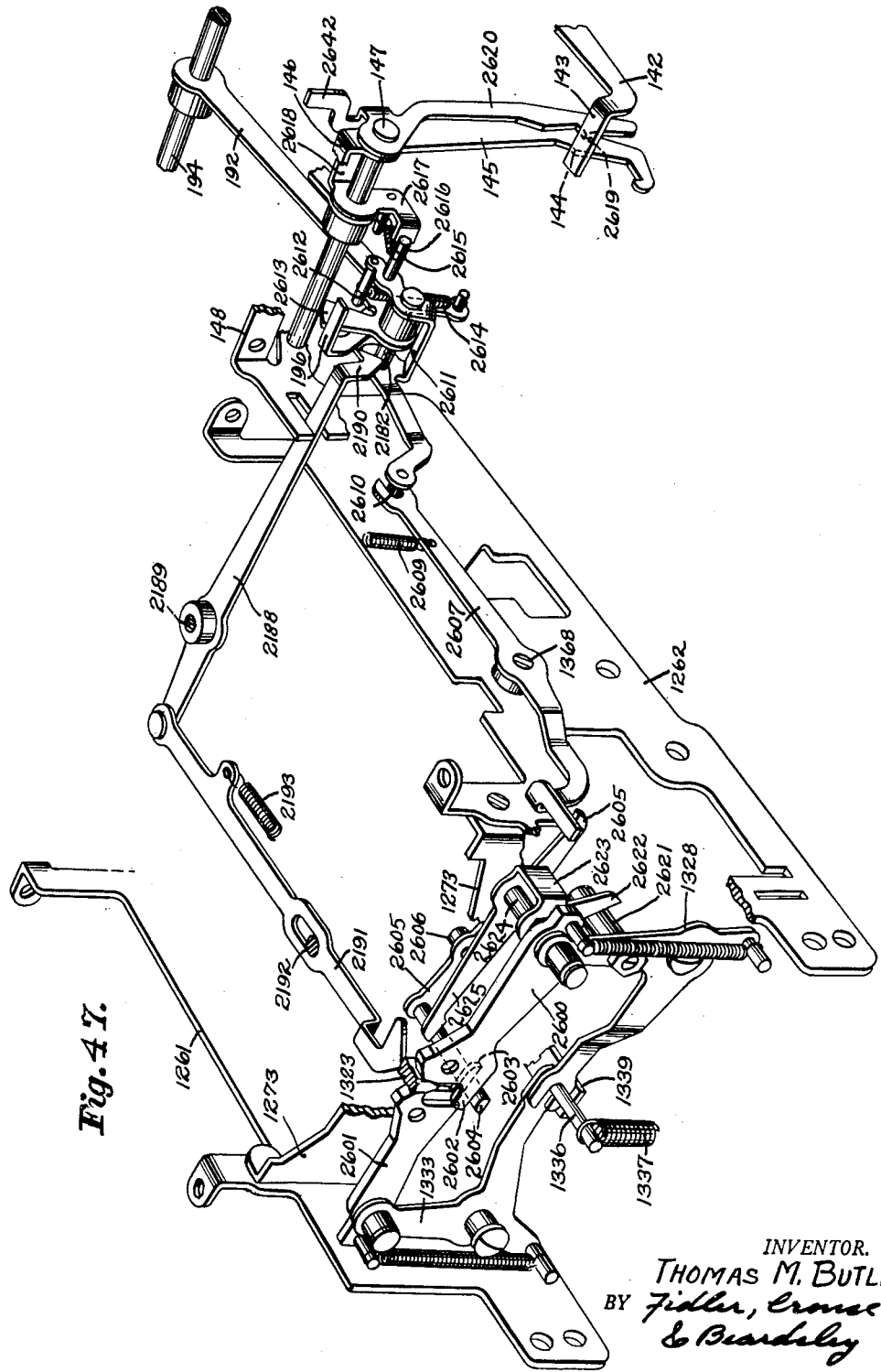
Figure 48:
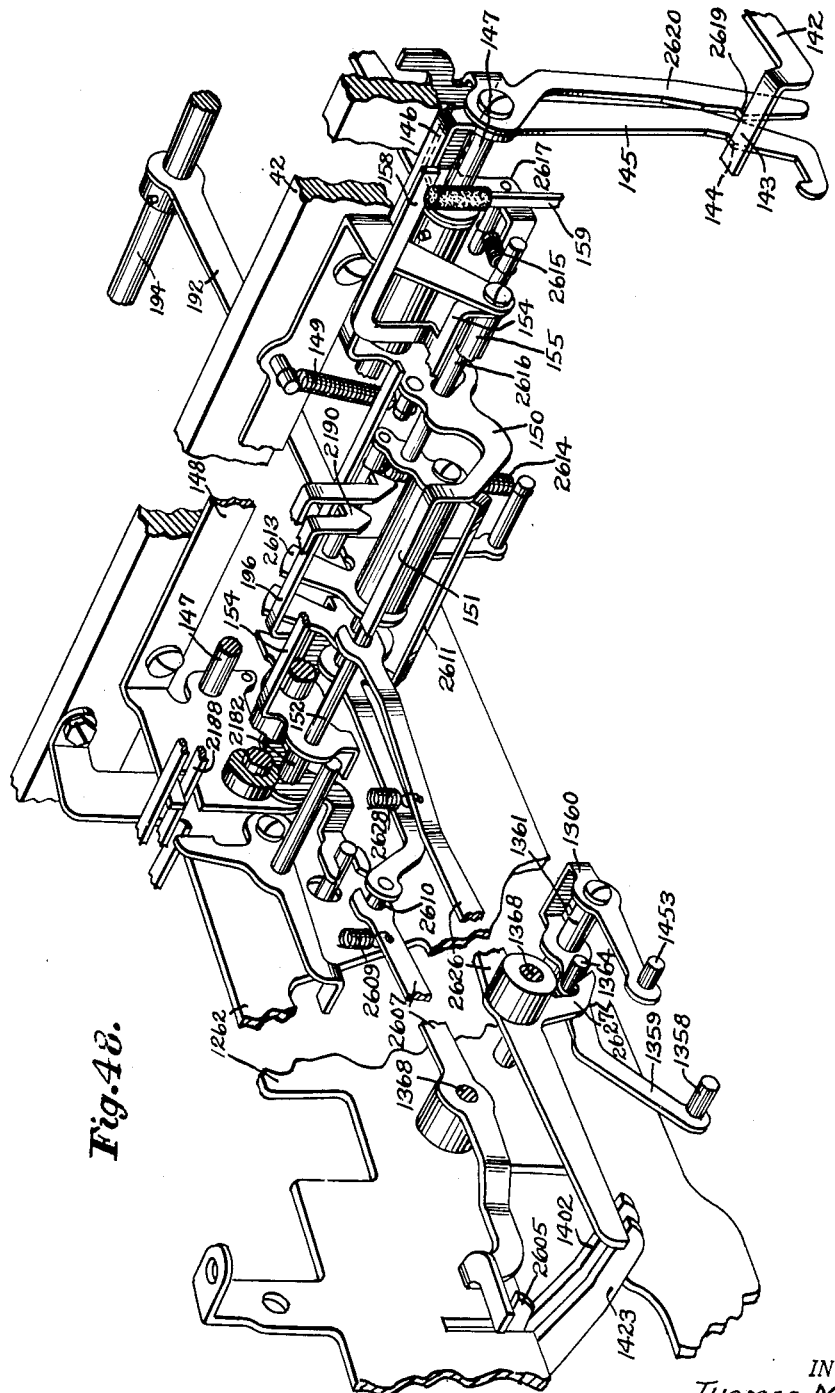
Figure 49:
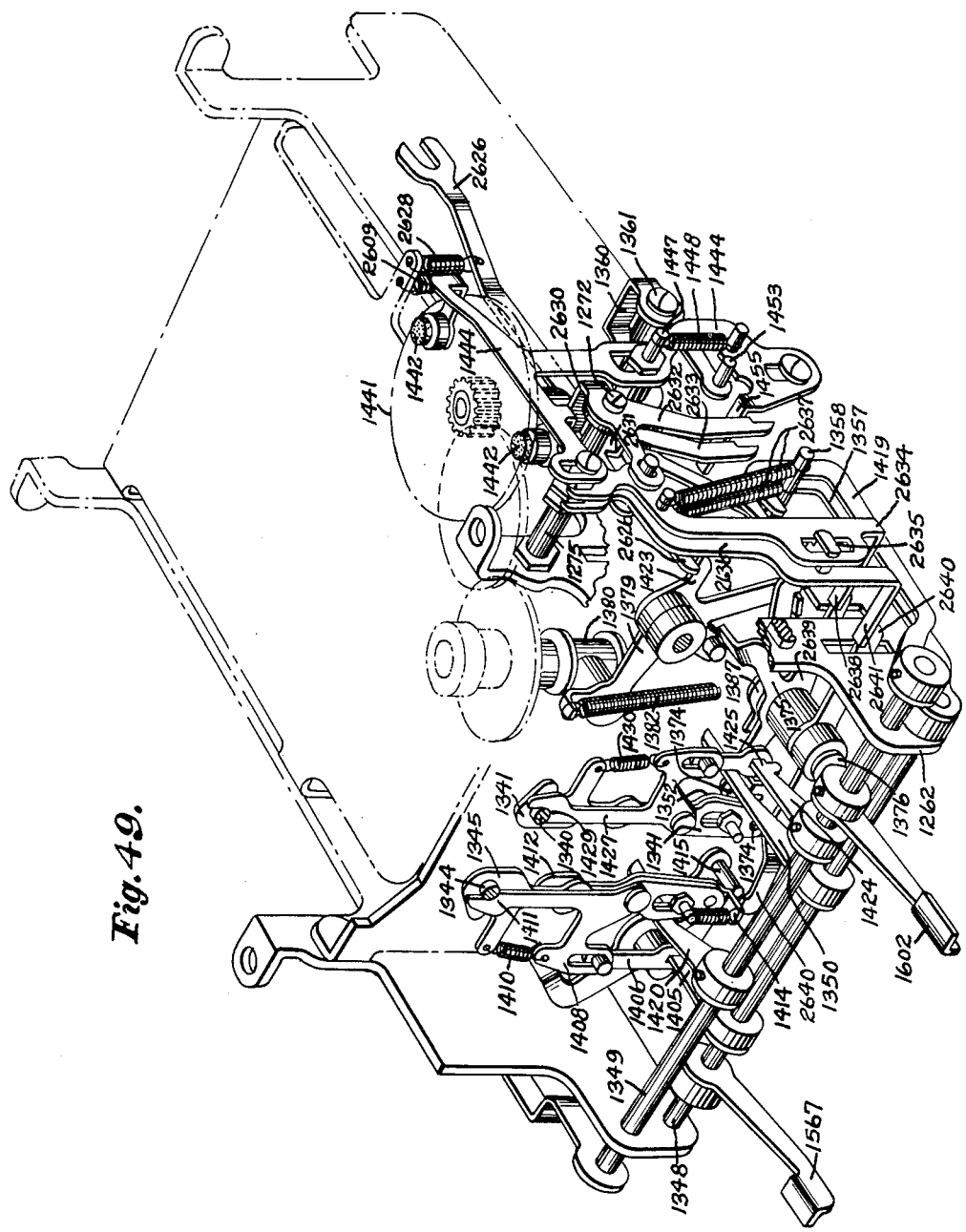
Figure 50:
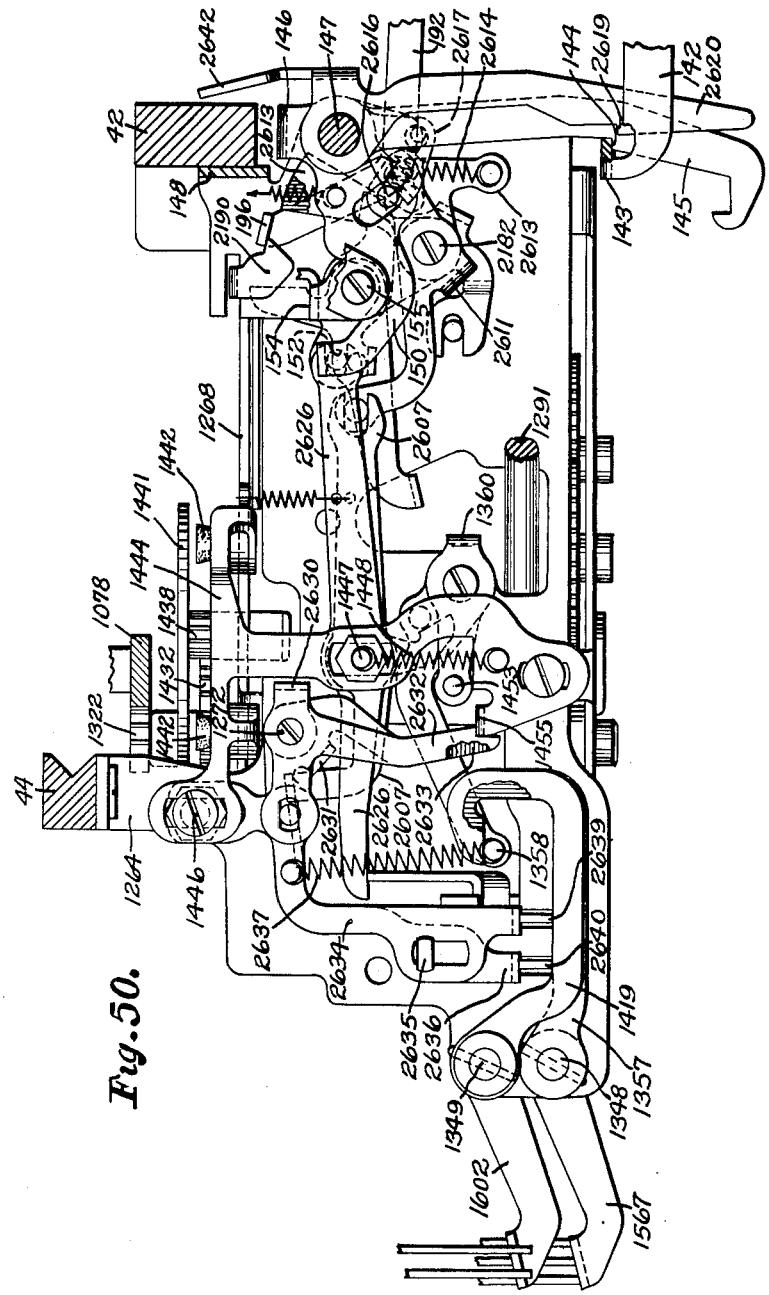

To permit a lane 3 controlled return of the carriage to be effected in machine cycles initiated by depression of the "Main" motor bar, the link 1982 of Fig. 31 is replaced by the parts 2256, 2257 and 2258 of Fig. 45, and the lever 1953 of Figs. 38 and 46 is removed from the machine. It will be remembered that the projection 1954 of the lever 1953 latches the link 1956 except when the "Return" bar is depressed or when the rise of the lane 3 sensing pin is restricted by a long projection 1784. Obviously, if left in the modified machine, it will latch the link 2255 in the same circumstances in which it would latch the link 1956 of the first-described machine, taking account of the transposition of the carriage control functions of the small motor bars 292 and 294. With this further alteration in the modified machine, the rocking of the bell crank 1853 (Fig. 45) when the rise of the lane 3 sensing pin is restricted by a short projection 1784, will cause the stud 2256 secured in the downward arm of the bell crank 1853 to act on the hooked rear end of the link 2257 to pull it rearwardly so that, through the spring 2258, connected between a stud secured in the link 2257 and the stud 1580, the yoke 1581 is rocked to cause engagement of the carriage-return clutch. The aperture in the forward end of the link 2257, through which the stud 1580 passes, is elongated to permit the yoke 1581 to be restored by the roller 2035 when the rise of the lane 15 sensing pin 1823 is limited by a #5 projection 1767 while the link 2257 is in its rearward position because of the stopping of the lane 3 sensing pin 1811 by a projection 1784.

The link 2257 also serves the purpose of the link 1982 to permit the yoke 1581 to be rocked by the lane 5 bell crank 1855 to cause the carriage-return clutch to be operated as previously described.

Figure 29:
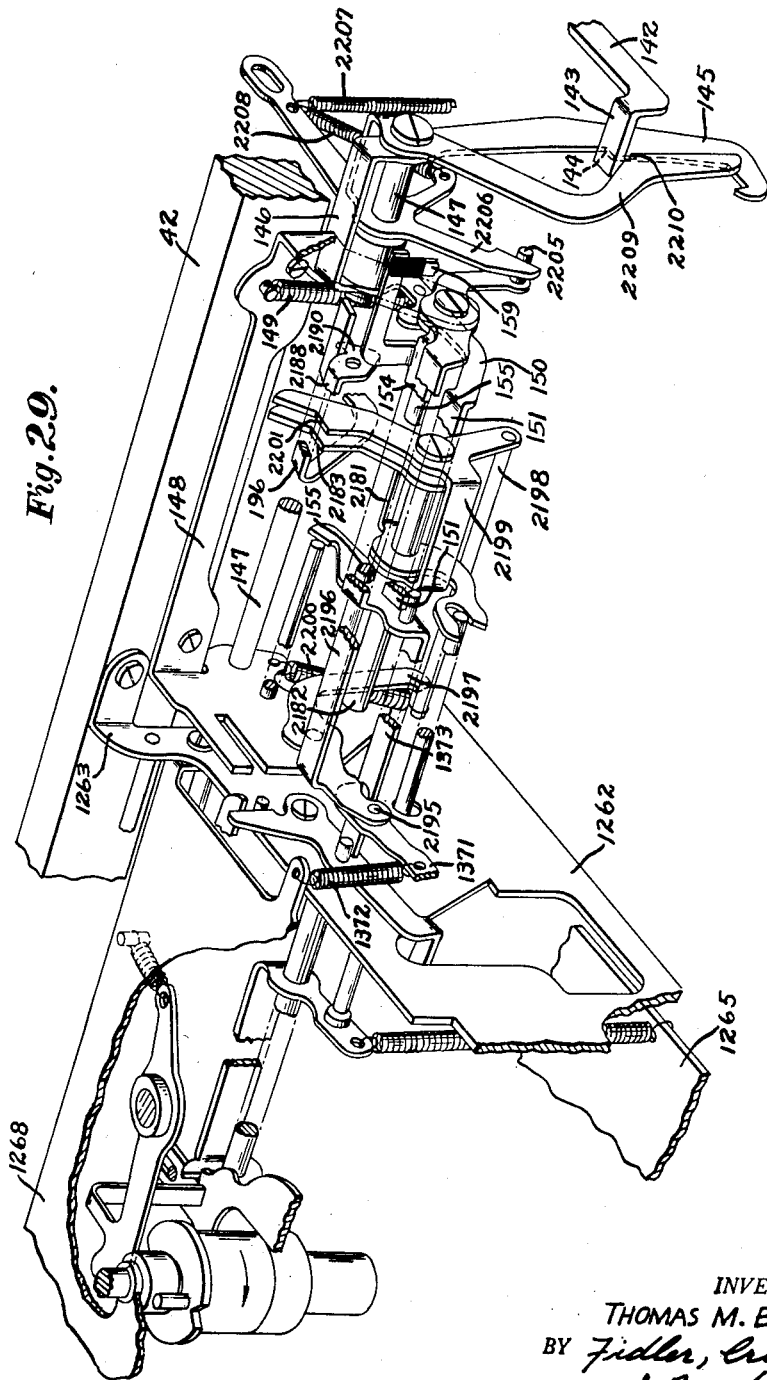
Fig. 29 is a spread perspective of certain interlock means associated with the control means for the motor switch and main drive clutch of the machine.
Figure 30:
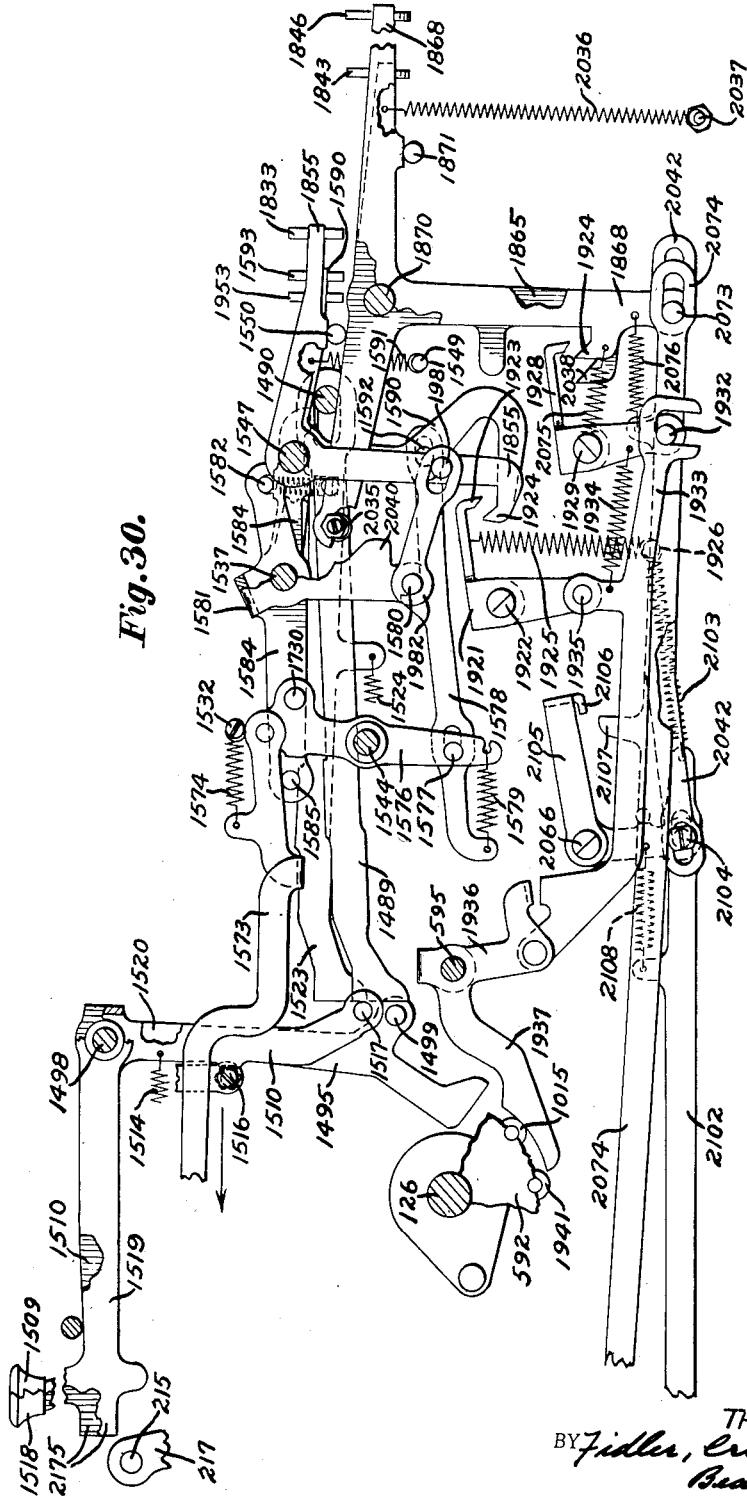
Fig. 30 shows in right side elevation certain parts of the manual and automatic carriage movement control means together with portions of the automatic machine cycling control means.

A simplified, improved and preferred form of construction of the carriage arresting controls and of the interlock means associated therewith and with the motor switch and machine cycling clutch controls is illustrated in Figs. 47 to 50. In that modified construction the carriage counterstops 1324 and 1325 are replaced by slightly modified counterstops 2600 and 2601, the parts 1456 to 1479, inclusive, of Figs. 13 and 18, 2202, 2203 and 2204 of Fig. 15, 1362, 1366, to 1372, inclusive, and 1450 to 1454, inclusive, of Fig. 20, and 2181, 2183, 2195 to 2201, inclusive, and 2205 to 2210, inclusive, of Fig. 29, are omitted, and the hereinafter described parts numbered above 2603 are substituted or added.

The counterstops 2600 and 2601 (Fig. 47) are like the counterstops 1324 and 1325, respectively, which they replace, except that the forward side of the lower inward corner portion of the member 2600 is milled to accommodate a projection 2203 extending leftwardly from the forward portion of the lower inward corner of the member 2601 and the rear side of the lower inward corner portion of the member 2601 is milled out to accommodate a projection 2602 extending rightwardly from the rear portion of the lower inward corner of the member 2600. Both projections 2602 and 2603 overlie the rearward end of a stud 2064 passing through a vertically elongated slot in the plate 1273 and secured at its forward end in the rightward arm of a lever 2605 pivoted intermediate its ends on a stud 2606 secured in the forward side of the plate 1273. The leftward arm of the lever 2605 extends through a slot in the plate 1262 and under the rear arm of a lever 2607 pivoted intermediate its ends on a stud 1368 secured in the left face of the plate 1262. The lever 2607 is urged clockwise by a tension spring 2609 connected at its lower end to the forward arm of the lever 2607 and at its upper end to an ear of the plate 1268. The front end of the lever 2607 is forked and embraces a stud 2610 secured in a rearward arm of the rightward side of a yoke member 2611 pivotally supported on the stud 2182. A forward arm of the left side of the yoke 2611 carries a stud 2612 extending rightwardly over a forward arm of a detent member 2613 secured on a hub rotatable on the stud 2182. A lower arm of the detent member 2613 carries a stud connected to the lower end of a tension spring 2614 which normally yieldingly holds the upper edge of the forward arm of the detent member 2613 engaged against the underside of the stud 2612. The upper arm of the detent is normally forward of the path of lug 196 of the machine cycling control lever 192 and is of such length that, while the lug 196 is in its normal elevated position, it can move rearwardly under the lug 196 whenever the yoke 2611 is rocked clockwise from its normal position.

A tension spring 2615 connected at its rear end to a stud 2616 extending leftwardly from the forward arm of the left side of the yoke 2611 freely through a slot in the arm 150 of the motor switch operating yoke 154, and at its forward end to a stud in a downward arm 2617 of the right side of a yoke member 2618 pivoted on the stud 147, normally hodls a rightwardly bent lug of the arm 2617 yieldingly against the stud 2616 which is normally so positioned that a shoulder 2619 on the rear edge of a downward arm 2620 of the left side of the yoke 2618 is normally forward and clear of the lug 143 of the cycling clutch control lever 142. The shoulder 2619 is a little lower than the shoulder 144 so that it can freely move under the lug 143 while the latter is above or held by the shoulder 144 but it is also amply high to hold the lug 143 above the position to which it must descend to permit coupling of the machine cycling clutch.

A stud 2621 secured in the upper arm of the lever 1328 extends forwardly across the rightward edge of a downward arm 2622 on the rear side of a yoke 2623 pivoted on a stud 2624 secured in and extending rearwardly from the plate 1273. The rightward end of a rightward arm 2625 of the forward side of the yoke 2623 engages the upper side of the stud 2504.

A lever 2626 (Fig. 48) having, intermediate its ends, a hub rotatable on the stud 1368 leftward of the lever 2607, has a forked forward end embracing the stud 152 of the motor switch operating yoke 154. The rearward end of the lever 2626 overlies the left ends of the arms 1402 and 1423 to insure that the motor switch is closed at all times when either the carriage tabulating clutch or the carriage return clutch is coupled. The lever 2626 has a downward cam arm 2627 similar to the arm 1365 of the lever 1367 and similarly cooperating with the stud 1364 in the arm 1359 of the yoke 1360 to insure that the motor switch is closed while either the tabulating control shaft 1348 is in carriage tabulating position or the carriage return control shaft 1349 is in carriage returning position. The lever 2626 is normally yieldingly urged clockwise by a tension spring 2628 connected at its lower end to the forward arm of the lever 2626 and at its upper end to an ear of the plate 1268.

The previously described latch member 1478, 1450, 1451, 1454 pivoted on the stud 1272 is replaced by two nested latch yokes 2630 and 2631 (Fig. 49) pivoted on the stud 1272 and each having on its left side a downward arm 2632 and 2633, respectively, formed with a shoulder to engage over the lug 1455 of the slide 1444 when the latter is in its depressed, non-braking position. The left side of the yoke 2630 also has a rearward arm apertured to embrace a stud on a slide 2634 vertically slidably mounted on a stud 2635 secured in and extending leftwardly from the plate 1262, and on the post 1275. The right side of the yoke 2631 has a similar rearward arm apertured to embrace a stud on a slide 2636 similarly vertically slidably mounted on the stud 2635 and post 1275. The slides 2634 and 2636 are urged downwardly by springs 2637 which are connected at their upper ends to studs in the respective slides and at their lower ends to the stud 1358. The springs 2637 replace the spring 1362 in urging the stud 1358 and yoke 1360 counterclockwise. The slide 2634 has on its lower end a rightwardly turned lug 2638 overlying the left end 2639 of a leftward third arm added to the previously described lever 1375 which has in its rightward arm a stud 1374 under the lug 1356 on the lower end of the link 1352 whereby the lever 1375 is rocked clockwise whenever the counterstop 2600, similarly to the counterstop 1324, is depressed while the shoulder 1429 of the bell crank 1427 is under the sleeve 1340. An additional two armed lever 2640 having a hub rotatable on the stud 1376 has its rightward end under the rear end of the lug 1414 on the lower end of the link 1412 so that the lever 2640 is rocked clockwise whenever the counterstop 2601 is depressed while the shoulder 1411 of the bell crank 1408 is under the sleeve 1344. The left end of the lever 2640 extends under a rightwardly turned lug 2641 on the lower end of the slide 2636.

The so modified mechanism operates in the following manner:

When the tabulating control shaft 1348 is rocked counterclockwise to initiate a movement of the carriage in the tabulating direction, the arm 1357 depresses the stud 1358 and rocks the yoke 1360 to cause the stud 1453 to lower the slide 1444 and thus release the carriage brake. As soon as the lug 1455 of the slide 1444 is depressed below the shoulder of the latch arm 2633, the slide 2636 is lowered by its spring 2637 to swing the yoke 2631 to move the shoulder of the latch arm 2633 over the lug 1455 whereby the brake slide 1444 is latched in non-braking position. However, the arm 1350 on the tabulating control shaft depresses the link 1352 which depresses the stud 1374 and rocks the lever 1375 with its added arm 2639 clockwise to hold the slide 2634 high enough to prevent the yoke 2630 from rocking clockwise to position the shoulder of its latch arm 2632 over the lug 1455.

The rocking of the yoke 1360 causes the stud 1364 to act on the cam arm 2627 of the lever 2607 to rock the latter counterclockwise to cause the switch operating yoke 154 to close the motor switch.

The arm 1350 also rocks the latch lever 1389 counter-clockwise to permit the carriage tabulating clutch to be coupled, and the lug 1393 on the lever 1389 depresses the stud 1374 and pulls the link 1341 downwardly thereby lowering the inner end of the counterstop 2600 which is then latched in lowered position by the lug 1396 moving past the shoulder 1394. As the inner end of the counterstop 2600 is pulled down, its projection 2602 depresses the stud 2604 and rocks the lever 2605 to elevate the rear end of the lever 2607 which in turn rocks the yoke 2611 clockwise. If the lug 196 of the cycling control arm 192 and the lug 143 of the cycling clutch control arm 142 are at that time in their normal elevated positions, the spring 2614 causes the detent 2613 to rock with the yoke 2611 and place its upper arm under the lug 196 and the spring 2615 rocks the yoke 2618 to place the shoulder 2619 of its arm 2620 under the lug 143. If, however, the lugs 196 and 142 are in their lowered cycling positions because the carriage movement is being initiated in the course of a machine cycle, the springs 2614 and 2615 will yield but will remain tensioned to snap the detent 2613 under the lug 196 and the shoulder 2619 of the arm 2620 under the lug 143 when those lugs are elevated to their normal non-cycling positions toward the end of the machine cycle whereby the initiation of a new machine cycle is prevented while the carriage movement continues. The detent 2190 acts as previously described to hold the lug 196 from moving downward to initiate a machine cycle while the link 2191 is not held forward by a column stop 1323.

When the tabulating control shaft 1348 returns to normal, the shoulder 1411 returns to its normal position under the sleeve 1344 as previously described so that as a column stop 1323 thereafter depresses the inward end of the counterstop 2601, the link 1412 is also depressed and rocks the lever 2640 to elevate the slide 2636 and rock the yoke 2631 to withdraw the shoulder of the latch arm 2633 from the lug 1455 of the slide 1444. It will be remembered that the depression of the link 1412 also depresses the stud 1415 and rocks the lever 1389 which rocks the lever 1397 to uncouple the carriage tabulating clutch. When the lever 1397 is fully returned to its normal position after having uncoupled the tabulating clutch, it permits the latch lever 1389 to return to normal which in turn permits the link 1341 and the counterstop 2600 to return to normal position in the path of the column stop 1323 which depresses the counterstop 2601 to thereby arrest the carriage. The return of the counterstop 2600, the link 1341 and its stud 1374 to normal position also permits the slide 2634 to move downward and rock the yoke 2630 to swing its latch arm 2632 against the lug 1455 but before the counterstop 2600 and link 1341 have moved far enough upwardly to permit the latch arm 2632 to engage the lug 1455, the latch arm 2633 has already been disengaged from the lug 1455 and the spring 1448 has snapped the slide 1444 upwardly so that the forward edge of the latch arm 2632 above the latch shoulder thereon strikes the rear edge of the lug 1455 and does not interfere with application of the carriage brake.

As the column stop 1323 arresting the carriage moves to the mid-point between the ends of the counterstops 2600 and 2601, the column stop 1323 cams the link 2191 forwardly and withdraws the interlock hook 2190 from beneath the lug 196 and the counterstop 2601 also returns upwardly to normal position on the right side of the column stop 1323 so that the lever 2605 conveying the stud 2604, the lever 2607 and yoke 2611 can be rocked by the spring 2609 to return the interlock 2613 and the interlock arm 2620 to their normal positions clear of the lugs 196 and 2620. Although it requires some small bit of time following the arrival of the column stop 1323 at the exact mid-point between the counterstops 2600 and 2601, however, extremely brief it may be, for the counterstop 2601, the lever 2605, the lever 2607, the yoke 2611 and the interlock elements 2613 and 2620 to return to normal, during which brief time the column stop will begin pushing the counterstop 2600 and the stud 2621 in the lever 1328 leftward to engage the arm 2622 of the yoke 2623 whereby to hold the levers 2605 and 2607, the yoke 2611 and the interlock elements in or to return them to their locking positions, there may occasionally be an extremely brief instant in which, if the lane 21 controls are conditioned for initiating an automatic cycle of the machine, or if one of the small motor bars 282, 293 or 294 is latched down under lane 18 control, or if the operator is "riding" one of the motor bars or "live" keys of the machine, the lug 196 can move downward to block return of the detent 2613 to locking position. However, the lug 196 must move downward a considerable distance to engage the arm 150 of the interlock yoke 146 and then rock the latter far enough to withdraw the shoulder 144 from beneath the lug 143. Such movement of the lug 196 also requires a short time which is more than is required, if the momentum of the carriage is sufficient to carry the stop 1323 sufficiently beyond the exact mid-position between the counterstops 2600 and 2601 to require delay in initiating a further machine cycle as the spring 1337 cushions the carriage and returns it to the exactly correct position, for the leftwardly moving counterstop 2600 and stud 2621 to rock the yoke 2623, the levers 2605 and 2607, the yokes 2611 and 2618 and the arm 2620 of the latter to place the shoulder 2619 under the lug 143 before the lug 196 rocks the yoke 146 to withdraw the shoulder 144 from beneath the lug 143.

The yoke 2618 has a projection 2642 extending upward in front of the frame cross member 42 for engagement with the latter to prevent the arm 2620 from swinging substantially farther clockwise than is necessary to provide sufficient clearance between the rear corner of the shoulder 2619 and the forward edge of the lug 143 when it is proper for the lever 142 to move downward to couple the machine cycling clutch.

As the operation of the so modified carriage arresting and interlock mechanism in a carriage return should be apparent in view of the above description of its operation in carriage tabulation and skip-tabulation, its operation in a carriage return will be only briefly outlined.

When the carriage return control shaft 1349 is rocked counterclockwise to initiate a return movement of the carriage, the arm 1419 depresses the stud 1358 to depress the brake slide 1444. The slide 2634 is moved downwardly by its spring 2637 to rock the latch yoke 2630 to place the latch shoulder on its latch arm 2632 over the lug 1455 of the brake slide. However, as the return control shaft 1349 rocks counterclockwise, its arm 1420 depresses the link 1412 which rocks the lever 2640 to elevate the slide 2636 to prevent the shoulder on the latch arm 2633 from moving over the lug 1455. The arm 1420 also rocks the latch lever 1387 clockwise to permit the carriage return clutch to be coupled, and the lug 1421 on the lever 1387 depresses the stud 1422 and pulls the link 1345 downwardly thereby lowering the inner end of the counterstop 2601 which is then latched in lowered position by the lug 1384 moving past the shoulder 1385 of the lever 1387. The projection 2603 on the counterstop 2601 depresses the stud 2604 and rocks the levers 2605 and 2607 and the yoke 2611 to move the interlocks 2613 and 2619 to effective position.

When the return control shaft 1349 returns clockwise to its normal position, the shoulder 1429 moves under the sleeve 1340 so that when a column stop 1323 thereafter depresses the inner end of the counterstop 2600 it also lowers the link 1352 which depresses the stud 1374 and rocks the lever 1375 with its added arm 2639 clockwise, thereby elevating the slide 2634 and rocking the yoke 2630 to release the brake slide 1444 which is snapped upwardly by its spring 1448 before the link 1412, lever 2640, slide 2636 and yoke 2631 are released to move the latch arm 2633 against the lug 1455. As the column stop 1323 passes the mid-point between the counterstops 2600 and 2601 and pushes the counterstop 2601 rightward and rocks the crank 1333 clockwise, the stud 1336 rocks the crank 1328 counterclockwise so that the stud 2621 acts on the arm 2622 of the yoke 2623 to control the interlocks 2613 and 2619 in the same manner as when the momentum acquired by the carriage in a tabulating movement is absorbed by the spring 1337 and the initiation of a further cycle of operation in the machine is prevented until the carriage settles into its exact columnar position even though the lane 18 or lane 21 controls are conditioned for automatically cycling the machine or the operator is "riding" a "live" key or motor bar.

EXAMPLES OF WORK (FIGS. 51–55)

It is believed that the many advantages of the present invention will be readily understood without a detailed description of the computing and printing operations, the automatic linespacing of the forms, the automatic opening of the carriage for removal and insertion of work forms, etc., which occur in the performance of the examples of work shown in Figs. 51 to 55. A full detailed description of those examples is contained in my applications Ser. Nos. 85,971 and 174,696. The following description will deal briefly with the illustrated carriage movements and indicate the controls utilized to produce those carriage movements.

Figs. 51 to 54 show examples of work which may be performed with the machine of Figs. 1 to 44, with or without the modified structure of Figs. 47 to 50. Fig. 55 shows a single one of the many kinds of work which may be performed with a machine modified in accordance with Figs. 45 and 46.

In Figs. 51 to 55, the items shown in dotted lines indicate items set up on the keyboard prior to but not printed in the machine operation in which they may be entered into the computing mechanism. The legends "Skip," "Vert" and "Ret" in small rectangular frames in Figs. 51 to 54 indicate depressions of the "Skip," "Vertical" and "Return" motor bars 292, 293 and 294, respectively of the machine of Figs. 1 to 44. The remaining machine cycles required for the work of these figures are initiated either by depressions of the "Main" motor bar 291 or automatically. In Fig. 55, the numerals "291," "292," "293" and "294" in small rectangular frames indicate depressions of the motor bars hereinbefore identified by those numbers in a machine having the modified structure of Figs. 45 and 46. The lever 2118 is in its rearward position to render the automatic function controls effective.

Figure 51:
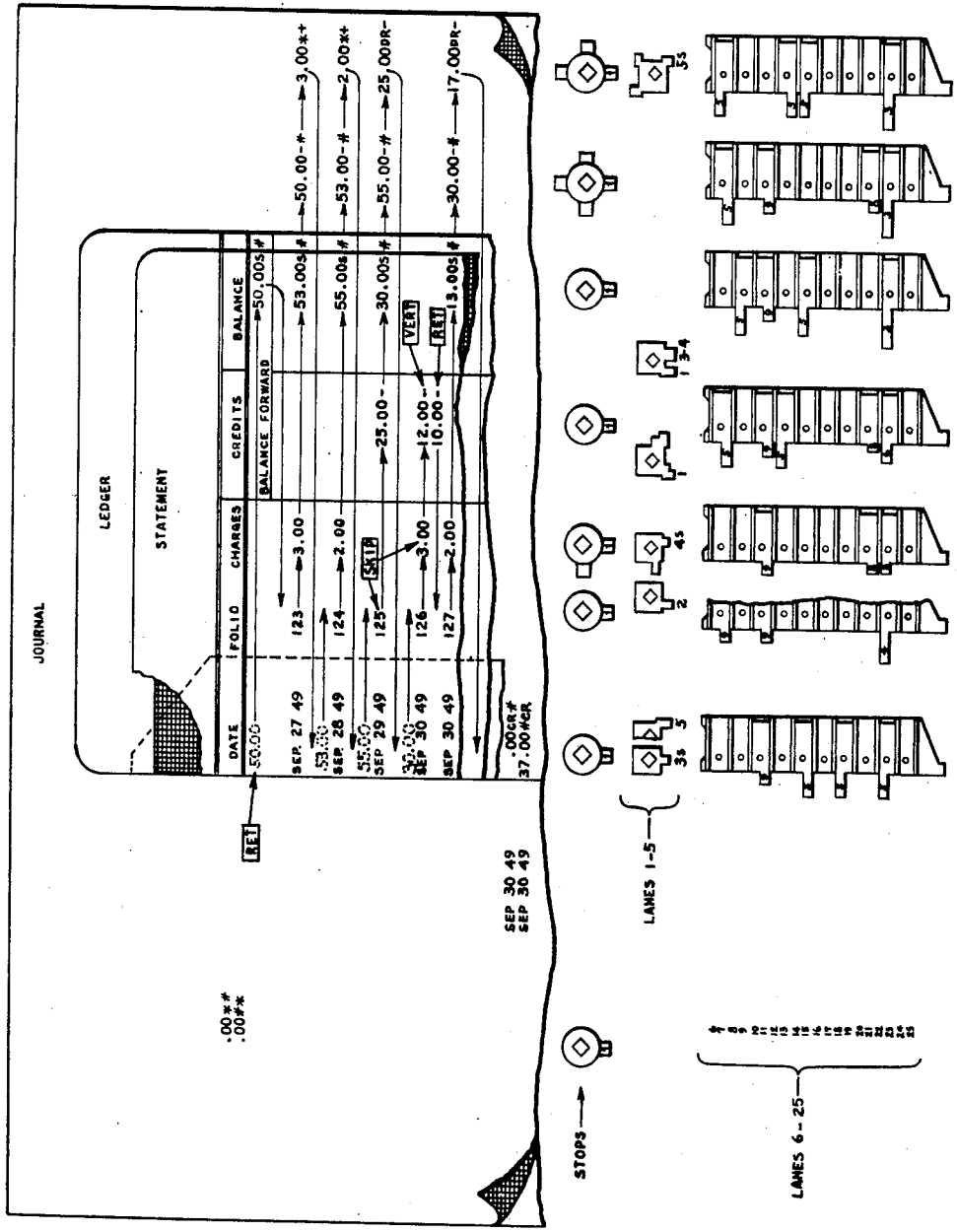

Fig. 51 illustrates an example of commercial accounts receivable posting to produce an original statement, carbon ledger and carbon journal. The program selecting knob 1741 is in its "1" position. In the first line on the statement form there is indicated a "Balance Forward" operation advantageously utilizing the previously described lane 3, lane 15, and lane 18 automatic controls combined with the "Return" bar control of carriage movement. With the old balance "50.00" entered on the keys with the carriage in "Old Balance Pickup" position (second column stop from the left) the operator depresses the "Return" bar 294. The machine cycles and enters the old balance "50.00" in the computing mechanism but does not print it. Because of the combined effects as previously described of the depression of the "Return" bar 294, of the short projection 1784, and of the #5 control projection 1767 which are in active position in lanes 3 and 15 in this carriage position, the carriage skip-tabulates under lane 3 control to the "Balance" (sixth) columnar position. Because of the #5 control projection 1767 in lane 18 in the "Pickup" (second) columnar position, the "Return" bar 294 remains latched down at the end of the "Pickup" operation and causes the machine to cycle again when the carriage arrives in the "Balance" position where a subtotaling operation causes the old balance "50.00" to be printed. In this automatic machine cycle, the "Return" bar 294 is released but not until it has conditioned the carriage movement controls, as previously described, to return the carriage under lane 2 control. A release member 1784 is positioned in lane 2 to release the lane 2 latch yoke 1597 (Fig. 38) after the carriage returns past the "Charges" (fourth) columnar position but before it reaches the "Date and Folio" (third) columnar position where, consequently, it is arrested. The machine is then ready for entry of the date and folio number of the first item to be posted.

All of the subtotals in the "Balance" position and all of the totals in the last position in Fig. 51 are printed in machine cycles initiated automatically in consequence of the #8 projections in lane 21 in the "Charges" (fourth), "Credits" (fifth) and "second Pick-up" (seventh) carriage positions. It is believed that the manner of producing the other carriage movements illustrated in Fig. 51 will be evident from inspection of the control elements shown below the work forms.

Fig. 52 illustrates the fact that the automatic controls required for two different kinds of work using forms which, together, do not require more than the available carriage length, may be set up so as to be available in the same position of the program control knob 1471. In this instance the knob or twirler 1741 is in its "2" position. In the posting of the payroll withholding tax ledgers, shown as inserted between the guides 1164 at the left end of the carriage (Fig. 1), the carriage is automatically returned after each operation in the "Total to Date" column under lane 5 control to the "Old Total" position. In posting the "Bond Purchase" ledger shown as inserted between the guides 1164 at the right side of the carriage, the lane 5 control returns the carriage from the "Balance" position to the pick-up position immediately ahead of the "Date and Payment" position.

Fig. 53 shows an example of debits posting in commercial accounts receivable accounting with the production of original ledgers, original statements, and a carbon journal. In this instance the program selecting knob or twirler 1741 is in its "3" position. In this example, the "Balance Forward" amount ("50.00") is entered on the statement form in any suitable way before that form is received by the machine operator. The "Balance Forward" operation by which the amount "50.00" is printed at the top of the "Balance" column on the ledger form is carried out in the same manner as the "Balance Forward" operation described above in connection with Fig. 51. Fig. 53, however, shows additional utilization of the lane 15 control of the effect of the "Return" bar 294. In entering the third and fourth items ("15.00" and "20.00") in the "Charges" column of the ledger form, the "Return" bar 294 is depressed each time but because of the presence of the #5 control projection 1767 in lane 15, return movement is suppressed and the carriage moves in the tabulating direction. Because there is no projection 1784 in lane 3 for the ledger form "Charges" column, the carriage performs a lane 1 controlled skip-tabulating movement to the statement form "Charges" position. Because of the #5 control projection 1767 in lane 18 in the ledger form "Charges" position, the "Return" bar 294 remains latched down. When the carriage reaches the statement form "Charges" position, the machine is automatically cycled and repeat-prints the charge item because of the #5 control projection in lane 21 in the ledger form "Charges" position, after which, because of the "Return" bar 294 being in depressed position, the carriage returns under lane 2 control to the ledger form date and folio number position.

Figure 54:
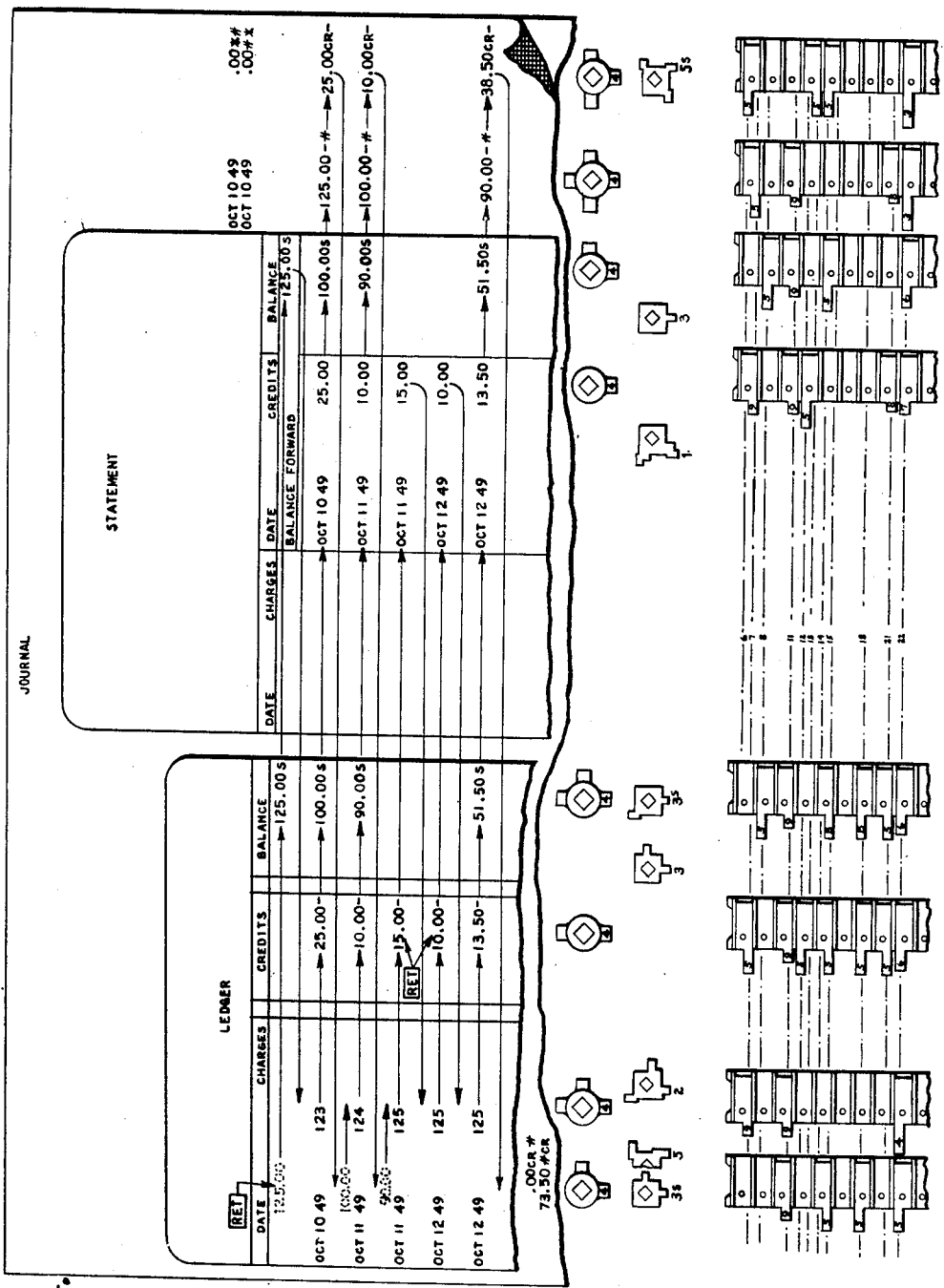
Figure 55:
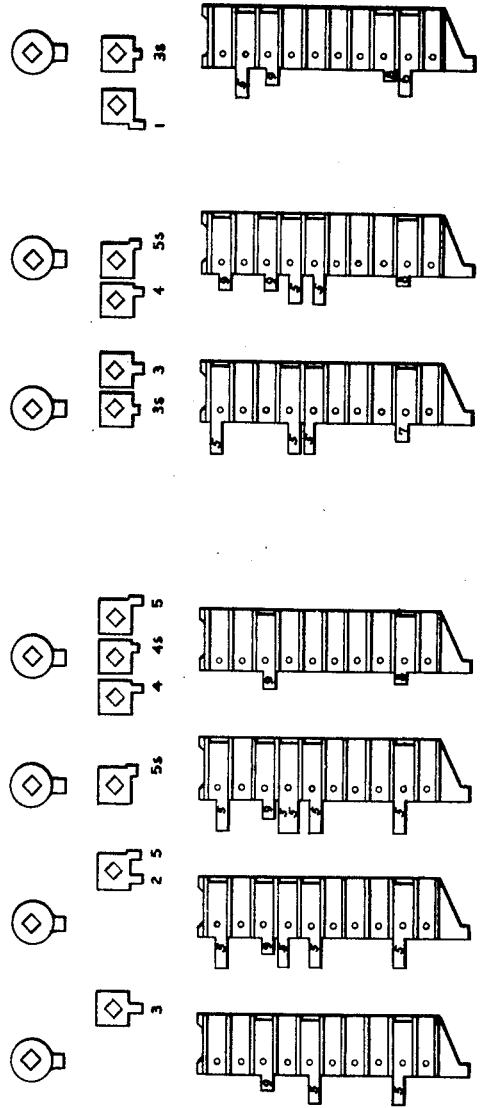

Fig. 54 shows an example of credits posting in commercial accounts receivable accounting with the knob 1741, in this instance, in its "4" position. This program is complementary to the debits posting example of Fig. 53, with one exception. The forms are identical but instead of having the amount of the "Balance Forward" entered on the statement form by other means before the machine operator receives it, the "Balance Forward" amount is entered on the statement form by the machine of this invention in the example of Fig. 54. It will be seen that the printing of the old balance of "125.00" at the top of the "Balance" column of the ledger form is secured in the same manner as the printing of the "50.00" amount at the top of the "Balance" column on the statement forms of both Fig. 51 and Fig. 53. In Fig. 54, however, after the printing of the "125.00" at the top of the ledger "Balance" column, the carriage is not returned to the ledger date and folio number position. In the ledger "Balance" position, there is another #5 projection 1767 in lane 15 to again suppress the return movement of the paper carriage, another short projection 1784 in lane 3 to cause a lane 3 controlled skip tabulation of the paper carriage to the statement "Balance" position of the paper carriage, and another #5 projection 1767 in lane 18 to hold the "Return" bar 294 depressed for a further machine cycle which is initiated automatically when the carriage reaches the statement "Balance" position, in which automatic cycle the balance forward amount 125.00 is again printed by subtotaling, and in which the carriage is returned under lane 2 control to the ledger date and folio position.

The third and fourth credit item postings in Fig. 54 show utilization of the lane 15 control in a manner similar to that involved in the third and fourth debit item postings in Fig. 53.

Fig. 55 shows an example of work performed on the new machine modified in accordance with Figs. 45 and 46. The kind of work shown is the posting of commercial checking accounts in a bank. In each posting, starting with the carriage and the old balance pickup (first) position, the last previous balance is set up on the keys and, if one or more paid checks are to be posted, the machine is operated by depression of the "Main" motor bar 291. In that cycle of operation, the old balance is entered into the computing mechanism and printed on the journal sheet at the left of the statement form and the carriage is tabulated to the first "Check" position on the statement form. The operator then enters the amount of a check and if there is no further item to be posted at that time, the operator depresses the lower "Skip" bar 294. The machine is cycled by depression of the lower "Skip" bar 294 which causes the carriage to skip-tabulate in that machine cycle under lane 1 control to the right-hand "Balance" column. The depression of the bar 294 also through the operation of the lever 2248 of Fig. 45 causes the machine to be cycled automatically when the carriage arrives in the right-hand "Balance" column. During that automatic cycle, a new balance is credited by subtotaling operation and the carriage is automatically returned under lane 3 control to the left-hand "New Balance" column where, because of the #8 control projection 1767 in lane 21 in the right-hand "Balance" column, the machine again cycles automatically and, by a total taking operation, again prints the new balance. During that last automatic cycle, the carriage returns again under lane 3 control to the old balance pickup (first) position and the machine is ready for a further posting operation.

If more than one check is to be posted at the same time, the first check-entering operation in the first "Check" column is initiated by depression of the "Main" motor bar 291 so that in the machine cycle so initiated the carriage performs a single column tabulation to the next "Check" column. If the number of checks to be posted exceeds the number of "Check" columns available, then to cycle the machine for entering a check amount in the last "Check" column, the operator again depresses the "Main" motor bar. In that machine cycle, because of the short projection 1784 in lane 5, the carriage returns under lane 5 control to the first check column to permit a further check amount to be entered. When posting the last check, if no deposit is to be posted at that time, the operator will depress the lower "Skip" bar 294 which will cause the paper carriage to skip-tabulate under lane 1 control to the right-hand "Balance" position and the posting operation is completed in the manner previously described.

If the operator knows, however, when entering the last check amount that a deposit also is to be entered, the operator will initiate the last check-entering cycle by depression of the uppermost "Return" bar 292. However, because of the #15 control projection 1767 in lane 15 in each of the check columns, the return movement of the carriage will be suppressed and the carriage will instead tabulate under lane 4 control to the "Deposit" column position. Then the operator enters the amount of deposit on the keys and if the deposit is of a nature requiring the entries in the "Analysis" column to the right of the perforated vertical line on the form, the operator initiates the machine cycle by depression of the "Main" motor bar 291, which, because of the short projection 1784 in the "Deposit" column position, causes the paper carriage to skip-tabulate to the "Analysis" column. After entering the necessary analysis figures on the keyboard, the operator initiates a machine cycle by depression of the lower "Skip" bar 294 and the posting is completed in the manner previously described.

If the item to be posted is a single deposit, the operator, after setting up the amount of the last previous balance with the carriage in the old balance pickup position, will initiate the machine cycle by depression of the uppermost "Return" bar 292. In that machine cycle, because of a #5 control projection 1757 in lane 15, the return movement of the carriage is suppressed and the carriage skip-tabulates under lane 4 control to the "Deposit" column. When the deposit entered is of such a nature as to require no analysis entries, the operator will initiate the deposit-entering cycle by depression of the lower "Skip" bar 294 so that in the deposit-entering cycle the carriage will skip-tabulate to the right-hand "Balance" column and the posting will be completed as previously described.

If, however, the items to be posted include no checks but include a plurality of deposits, the old balance entering operation in the pickup position of the carriage is again initiated by depression of the uppermost "Return" bar 292 which causes the paper carriage to skip-tabulate to "Deposit" column position. If the first deposit requires no analysis entries, the amount of that deposit could be entered in a machine cycle initiated by depression of the "Vertical" bar 293. However, each deposit requiring the analysis entries is entered in a machine cycle initiated by depression of the "Main" motor bar 291 as previously described, except that the last deposit, if it requires no analysis entries, is entered in a machine cycle initiated by depressing the lower "Return" bar 294 as previously described.

By a suitable rearrangement of the control elements 1767 and 1784, the "Analysis" column could be shifted to the right of the right-hand "Balance" column. It can also be seen that with a setup of control elements somewhat different from that shown in Fig. 55, the motor bar 293 could be employed to cause a return of the carriage from the "Analysis" position to the first check position where such a carriage movement might be needed. Both return movements and skip-tabulating movements of the carriage can be obtained from depressions of the bar 292 when needed.

The foregoing illustrate only some of the control possibilities inherent in the control mechanisms previously described. It would require an extremely large number of examples of work to fully illustrate the extremely varied results obtainable from the disclosed structure but it is believed that, from the foregoing description and the drawings, the variations of automatic control obtainable from the disclosed mechanism will be readily apparent to persons skilled in the art.

In many businesses, there are amounts of miscellaneous accounting work which do not justify the purchase of additional accounting machines and which, heretofore, have been handled by various slow methods because it was either impossible or in any case too difficult to re-adjust for such work the available machine set up to handle the kinds of accounting work for which they were principally employed. In many businesses, no one kind of accounting work is present in sufficient volume to warrant the purchase of an efficient but expensive machine but all of the required accounting work of different kinds would easily justify the purchase of such a machine if all of the required work could be performed on it. The machine of the present invention completely meets the requirements of such situations with the greatest facility and is really the first machine which is at all capable of meeting the needs in any but a very few such situations. The possibilities of providing the new machine with practically any desired numbers of control programs of the greatest diversity and selectable at will should be easily apparent from the preceding description of the construction and operation of the machine.

I claim:

1. An accounting machine having means to drive it through cycles of operation, a traveling paper carriage, a plurality of column stops adjustably mounted on said carriage, counterstop means mounted on a stationary support for co-operation with said column stops to locate said carriage in predetermined positions in accordance with the positions of said column stops on said carriage, two clutches, driving connections between said driving means and said clutches, driving connections between said clutches and said carriage for moving said carriage in opposed directions, two carriage movement control members, connections from each of said control members to a respective one of said clutches to cause engagement of said clutch and to the other of the clutches to disengage the latter before engagement of the former, connections from each of said control members to condition said counterstop means to permit movement of said column stops with the carriage in the appropriate direction, means for selectively operating said control members to cause movement of said carriage in opposite directions, a plurality of normally disabled latches for each of said control members, means to enable said latches selectively to latch the operated control member in operated position, tripping elements adjustably mounted on the carriage for tripping individual ones of said latches to release the latched control member for return to normal, and means controlled by said counterstop means when acted upon by a column stop after return of said control member to normal to disengage the engaged clutch.

2. An accounting machine having means to drive it through cycles of operation, a traveling paper carriage, a plurality of column stops adjustably mounted on said carriage, counterstop means mounted on a stationary support for cooperation with said column stops to locate said carriage in predetermined positions in accordance with the positions of said column stops on said carriage, reversible clutch means, driving connections between said driving means and said clutch means and between said clutch means and said carriage for moving the latter in opposed directions, two carriage movement control members, connections from each of said control members to said clutch means to condition the latter to move the carriage in a respective one of said directions, connections from each of said control members to condition said counterstop means to permit movement of said column stops with the carriage in the appropriate direction, means for selectively operating said control members to cause movement of said carriage in opposite directions, a plurality of normally disabled latches for each of said control members, means to enable said latches selectively to latch the operated control member in operated position, tripping elements adjustably mounted on the carriage for tripping individual ones of said latches to release the latched control member for return to normal, and means controlled by said counterstop means when acted upon by a column stop after return of said control member to normal condition to disengage said clutch means.

3. A machine according to claim 2, wherein each of said latches has a portion which is normally out of the path of any tripping member for said latch on the paper carriage but is movable into the path of such tripping member as the latch moves from its normal disabled position toward latching position, said tripping members being capable of acting on said portions for moving the respective latches from latching position only to a releasing position intermediate said latching position and the normal disabled position, and each of said control members and the latches therefor have portions cooperating upon return of the control member to normal to return the latches therefor to normal disabled position.

4. A machine according to claim 2, having a friction brake means comprising two frictionally engageable relatively movable members, connections from said carriage to one of said members for driving it as the carriage moves, means operable by said control members to disengage said brake members as a control member is operated to engage said clutch means to move the carriage, and means operable by a column stop after return of the operated control member to normal to cause frictional braking engagement of said brake members.

5. A machine according to claim 2, including, for each of said control members, means on said carriage to trip all of the latches for said control member upon movement of said carriage in the direction selected by said control member to carry all of the column stops beyond the counterstop means.

6. A machine according to claim 2, having, for each of said control members, an operating member movable from an operative position to an inoperative position and reversely and connected to its respective control member, means operable by each of said operating members when moved to operative position to move the other operating member to inoperative position, means driven by said driving means in each machine cycle to actuate the operating member which is in operative position to operate the connected control member, and manipulative means for selectively moving said operating members to operative position.

7. A machine according to claim 2, having, for each of said control members, an operating member movable from an operative position to an inoperative position and reversely and connected to its respective control member, means operable by each of said operating members when moved to operative position to move the other operating member to inoperative position, means driven by said driving means in each machine cycle to actuate the operating member which is in operative position to operate the connected control member, and manipulative means for selectively moving said operating members to operative position and simultaneously causing said driving means to drive the machine through a cycle of operation.

8. A machine according to claim 2, having, for each of said control members, an operating member movable from an operative position to an inoperative position and reversely and connected to its respective control member, means operable by each of said operating members when moved to operative position to move the other operating member to inoperative position, means driven by said driving means in each machine cycle to actuate the operating member which is in operative position to operate the connected control member, manipulative means for selectively moving said operating members to operative position, and manipulative means to operate said operating members selectively while the machine is not cycling.

9. A machine according to claim 2, having, for each of said control members, an operating member movable from an operative position to an inoperative position and reversely and connected to its respective control member, means operable by each of said operating members when moved to operatve position to move the other operating member to inoperative position, means driven by said driving means in each machine cycle to actuate the operating member which is in operative position to operate the connected control member, and means controlled by said paper carriage in accordance with its columnar position and operated by said driving means in a machine cycle for selectively moving said operating members to operative position and selectively enabling said latches.

10. A machine according to claim 2, having, for each of said control members, an operating member movable from an operative position to an inoperative position and reversely and connected to its respective control member, means operable by each of said operating members when moved to operative position to move the other operating member to inoperative position, means driven by said driving means in each machine cycle to actuate the operating member which is in operative position to operate the connected control member, and a plurality of manipulative members for selectively moving said operating members to operative position and selectively enabling said latches.

11. An accounting machine having a driving means, control means to cause said driving means to drive the machine through cycles of operation, a manipulative member to operate said control means, a traveling carriage, means to move said carriage in opposed directions to a plurality of positions, connections from said driving means to said moving means for operating the latter by said driving means, means normally operating in a machine cycle initiated by said manipulative member to condition said moving means to be operated in said machine cycle to move the carriage in one direction, a further manipulative member to operate said control means, means controlled by said further manipulative member in a machine cycle initiated by the latter to condition said moving means to move said carriage in the opposite direction, and means controlled by said carriage in accordance with the positions thereof to disable said means controlled by said further manipulative member in a machine cycle initiated by the latter while the carriage is in a predetermined one of said positions.

12. A machine according to claim 11, having means controlled by said carriage in accordance with the positions thereof and thereby conditionable when said carriage is in said predetermined position in a machine cycle initiated by said further manipulative member to retain the latter in manipulated condition to initiate a succeeding machine cycle upon completion of movement of said carriage in the said one direction.

13. A machine according to claim 12, having means controlled by said further manipulative member and by said carriage to select the position to which said carriage moves in said opposite direction.

14. An accounting machine having a driving means, a plurality of manipulative members, cycling control means controlled by said manipulative members to cause said driving means to drive the machine through cycles of operation, a traveling carriage, means to move said carriage to a plurality of predetermined positions, variably conditionable means to control said moving means to move said carriage to different ones of said positions in successive machine cycles, said means being normally conditioned to move said carriage to a first one of said positions in a machine cycle initiated by a first one of said manipulative members while said carriage is in a second one of said positions, means controlled by said carriage in said machine cycle to condition said cycling control means to initiate a further machine cycle when the carriage comes to rest, means controlled by a second one of said manipulative members to disable said carriage-controlled means, and means controlled by said second manipulative member when manipulated to initiate a machine cycle while said carriage is in said second position to condition said variably conditionable means to cause said moving means to move said carriage to a third one of said predetermined positions.

15. A machine according to claim 14, having means controlled by said carriage in accordance with the positions thereof to prevent said first-mentioned means controlled by said second manipulative member from disabling said carriage-controlled means in a machine cycle initiated by said second manipulative member while said carriage is in a fourth one of said predetermined positions.

16. An accounting machine having a driving means, a plurality of manipulative members, means controlled by said manipulative members to cause said driving means to drive said machine through cycles of operation, a traveling paper carriage, means operable by said driving means in machine cycles to move said carriage, means to stop said carriage at a plurality of predetermined positions, a plurality of means to control said stopping means to stop said carriage at different ones of said positions, means controlled by said carriage in accordance with its positions in machine cycles to selectively enable certain ones of said control means, and means controlled by one of said manipulative members to enable a different one of said control means and to disable said carriage-controlled means.

17. An accounting machine having a drive means, a plurality of manipulative members to control said drive means to cause it to drive the machine through cycles of operation, a printing mechanism, a traveling paper carriage, means powered by said drive means to move said carriage after operation of said printing mechanism in a cycle of operation of the machine, control connections conditionable by different ones of said manipulative members to cause the carriage moving means to move the carriage in different ways in machine cycles initiated by manipulation of different ones of said manipulative members, means to maintain a manipulated one of said members in manipulated condition beyond the machine cycle initiated by manipulation thereof to cause it to automatically initiate a further cycle of operation of the machine, and means to vary the control of the carriage moving means by said manipulated member during the first of said cycles of operation without varying it during the subsequent cycle.

18. An accounting machine having a driving means, a plurality of manipulative members, means controlled by said members to cause said driving means to drive the machine through cycles of operation, a traveling carriage, means to move said carriage to a plurality of predetermined positions, variably conditionable means to control said moving means to move said carriage to different ones of said positions in successive machine cycles, conditioning means controlled by said carriage in accordance with the positions thereof to variably condition said variably conditionable means, a further carriage-controlled means, and means to disable said carriage-controlled conditioning means, said disabling means being controlled jointly by a predetermined one of said manipulative members and said further carriage-controlled means to disable said carriage-controlled conditioning means in machine cycles initiated by said one manipulative member while the carriage is in a certain one of said positions but not in other machine cycles.

19. A machine according to claim 18, having means controlled by said one manipulative member to differently condition said variably conditionable means.

20. An accounting machine having a driving means, a plurality of manipulative members, means controlled by said members to cause said driving means to drive the machine through cycles of operation, a traveling carriage, means operable by said driving means in machine cycles to move said carriage in opposite directions, means operable in a machine cycle to control said moving means, said control means being normally conditioned to cause said moving means to move the carriage in one direction, a first means controlled by said carriage and thereby enabled in machine cycles initiated while the carriage is in certain positions to condition said control means to move said carriage in the opposite direction, a second carriage-controlled means, and means to disable said first carriage-controlled means, said disabling means being controlled jointly by said second carriage-controlled means and a predetermined one of said manipulative members.

21. An accounting machine having a frame, a paper carriage mounted on said frame for movement transversely thereof, a plurality of column stops mounted on said carriage to determine a plurality of columnar positions of said carriage, counterstop means movably mounted on said frame in the path of said column stops for movement by a column stop as the carriage approaches the columnar position determined by said column stop and for movement by said column stop as the carriage, by its momentum, is carried beyond said columnar position, resilient means to yieldingly position said counterstop means in a normal position and to return said counterstop means to normal position after each such movement by said column stop whereby to absorb the momentum of the carriage, arrest the carriage and return it to exact columnar position, means to drive the machine through cycles of operation, control means comprising a control member movable through a substantial distance from a normal position to a position to cause said drive means to cycle the machine, a first interlock means to latch said control means in normal position while said counterstop means is out of normal position, and a second interlock means to prevent said control means from causing said drive means to cycle the machine while said counterstop means is out of normal position after said control member has been released by said first interlock means during movement of the carriage through the exact columnar position.

22. An accounting machine having a frame, a paper carriage mounted for movement transversely of said frame, a plurality of column stops mounted on said paper carriage to determine a plurality of columnar positions thereof, a pair of counterstops movably mounted on said frame and yieldingly urged into the path of said column stops, a carriage decelerating brake comprising a first brake member driven by the carriage as the latter moves, a second brake member mounted for movement toward and away from the first brake member, means normally yieldingly pressing the second brake member against the first brake member to oppose movement of the carriage, means for moving said carriage, a first control member movable from a normal position to a position to cause said carriage moving means to move said carriage in one direction, a second control member movable from a normal position to a position to cause said carriage moving means to move said carriage in the opposite direction, means controlled by each of said control members to remove a respective one of said counterstops from the path of said column stops to permit movement of the carriage in the appropriate direction, means to latch each of the counterstops, when depressed by movement of its respective control member, in depressed position, means controlled by each of said control members to retract said second brake member from the first brake member as said control member is moved to cause movement of said carriage, a pair of brake latches to hold said second brake member in retracted position, each of said brake latches being controlled by a respective one of said counterstop removing means and thereby moved to releasing position in an early portion of movement of the respective counterstop out of the path of the column stops, and means controlled by each of said counterstops when depressed by a column stop as the carriage approaches a new columnar position, and thereby move to trip the latch holding the other counterstop in depressed position to permit the latter to return to normal position to arrest the latter column stop and the carriage after the brake latch controlled by the counterstop so depressed by the latter column stop has been moved to releasing position.

THOMAS M. BUTLER.

References Cited in the file of this patent
UNITED STATES PATENTS

| Number | Name | Date |
|---|---|---|
| 1,942,216 | Muller | Jan. 2, 1934 |
| 2,291,154 | Fettig | July 28, 1942 |
| 2,442,402 | Davidson et al. | June 1, 1948 |